United States Patent
Marcinkiewicz et al.

(10) Patent No.: US 6,404,154 B2
(45) Date of Patent: Jun. 11, 2002

(54) FORCE CONTROL SYSTEM

(75) Inventors: Joseph G. Marcinkiewicz, St. Charles, MO (US); Donald C. Lovett, Shelton, CT (US)

(73) Assignee: Emerson Electric Co., St. Louis, MO (US)

(*) Notice: Subject to any disclaimer, the term of this patent is extended or adjusted under 35 U.S.C. 154(b) by 0 days.

(21) Appl. No.: 09/845,673

(22) Filed: Apr. 30, 2001

Related U.S. Application Data

(63) Continuation-in-part of application No. 09/513,906, filed on Feb. 25, 2000, now Pat. No. 6,225,767, which is a continuation of application No. 09/088,922, filed on Jun. 2, 1998, now Pat. No. 6,091,215.

(51) Int. Cl.[7] .......................... H02K 33/00; H02K 7/09
(52) U.S. Cl. ..................... 318/254; 318/135; 318/128; 156/73.5; 156/580
(58) Field of Search ................. 318/138, 245, 318/254, 439, 700–799, 128, 127, 110–126; 310/90.5, 15, 112; 156/73.5, 580, 64, 73.1, 350, 358, 580.1

(56) References Cited

U.S. PATENT DOCUMENTS

| | | | |
|---|---|---|---|
| 3,750,927 A | * 8/1973 | Miller et al. | 228/2 |
| 3,840,979 A | * 10/1974 | Miller et al. | 29/470.3 |
| 3,920,504 A | * 11/1975 | Shoh et al. | 156/580 |
| 4,093,917 A | * 6/1978 | Haeussemann | 324/173 |
| 4,274,040 A | * 6/1981 | Spiegel | 318/689 |
| 4,598,351 A | * 7/1986 | Fair et al. | 363/49 |
| 4,634,191 A | * 1/1987 | Studer | 310/90.5 |
| 4,642,501 A | * 2/1987 | Kral et al. | 310/90.5 |
| 4,656,400 A | * 4/1987 | Pailthorp et al. | 318/135 |
| 4,659,969 A | * 4/1987 | Stupak, Jr. | 318/128 |
| 4,665,348 A | * 5/1987 | Stupak, Jr. et al. | 318/135 |
| 4,715,523 A | * 12/1987 | Lebedev et al. | 228/2 |
| 4,862,014 A | * 8/1989 | Myers et al. | 307/270 |
| 5,003,211 A | * 3/1991 | Groom | 310/90.5 |
| 5,126,641 A | * 6/1992 | Putman et al. | 318/128 |
| 5,140,243 A | * 8/1992 | Lyons et al. | 318/701 |
| 5,160,393 A | * 11/1992 | Snyder | 156/73.5 |
| 5,220,492 A | * 6/1993 | Rubin et al. | 363/21 |
| 5,277,744 A | * 1/1994 | Snyder | 156/73.5 |
| 5,300,841 A | * 4/1994 | Preston et al. | 310/90 |
| 5,379,864 A | * 1/1995 | Colby | 187/393 |
| 5,379,951 A | * 1/1995 | Snyder | 156/580 |
| 5,471,106 A | * 11/1995 | Curtis et al. | 310/90.5 |
| 5,562,242 A | * 10/1996 | Manzo et al. | 228/2.1 |
| 5,795,419 A | * 8/1998 | Lotz et al. | 156/64 |
| 5,844,193 A | * 12/1998 | Nomura et al. | 219/110 |
| 6,208,497 B1 | * 4/2001 | Seale et al. | 361/160 |

FOREIGN PATENT DOCUMENTS

| | | | |
|---|---|---|---|
| DE | 4108688 | * | 3/1991 |
| DE | 195-44-207 | * | 11/1995 |

* cited by examiner

*Primary Examiner*—Paul Ip
(74) *Attorney, Agent, or Firm*—Howrey Simon Arnold & White, LLP

(57) ABSTRACT

A force control system for an electromagnetic actuator includes an observer that outputs signals representing the instantaneous position and velocity of a movable member, and a position controller that receives the output of the observer and signals representing a desired position and a desired velocity. The position controller compares the output of the observer with the desired position and velocity signals to generate position and velocity error signals. The position controller further generates force command signals required to position the movable member at the desired position with the desired velocity based on the position and velocity error signals. The position component may be eliminated from the force command signals, resulting in controlling only the velocity of the movable member. In accordance with other aspects of the invention, a force control system for an electromagnetic actuator includes a flux observer that low-pass filters the voltage applied to phase coils to estimate the flux of the phase coil and provide a signal representing the estimated flux at the output.

20 Claims, 36 Drawing Sheets

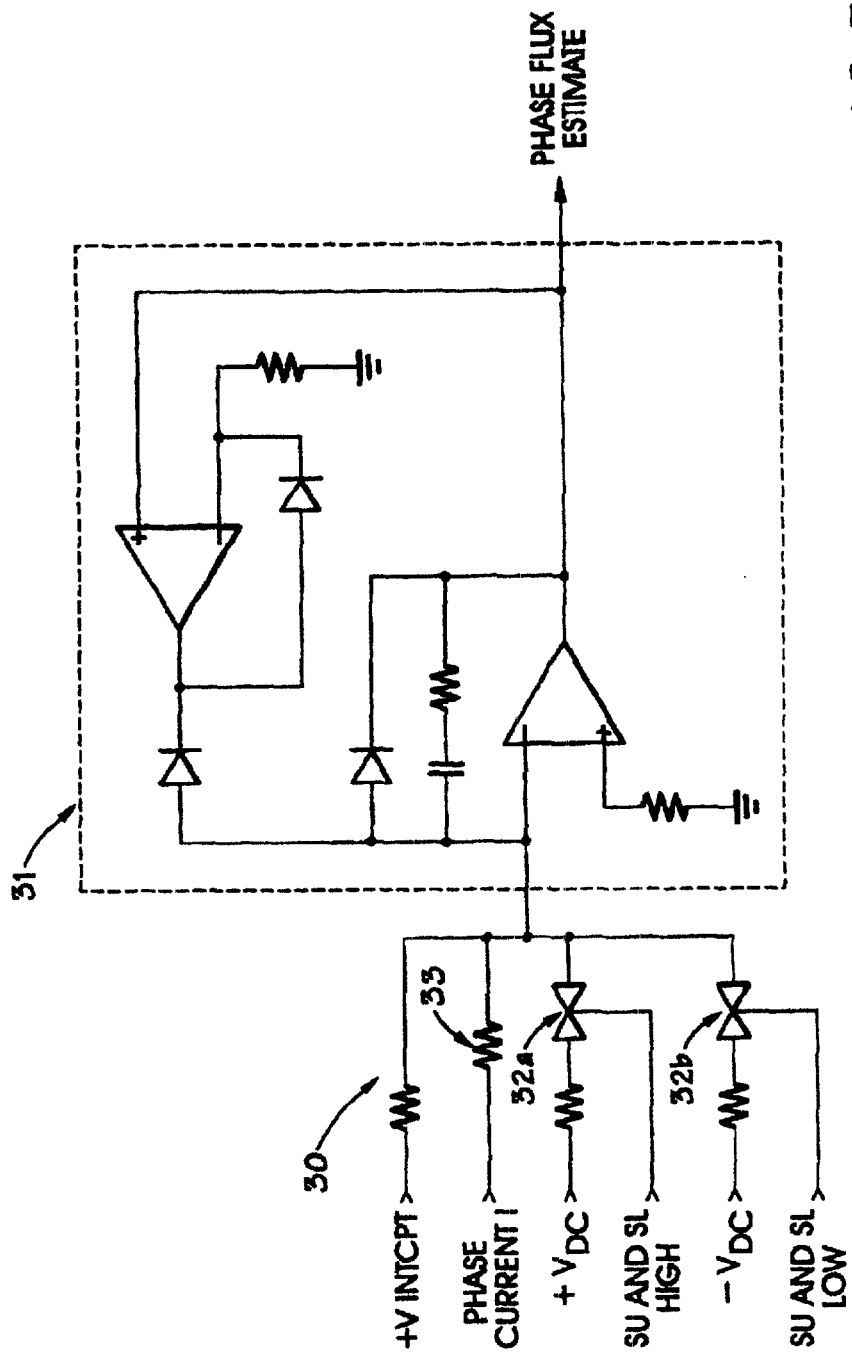
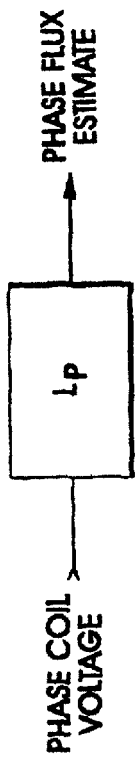
FIG. 3A
FIG. 3B

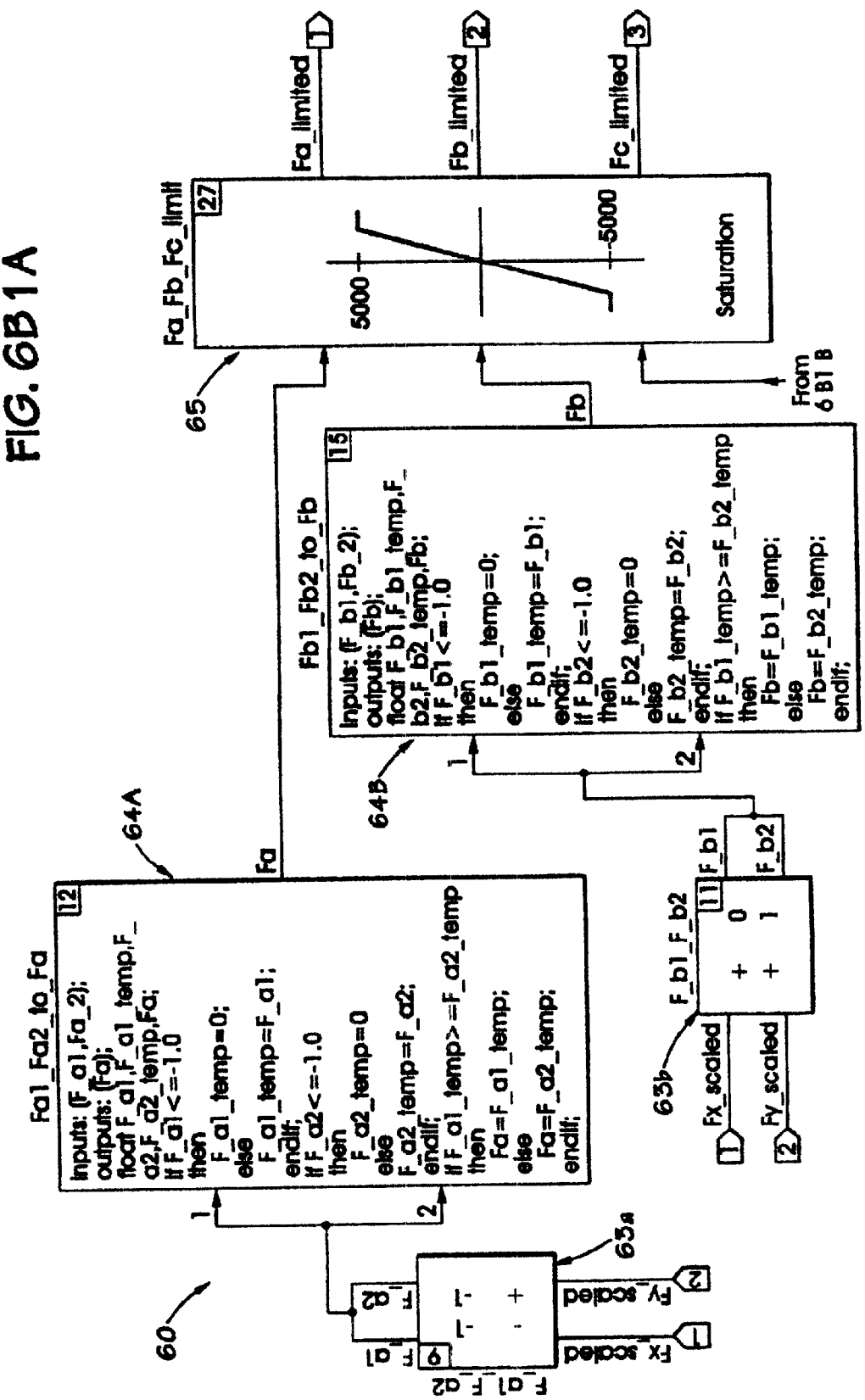
FIG. 6B1A

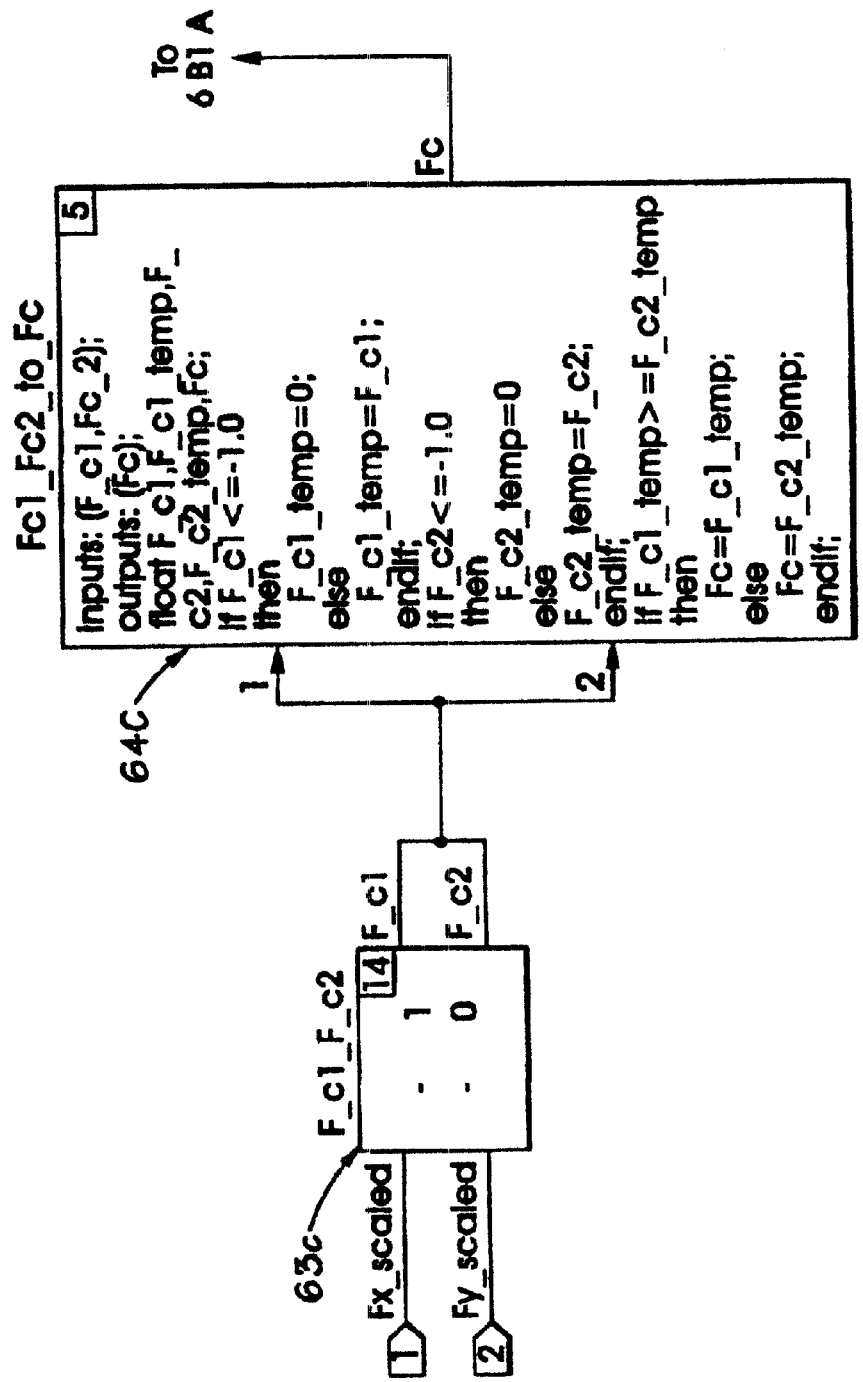

TYPE = STATE - SPACE SYSTEM        ID = 9

BLOCK NAME          INPUTS    OUTPUTS    STATES
F_a1_F_a2             2          2          0

2 - BY - 2 STATE SPACE MATRIX

-0.577   -1.
 0.577   -1.

ZERO INITIAL CONDITIONS : YES

INPUT EXTERNAL_SIGNALS                OUTPUT LABELS
1  "Fx_SCALED"                    1  "F_a1"
2  "Fy_SCALED"                    2  "F_a2"

COMMENTS

VIEW_INPUT          COLOR   ICON       IN_PINS    OUT_PINS   LABELS
EXTERNAL_SIGNALS      0     ALT. SPEC  SHOW_ALL   SHOW_ALL     ON

CANCEL                                                        DONE

*FIG. 6B2*

| BLOCK NAME | TYPE = STATE - SPACE SYSTEM | | ID = 11 | |
|---|---|---|---|---|
| F_b1_F_b2 | INPUTS | OUTPUTS | | STATES |
| | 2 | 2 | | 0 |

2 - BY - 2 STATE SPACE MATRIX 1.155   0.
0.577   1.

ZERO INITIAL CONDITIONS : YES

INPUT EXTERNAL_SIGNALS                    OUTPUT LABELS

1  "Fx_SCALED"          1  "F_b1"
2  "Fy_SCALED"          2  "F_b2"

COMMENTS

| CANCEL | VIEW_INPUT_EXTERNAL_SIGNALS | COLOR 0 | ICON SPECIAL | IN_PINS SHOW_ALL | OUT_PINS SHOW_ALL | LABELS ON | DONE |

FIG. 6B 3

| TYPE = STATE - SPACE SYSTEM | | ID = 14 | |
|---|---|---|---|
| | INPUTS | OUTPUTS | STATES |
| | 2 | 2 | 0 |

BLOCK NAME
F_c1_F_c2

2 - BY - 2 STATE SPACE MATRIX

-0.577  1.
-1.155  0.

ZERO INITIAL CONDITIONS : YES

INPUT EXTERNAL_SIGNALS    OUTPUT LABELS

1 "Fx_SCALED"    1 "F_c1"
2 "Fy_SCALED"    2 "F_c2"

COMMENTS

| VIEW_INPUT EXTERNAL_SIGNALS | COLOR | ICON SPECIAL | IN_PINS SHOW_ALL | OUT_PINS SHOW_ALL | LABELS ON |
|---|---|---|---|---|---|
| | 0 | | | | |

CANCEL    DONE

FIG. 6B 4

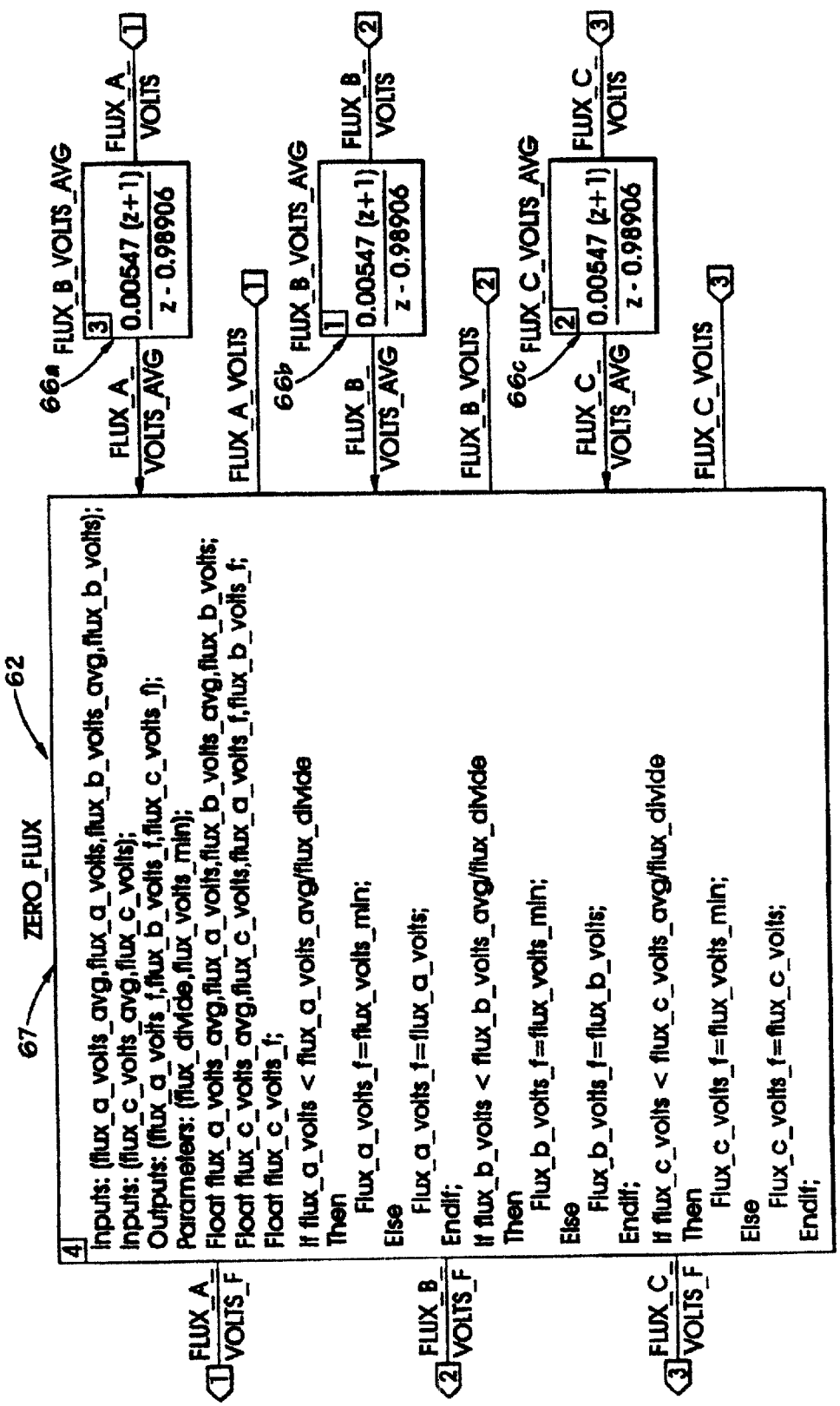
FIG. 6D1

```
Inputs: (Fx, Fy);
Outputs: (Fa, Fb, Fc, angle);
Parameters: pi;
Float Fx, Fy, Fa, Fb, Fc, angle, pi;

If Fx == 0
Then
        If Fy == 0
        Then
                            Angle = 0;
        Else
                            Angle = atan 2 (Fy, Fx) *180/pi;
        Endif;
Else
        Angle = btan 2 (Fy, Fx) *180/pi;
Endif;
If angle > = -90
Then
        If angle > 30
        Then
                            Fc = 0;
                            Fb = (2/(sqrt(3.0)))*Fx;
                            Fa = Fy+Fb/2;
        Endif;
Endif;
If angle > = 30
Then
        If angle > 150
        Then
                            Fb = 0;
                            Fc = (1/sqrt(3.0)))*Fx+Fy;
                            Fa = 2*Fy Fb;
        Endif;
Endif;
If angle > = 150
Then
        Fb = 0;
        Fc = (-2/(sqrt(3.0)))*Fx;
        Fa = Fy+ Fc/2;
Endif;
If angle < -90
Then
        Fb = 0;
        Fc = (-2/sqrt(3.0)))*Fx;
        Fa = Fy+ Fc/2;
Endif;
```

FIG. 7B

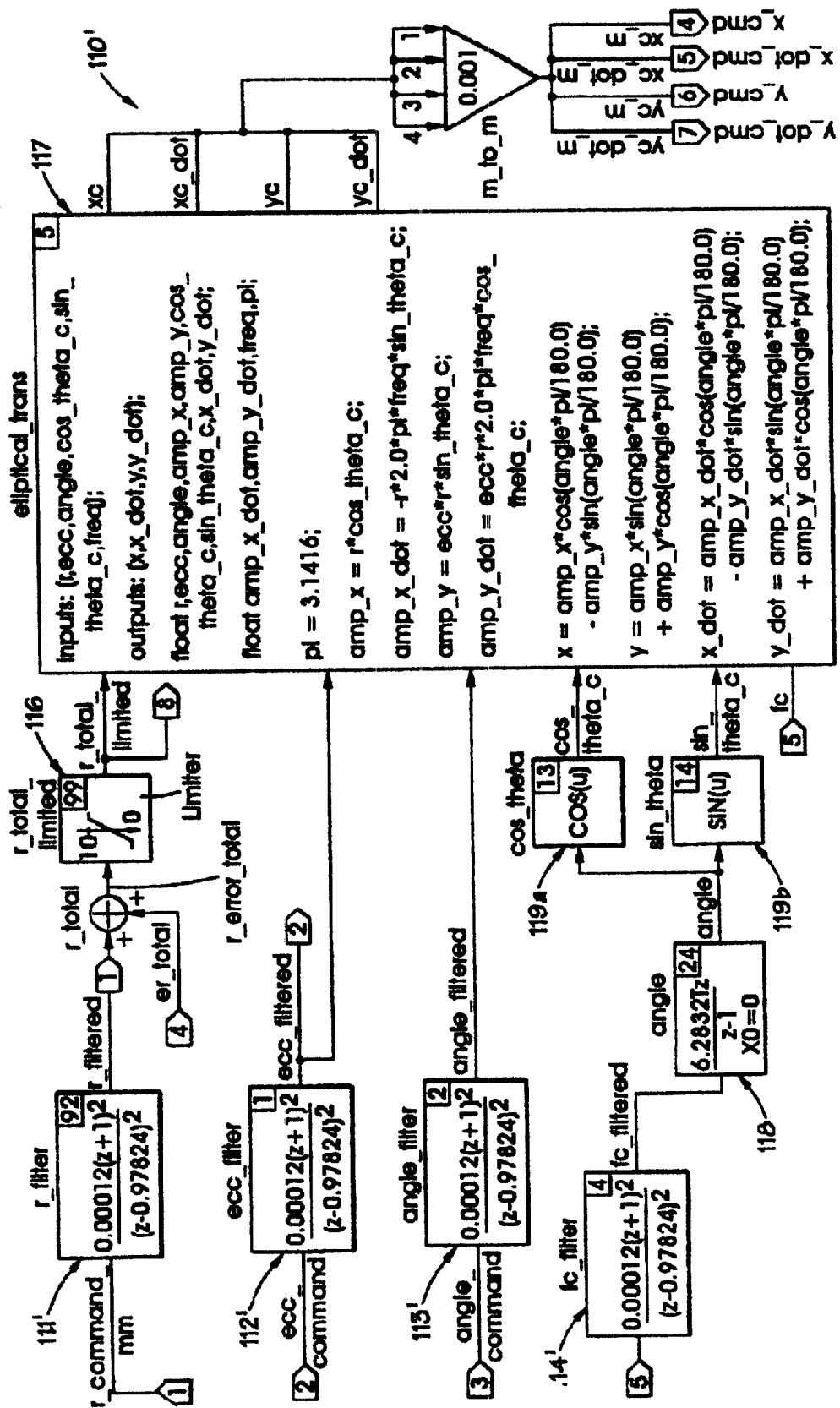

| TYPE = STATE - SPACE SYSTEM | | ID = 97 | |
|---|---|---|---|
| INPUTS | | OUTPUTS | STATES |
| 4 | | 2 | 0 |

BLOCK NAME
K_QD_sfbk

2 - BY - 4 STATE SPACE MATRIX    %KQD_fbk 1.00D+05  9.19D+06  8000.  -400.
-9.19D+06  1.00D+05  400.  8000.

ZERO INITIAL CONDITIONS : YES

INPUT EXTERNAL_SIGNALS                         OUTPUT LABELS

1 "eq 1"                              1 "eQ"
2 "ed 1"                              2 "eD"
3 "eq 2"
4 "ed 2"                    COMMENTS

| | VIEW_INPUT | COLOR | ICON | IN_PINS | OUT_PINS | LABELS |
|---|---|---|---|---|---|---|
| CANCEL | EXTERNAL_SIGNALS | 0 | ALT. SPEC | SHOW_ALL | SHOW_ALL | ON | DONE |

*FIG. 14B*

FORCE CONTROL SYSTEM

CROSS-REFERENCE TO RELATED APPLICATIONS

This application is a continuation-in-part of U.S. patent application Ser. No. 09/513,906, filed Feb. 25, 2000 (now U.S. Pat. No. 6,225,767), which is a continuation of U.S. patent application Ser. No. 09/088,922, filed Jun. 2, 1998 (now U.S. Pat. No. 6,091,215), both of which are incorporated by reference in there entirety.

BACKGROUND OF THE INVENTION

1. Field of the Invention

The present invention relates to a novel flux control system and, more particularly, to a flux control system for use in motion control applications. Even more particularly, the present invention relates to a novel motion control system for use in friction welders.

2. Description of Related Art

In most electromagnetic systems, the transfer of energy from one component of the system to another is critical to proper operation of the system. In many is electromagnetic systems, this transfer of energy is accomplished by appropriately energizing one component of the system to establish a magnetic flux that interacts with another component of the system to transfer energy from the energized component to the other component. Despite the fact that the energy transfer is accomplished by the flux, in known electromagnetic systems, the flux of the system is not directly controlled. Instead, the current and/or voltage applied to the energized member is controlled and, based on assumed relationships between current, voltage and flux, it is assumed that the control of the current and/or voltage based on the assumed relationships will produce the appropriate flux. This control of current and/or voltage is typically implemented because, to date, the prior art has not provided an efficient, low cost, and easily-implemented system for directly controlling flux in an electromagnetic system.

One drawback of current and/or voltage control systems as described above is that the relationships between current, voltage and flux are not easily represented mathematically and vary in a non-linear manner depending on a variety of variables. For example, the particular characteristics of each piece of magnetic material in a system will result in voltage, current and flux relationships that vary from one system to another and, even within a given system, from one section of the system to another. Because of these differing voltage, current and flux relationships, it is difficult to accurately and properly control the currents and/or voltages to produce the desired flux and, thus, the desired energy transfer. As such, the prior art is limited in its ability to provide an electromagnetic system in which flux is directly controlled.

The lack of an appropriate flux control system in the prior art is particularly noticeable in electromagnetic systems where the force exerted by one component of the system on another component of the system is desired to be finally controlled. In such systems, the actual force produced by the system is related to the flux established by the energized component of the system As described above, however, because the prior art cannot directly and finely control flux, it cannot, therefore, finely control the force produced by such systems.

The inability of the prior art to finely control the forces established in an electromagnetic system is particularly acute in applications where the movement of at least one component of the system must be precisely controlled. One example of such an application is in a friction or vibration welder for driving a thermoplastic part to be welded with linear, orbital, rotational, or arbitrary vibratory motion relative to another thermoplastic part with the two parts in forced contact along surfaces thereof to be welded, such that the relative movement of the parts relative to one another causes friction to heat the parts along the intersections thereof so that upon cessation of the movement, the parts will cool and will be welded to one another.

Friction welders are especially suitable for use in the welding of thermoplastic parts by means of either linear, spin, or orbital vibratory forces which induce friction heating in the parts. This friction heating at the interface of the surfaces to be welded causes the parts to fuse at their interface surfaces and bond together as they cool. Although the vibratory forces generating the friction heating may be created through mechanical coupling means, it is common to employ an electromagnetic system to generate the controlled motion necessary.

Numerous friction welders driven either electromagnetically or hydraulically are commercially available for operating in a linear vibratory mode. However, the motion of these friction welders is not ideal. Due to the linear or side-to-side motion of the welding component, the frictional forces at the interface of the welding materials are translational, and drop to a zero velocity each time the welding components reverse direction. When the components are at zero velocity, no heat is produced, as friction welding is a resistance process, producing heat proportional to the product of the resistance forces and the mean-squared relative velocity of the components at the interface.

Furthermore, many linear motion welding systems employ electromagnetic systems or drivers using the known "Scott Tee" magnetic circuit to convert three-phase electrical power into one-phase mechanical motion. In such systems, because of the electromagnetically-linked nature of the driver component of the system, it is difficult to precisely control movement of the movable member in all directions and to limit zero velocity intervals for the movable member. Accordingly alternative motions and controllers for frictional welding components have been developed which seek to reduce or minimize the zero velocity components and simplify the control circuits.

Spin welding is one such alternative in which the welding components are spun about an axis, and rotational forces, not linear motion, produce the frictional heating at the interface. However, the rotational forces are proportional to the radial distance from the center of rotation, and accordingly neither the velocity of the components nor the resulting heating is radially uniform Furthermore, spin welding is generally restricted to applications where the parts to be welded have circular geometry.

A second alternative is to electromagnetically produce an orbital motion of the welding components. During orbital motion, the velocity of the components remains constant as the parts are rubbed, thereby generating the same amount of frictional heating as is generated by linear motion, but with less required force and less relative displacement of the welding components.

Despite the heating advantages of orbital welding, there are parts which are not amenable to welding with orbital motion, but are amenable to welding by either linear or spin motion. Accordingly, friction welders that are electromagnetically driven and capable of producing either linear motion or orbital motion have been developed. One such friction welder is disclosed in Snyder, U.S. Pat. No. 5,378, 951. The electromagnetic drive system of these friction welders is in several ways similar to that for an electromagnetic motor.

In such systems, three coupled magnetic coils are positioned equidistantly around the circumference of the welder, in a plane parallel to the plane of motion. The coupled magnetic coils are electrically connected in either a delta or "Y" connection to essentially form an orbital motor stator component. A triangular armature or rotor component separately formed as a single body of magnetic material is positioned centrally relative to the stator component, such that each face of the triangular armature is adjacent to a magnetic coil. The armature is maintained in the horizontal orbital plane by a flexural spring support system connected to a massive stationary frame. Orbital motion of the armature results from the application of a controlled three-phase AC current to the coupled magnetic coils, producing force on the armature proportional to the flux generated. This armature motion can be resolved into displacement, velocity, and acceleration vectors proportional in amplitude to the sine and cosine of twice the AC power line frequency. Linear motion of the armature is produce by the addition of a second orbital motor or by splitting each coupled magnetic coil of a single orbital motor into two sections and selectively applying current to various sections in either parallel or series combinations.

Several disadvantages arise from producing orbital motion using coupled magnetic coils. First, employing coupled magnetic coils reduces the system's overall performance, as force generated in one direction always generates counteracting force elements in the opposite direction due to the coupling of the flux paths in the magnetic circuit. Second, the system is incapable of producing motion which is neither orbital nor linear, i.e. pure arbitrary motion. It is desirable to produce arbitrary motion of the welding components when the system needs to compensate for uneven mass distribution of the armature, or when random orbits are desired.

Finally, the control systems for producing the orbital or linear motion of the armature become complex When coupled magnetic coils are used in an orbital motor, the magnetic flux within the system is constrained to sum to zero. If in addition, the AC phase currents are also constrained to sum to zero, there are not enough degrees of freedom in the magnetic system to generate the arbitrary forces for producing arbitrary motion. It however, the phase currents are not constrained to sum to zero, enough degrees of freedom exist in the magnetic system to produce the arbitrary forces, but a continuous flux operation is required to generate these arbitrary forces.

The flux across each air gap between the magnetic coils and the adjacent faces of the armature in such systems is a function of all three phase currents and the non-linear magnetics. At no time is there an unused or unenergized magnetic coil. This limits the ability to use any form of fine flux control in such systems.

The present invention addresses these and other limitations of the prior art.

SUMMARY OF THE INVENTION

In one aspect of the present invention, a force control system for an electromagnetic actuator is presented. The actuator has a stationary member with a core, a movable member and at least one phase coil positioned to establish a magnetic flux in the core when the phase coil is energized to exert a force on the movable member. The force control system includes an observer that outputs signals representing the instantaneous position and velocity of the movable member, and a position controller that receives the output of the observer and signals representing a desired position and a desired velocity. The position controller compares the output of the observer with the desired position and velocity signals to generate position and velocity error signals. The position controller further generates force command signals required to position the movable member at the desired position with the desired velocity based on the position and velocity error signals. A flux controller receives the force command signals and converts the force command into a flux command signal, and the flux controller generates a phase energization signal based on the flux command signal. In certain embodiments of the invention, the position component is eliminated from the force command signals, resulting in controlling only the velocity of the movable member.

In accordance with other aspects of the invention, a force control system for an electromagnetic actuator includes a flux observer having an input and an output, with the input coupled to the phase coil. The flux observer low-pass filters the voltage applied to the phase coil to estimate the flux of the phase coil and provide a signal representing the estimated flux at the output. For example, the flux observer may low-pass filter Vn−In*Rn, where Vn is the phase coil voltage, In is the phase coil current and Rn is the phase coil resistance. A flux controller receives a flux command signal and the output of the flux observer, and provides a phase energization signal to energize the phase coil to increase the flux in the phase coil when the flux command signal is greater than the estimated flux signal by at least a predetermined amount and to energize the phase coil to decrease the flux in the phase coil when the flux feedback signal is greater than the flux command signal by at least a predetermined amount.

Still further, 13, an electromagnetic actuator is disclosed that includes a stationary outer assembly that defines a bore and includes a core. A phase coil is positioned to establish a flux in the core when the phase coil is energized, and a movable member is positioned within the bore defined by the stationary assembly, such that the flux established in the core exerts a force on the movable member. A flux observer has an input coupled to the phase coil, and the flux observer low-pass filters the voltage applied to the phase coil to estimate the flux of the phase coil and output a signal representing the estimated flux. A flux controller receives a flux command signal and the output of the flux observer. Based on these signals, the flux controller provides a phase energization signal to energize the phase coil to increase the flux in the phase coil when the flux command signal is greater than the estimated flux signal by at least a predetermined amount and to energize the phase coil to decrease the flux in the phase coil when the flux feedback signal is greater than the flux command signal by at least a predetermined amount.

In certain exemplary embodiments, the stationary outer assembly comprises a plurality of substantially identical, magnetically-uncoupled E-cores, with each E-core defining a central arm and two secondary arms. The central arm of each E-core is encircled by a phase coil such that, when electrical energy is applied to a given phase coil, a flux will be established in the corresponding E-core. Such a system may comprise a two or four phase system, for example.

BRIEF DESCRIPTION OF THE DRAWINGS

Other objects and advantages of the invention will become apparent upon reading the following detailed description and upon reference to the drawings in which:

FIG. 3A generally illustrates an exemplary embodiment of an open loop flux observer that may be used in the control system of FIG. 1.

FIG. 3B generally illustrates a circuit utilizing a low pass filter providing a signal corresponding to flux in an electromagnetic system.

FIGS. 6A–6D generally illustrate through the use of pseudo-code blocks, an exemplary form of a force to flux transformation that may be implemented through the use of a program microcontroller or microprocessor.

FIG. 7B generally illustrates a group of function blocks that, when implemented, generate the appropriate flux commands to implement the flux to force transformation reflected by FIG. 7A.

FIG. 11B illustrates a position command generator similar to that of FIG. 10A that operates on a sampling basis to produce position command signs in response to sampled input signal.

FIGS. 14A—14D generally illustrate function blocks that may be used to implement the exemplary QD controller of FIG. 13.

Figure 2A:
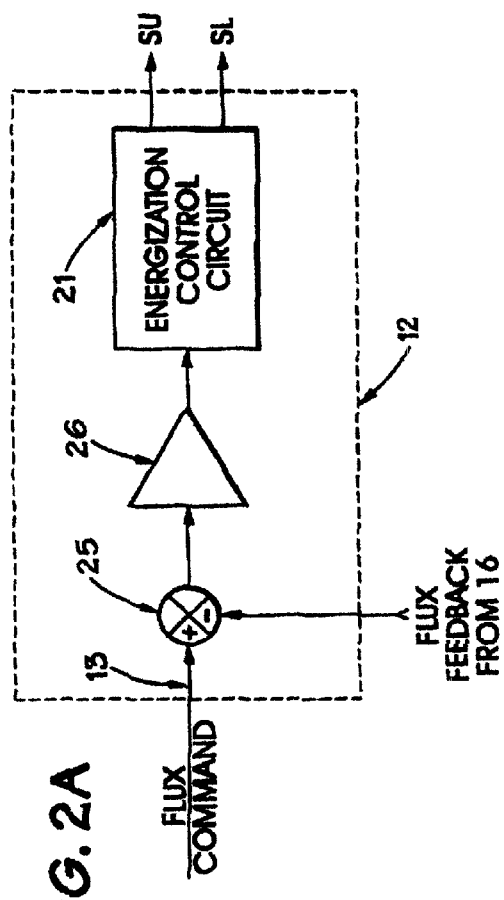
FIGS. 2A and 2B illustrate in greater detail one exemplary embodiment of a flux control system as illustrated in FIG. 1.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
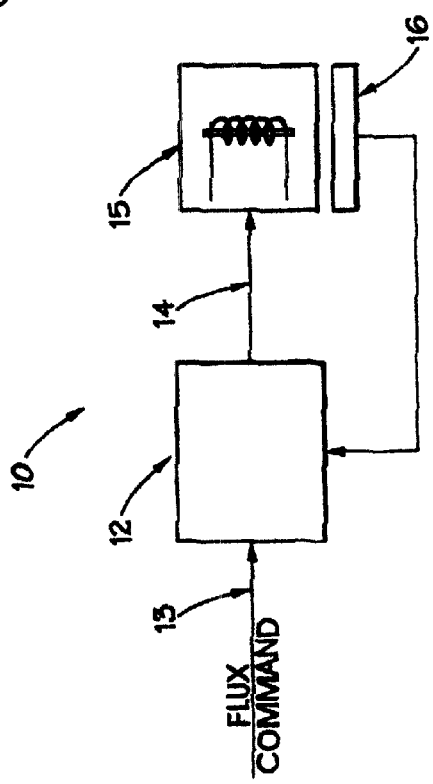
FIG. 1 illustrates a novel flux control system according to certain aspects of the present invention

Turning to the drawings and, in particular, to FIG. 1, a novel flux control system 10 constructed according to certain aspects of the present invention is shown In general, the novel system 10 includes a flux controller 12 that receives at an input flux command 13 and provides as an output a phase coil energization signal 14. The phase coil energization signal 14 is provided, through appropriate means, to an electromagnetic system 15. A flux observer 16 provides a feedback signal to flux controller 12 that corresponds to the flux in the electromagnetic system 15. In general, the flux controller 12 provides phase coil energization signals 14 that energize the electromagnetic system 15 such that the flux in the electromagnetic system 15 follows the flux command 13.

The electromagnetic system 15 may be any electromagnetic system that includes at least one phase coil and a core, where the phase coil can be energized through the application of electric power (e.g., through the application of controlled voltage and/or current) to establish a flux in the core. For example, the electromagnetic system 15 may be as simple as an iron-core inductor with a phase coil wrapped about a core or a transformer having primary and secondary windings each wound about a core.

The flux control system 10 of the present invention is believed to have particular application to electromagnetic systems 15 that constitute electromagnetic actuators where energization of the system 15 produces movement of a movable member. For example, the flux control system of FIG. 1 is believed to have particular applicability to electromagnetic systems 15 that include a main core (or a plurality of magnetically uncoupled cores) about which one or more phase coils are wound. In such embodiments, a movable member is typically provided that interacts with the core when the core is energized such that energization of the core causes movement of the movable member. The movable member may be a piece of paramagnetic material such as steel, or a stack of laminations of such materials that interacts with the energized core in a manner similar to the interaction between the rotor and stator of a reluctance machine. Alternately, the movable member may include one or more permanent magnets (or electromagnets or even induction coils) that interact with the energized core in a manner similar to the interaction between the rotor and stator of a permanent magnetic machine. While the following discussion is in the context of one or more particular electromagnetic systems 15, it will be understood by those of ordinary skill in the art that the flux control system 10 described may be used with a number of electromagnetic systems 15 and that the discussion herein is for purposes of illustrating and explaining the present invention and not for limiting the scope of the claims presented herein.

In FIG. 1, the electromagnetic system 15 is illustrated as having only a single phase coil. In applications where the electromagnetic system 15 includes a plurality of phase coils, the energization signal 14 may take the form of an energization vector that includes separate energization signals for each of the individual phase coils. In such applications, the flux command 13 may take the form of a flux command vector that includes separate flux command signals for each of the various phase coils. In such applications, the flux associated with each of the phase coils may be independently controlled. For purposes of clarity, the following discussion initially focuses on the structure and operation of the flux controller 12 in the context of a system having an electromagnetic system 15 including only a single phase coil. Those of ordinary skill in the art will appreciate that a multi-phase flux controller 12 can be constructed by simply duplicating the single-phase flux control system described herein.

Figure 2B:
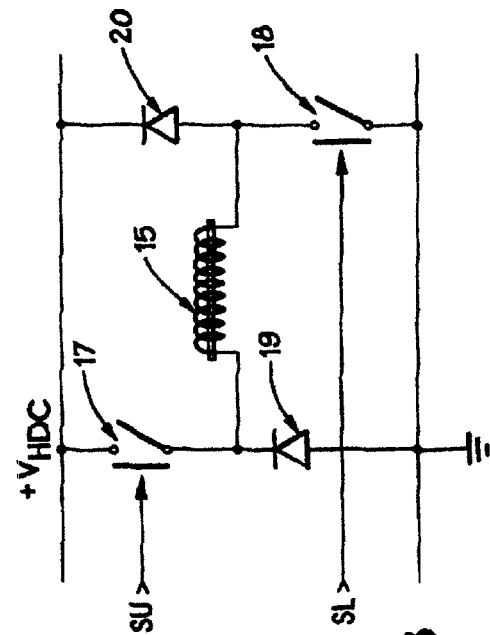

FIGS. 2A and 2B illustrate in greater detail one exemplary embodiment of flux control system 10. FIG. 2B illustrates an electric drive circuit for energizing the electromagnetic system 15 and FIG. 2A illustrates a control circuit that provides the control signals for the drive of FIG. 2B. The drive of FIG. 2B will be discussed first.

In the illustrated embodiment, the electromagnetic system 15 is illustrated as a single phase coil wound about a core. The phase coil defines two ends. The two ends of the phase coil are coupled across a high voltage DC bus ($V_{HDC}$) by a switching bridge comprising upper switching device 17, lower switching device 18, lower flyback diode 19 and upper flyback diode 20. Switching devices 17 and 18 may be any suitable controllable switching device such as a power MOSFET, BJT, BIFET, IGBT, MCT, standard FET or other suitable switching device that can be controlled through application of a control signal. In the illustrated embodiment, upper switching device 17 is controlled by control signal SU and lower switching device 18 is controlled by control signal SL. Flyback diodes 19 and 20 may be any device exhibiting diode-like (e.g., one-way) current characteristics.

In general, the switching signals SU and SL may be actuated to produce three switching conditions: (i) a first condition where both the upper and lower switching devices 17 and 18 are rendered conductive; (ii) a second condition where only one of the switching devices is rendered conductive; and (iii) a third condition where neither switching device is rendered conductive. When the switching signals SU and SL are in the first condition, such that both upper and lower switching devices 17 and 18 are rendered conductive, the phase coil 18 will be coupled across the $V_{HDC}$ bus, thus causing electric current to flow from the positive rail of the $V_{HDC}$ bus (+$V_{HDC}$) through the phase coil of electromagnetic system 15 to the ground of the $V_{HDC}$ bus. This current flow will cause energy to be transferred from the $V_{HDC}$ bus to the electromagnetic system 15, thus resulting in an increase in the flux of the system 15.

When the switching signals SU and SL are in the second condition, such that only one of the switching devices 17 or 18 is rendered conductive and the other is rendered non-conductive, the voltage applied across the phase coil of system 15 will be approximately zero. Under this second switching condition, any current in the phase coil will "freewheel" through the conductive switching device and one of the flyback diodes. For example, if there is current in the phase coil 15 and the signals SU and SL are such that the upper switching device 17 is rendered conductive and lower switching device 18 is non-conductive, the current in the phase coil will "freewheel" from the positive rail of the $V_{HDC}$ bus, through the phase coil, and back to the positive rail of the $V_{HDC}$ bus through upper flyback diode 20. The voltage applied across the phase coil in such circumstances will be the voltage drop across flyback diode 20 plus the voltage across device 17, or approximately zero voltage. A similar substantially zero-voltage condition will be obtained when lower switching device 18 is rendered conductive and upper switching device 17 is non-conductive. Under such circumstances, the current will freewheel through lower switching device 18 and lower flyback diode 19. When the current in the phase coil is in a freewheel condition, the flux established by the phase coil will remain substantially constant or decrease slightly. As such, the energy in the electromagnetic machine, and thus the flux, will remain substantially constant or decrease slightly.

When the switching signals SU and SL are in the third condition, such that both the upper and lower switching devices 17 and 18 are open, any current in the phase coil upon the initiation of this switching condition will continue to flow because the phase coil is an inductive element and the current cannot instantaneously drop to zero. Because the upper and lower switching devices 17 and 18 are non-conductive, however, the path for this current flow will be from the ground rail of the $V_{HDC}$ bus, through lower flyback diode 19, through the phase coil of the system 15, and to the positive rail of the $V_{HDC}$ bus through the upper flyback diode 20. Thus, in this third condition, the phase coil of system 15 will be coupled in a negative fashion across the $V_{HDC}$ bus such that the negative of the $V_{HDC}$ bus is applied across the phase winding. This application of the negative of the $V_{HDC}$ bus to the phase winding will tend to rapidly drive any flux and hence current in the phase winding down to zero. Thus, when the SU and SL signals are in the third condition, energy stored in the electromagnetic system 15 will be dissipated or returned to the $V_{HDC}$ bus and the energy in the system, and thus the flux, will drop.

Those of ordinary skill in the art will appreciate that the particular switching scheme illustrated in FIGS. 2A and 2B is but one such scheme that may be used to control the energization of a phase coil. Other switching schemes, for example, switching schemes utilizing a full H-bridge with four switching devices, may be used. In general, any switching arrangement may be used to implement the systems described herein that allow for the energization of the phase coil to be controlled such that the flux in the system 15 is increased, remains substantially constant, or is reduced.

In the embodiment of FIGS. 2A and 2B, the switching signals SU and SL are provided by flux controller 12. A schematic representation of an exemplary flux controller 12 is provided in FIG. 2A.

Referring to FIG. 2A, the illustrated flux controller 12 comprises a summing junction 25 that receives at a positive input a flux command signal 13 corresponding to the desired flux level, and at a negative input, a flux feedback signal from flux observer 16 that corresponds to the flux in the electromagnetic system 15. Summing junction 25 subtracts the flux feedback signal from the flux command 13 to produce an error signal that varies with the difference between the actual flux and the desired flux. When the flux error signal is positive, the flux command is greater than the flux feedback and it will be necessary to increase the flux in system 15 to bring the flux in line with the flux command. When the error signal is negative, the feedback flux is greater than the flux command, and it will be necessary to decrease the flux in the system 15 to bring the flux in the system in line with the flux command. The error signal from summing junction 25 is first amplified by amplifier 26 and then provided to an energization control circuit 21.

Energization control circuit 21 generates switching signals SU and SL to increase, decrease, or stabilize the flux in the electromagnet system 15 depending on the magnitude of the error signal Energization control circuit 21 may take many forms. For example, the controller may utilize a form of conventional pulse width or pulse frequency modulation to control the energization of the phase coil. Alternately, the energization control circuit 21 may take the form of a controller that will close both switching devices 17 and 18 when the error signal is positive; open both switching devices when the error signal is negative; and open one switching device and close the other when the error signal is zero. In accordance with one embodiment of phase controller 21, the switching signals SU and SL are controlled such that the error signal is driven to zero and allowed to freewheel until the error signal falls outside of a controlled hysteresis band. Such a time hysteretic controller is referred to herein as a "return to zero error" or RZE controlled. The described RZE controller is advantageous in that, for applications where the desired flux command is not rapidly changing and the available power is large enough to force tracking relatively quickly, it provides for rapid tracking of the flux command signal such that the "delay" in the flux reference tracking is less than one sampling period of the control system.

Figure 2C:
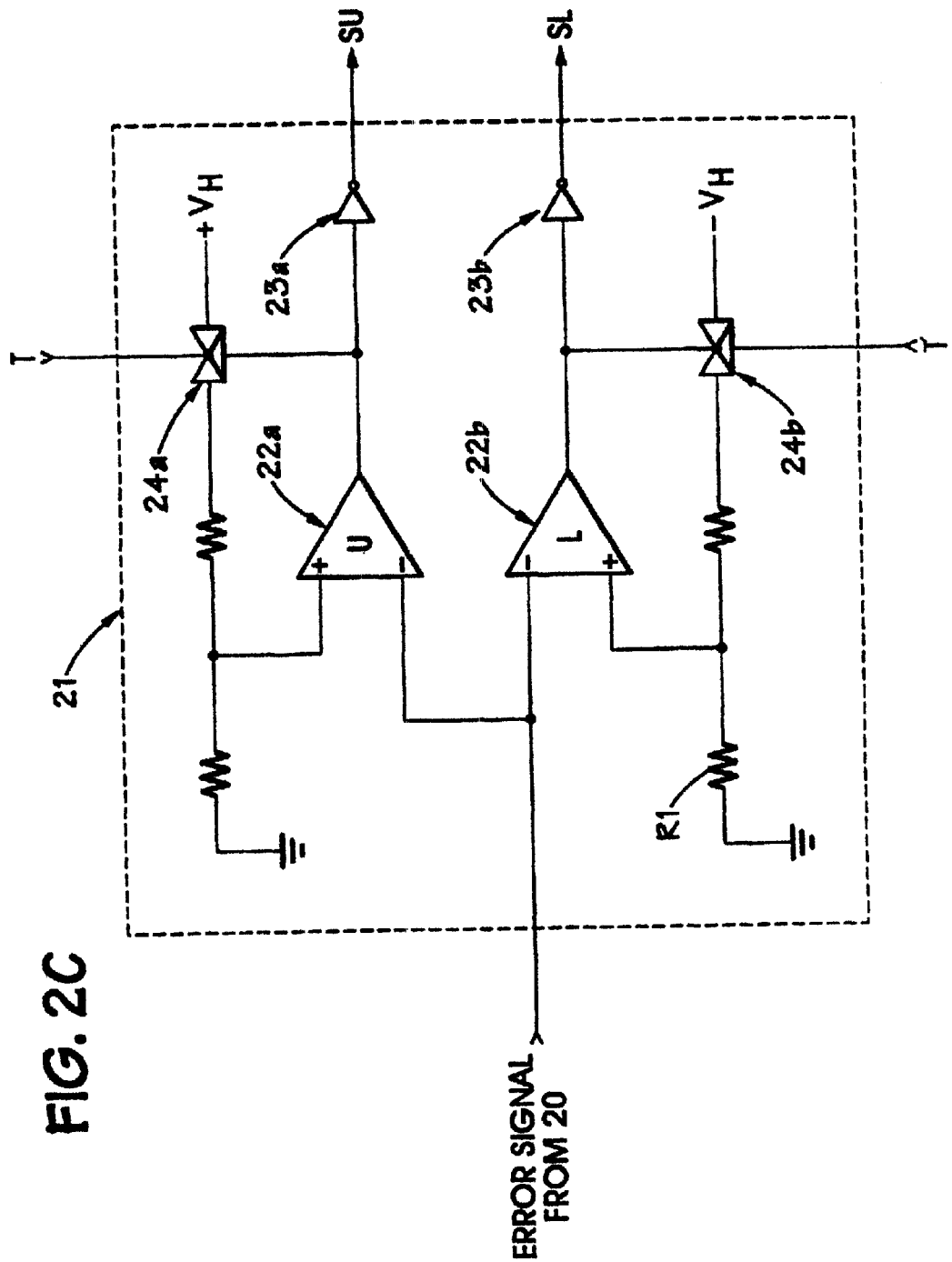
FIG. 2C illustrates an exemplary embodiment of a return to zero error control circuit.

A detailed schematic illustrating one embodiment of an RZE control circuit as described herein is illustrated in FIG. 2C. In general, the RZE controller 21 of FIG. 2C includes an upper comparator 22A and a lower comparator 22B that, together, establish two adjacent, asymmetric, hysteresis bands, centered about zero error. Each of the comparators handles only one polarity of error. The outputs from the two comparators are provided to inverters 23a and 23b and the outputs of the two inverters correspond to the SU and SL signals.

In general, when the magnitude of the error signals from amplifier 26 is large and positive (indicating that there is a need to increase the flux in the electromagnetic system) the outputs of both comparators 22a and 22b will be low. Assuming that the upper and lower switching devices 17 and 18 are of the type that are rendered conductive when positive voltage is applied to the control gates of the devices, the low outputs of the comparators 22a and 22b will be inverted by inverters 23a and 23b to produce high level SU and SL signals, thus placing the switching devices into the first switching conduction, such that the flux in the electromagnetic system 15 will tend to increase.

When the magnitude of the error signals from amplifier 26 is large and negative, the outputs of both comparators 22a and 22b will be high. These high signals will be inverted by inverters 23a and 23b, resulting in low voltage SU and SL signals that will cause both the upper and lower switching devices 17 and 18 to be rendered non-conductive, thus driving the current in the electromagnetic system (and, thus, the flux) down.

When the error signal from amplifier 26 is between large positive and large negative values, the status of switching signals SU and SL will depend on the magnitude of the error signal as it compares to the hysteresis voltages $+V_H$ and $-V_H$. In the illustrated embodiment, the application of the hysteresis voltages $+V_H$ and $-V_H$ is controlled by a trigger signal T such that, when T (24a) is logic high, the hysteresis voltage $+V_H$ is applied to the positive input of the comparator 22a and no hysteresis voltage is applied to lower comparator 22b and that when T (24b) is logic low, the hysteresis voltage $-V_H$ is applied to lower comparator 22b and no hysteresis voltage is applied to upper comparator 22a. As explained below, the trigger signal T changes state to control the application of the hysteresis voltages $+V_H/-V_H$ to the comparators 22a and 22b.

Assume that initial conditions exist where the trigger signal is logic high, and the flux in the electromagnetic system 15 is below the command flux such that the error signal from amplifier 26 is large positive and the outputs of comparators 22a and 22b are both low (resulting in logic high SU and SL signals). Under such conditions, the flux in the system 15 would begin to increase and, thus, the magnitude of the error signals from the amplifier 26 would begin to decrease. At some point, the magnitude of the error signal will begin to decrease from a large positive value towards zero. At the point where the error signal reaches and passes zero, the output of the lower comparator 22b (which has no hysteresis feedback) will change state, thus resulting in a transition of the SL signal from high to low. This will cause the switching arrangement to be placed into the second switching condition, such that the current in the electromagnetic system 15 will freewheel, resulting in a constant or slightly decreasing flux. This change in the state of the SU and SL signals will also cause a change in the state of the trigger signal T, thus resulting in the application of the $-V_H$ feedback voltage to the lower comparator. If the flux decreases to the point where the error signal from amplifier 26 now drops below the hysteresis value, the output of the lower comparator 22b will change states again, resulting in the SL signal changing from low to high and thus again applying power to the electromagnetic system 15 causing the flux in the system 15 to increase, and chopping will occur at error signals between $-V_H$ and zero.

Assume that a second set of initial conditions exists where the trigger signal is logic low, and the flux in the electromagnetic system 15 is above the command flux such that the error signal from amplifier 26 is a large negative and the outputs of comparators 22a and 22b are both high (resulting in logic low SU and SL signals). Under such conditions, the flux in the system 15 would begin to decrease and, thus, the magnitude of the error signal from amplifier 26 would begin to increase. At some point, the magnitude of the error signal will increase from a large negative value to zero. At the point where the error signal reaches and passes zero, the outputs of both the upper and lower comparators 22a and 22b will have changed state, thus resulting in a transition of both the SU and SL signals from logic low to logic high. This will cause the switching arrangement to be placed into the first switching condition, such that the current in the electromagnetic system 15 will increase, resulting in an increasing flux This change in the state of the SU and SL signals will also cause a change in the state of the trigger signal T, thus resulting in the application of the $+V_H$ feedback voltage to the upper comparator 22b. If the flux increases to the point where the error signal from amplifier 26 now exceeds the hysteresis value, the output of the upper comparator 22b will change states again, resulting in the SU signal changing from logic high to logic low. The SL signal will remain logic high, and thus, the switching arrangement will be placed into the freewheel condition causing the flux in the system 15 to remain constant or slightly decrease, and chopping will occur at error signals between zero and $+V_H$.

Thus, as described above, the hysteretic controller of FIG. 2C can control the flux in the electro-mechanical system 15 such that the flux: (i) is increased when the flux is below the desired level by a negative hysteresis amount; (ii) is decreased when the flux is above the desired flux level by a positive hysteresis amount; and (iii) allowed to remain substantially constant or decrease slightly when the flux is between the positive and negative hysteresis values. Additional details concerning the structure and operation of a hysteretic controller of the type described in connection with FIG. 2C may be found in U.S. Pat. No. 5,530,333 entitled "Control of an Inductive Load" by Michael J. Turner, issued on Jun. 25, 1996, the entirety of which is hereby incorporated by reference.

Those of ordinary skill in the art having the benefit of this disclosure will appreciate that the flux controller 21 of FIG. 2C is but one of a number of various flux controllers that may be used to implement the flux control system of FIG. 1.

Referring back to FIG. 1, it may be noted that in the illustrated flux control system 10, a flux feedback signal from flux observer 16 provides an indication of the level of flux in the electromagnetic system 15. The flux observer 16 may take the form of a flux sensor (e.g., a Gaussmeter); a Hall-effect probe such as a thin-film Hall device; a SQUID (superconducting quantum interference device); or a flux calculator using, e.g., the flux curved gap measurement of a given coil.

For systems in which the phase coils of electromagnetic system 10 are energized such that there are regular periods during which each phase coil experiences a zero flux condition (i.e., each coil has zero flux in it for a non-zero interval), the flux associated with each coil may be estimated by an open-loop flux observer that is reset to zero during a known zero flux interval for that phase coil. Such an open-loop flux observer may provide an indication of the flux through application of the known relationship between the flux associated with a coil and the voltage applied and current in that coil. That known relationship is reflected in Equation 1 below:

Flux=Integral of $[V\_phase\_n(t)--i\_phase\_n(t)*R]/Nt$   Equation 1 where $V\_phase\_n(t)$ is a signal corresponding to the phase coil voltage as a function of time; $i\_phase\_n(t)$ is a signal corresponding to the phase coil current as a function of time; R is a value corresponding to the phase coil resistance; and Nt is the number of turns comprising the phase coil.

A conventional open-loop integrator may be used to determine the approximate flux for each phase coil. To avoid drift problems, the open-loop flux integrator may be reset to zero during known zero flux conditions to minimize the build-up of uncertainty in the integrator over time. The reset of the integrator may occur either on a timed basis (where the zero flux conditions occur at known time intervals) or the integrator may be a simple clamped integrator. When the electromagnetic system 15 is energized such that only unipolar flux is established in the system, a clamped integrator that is clamped to zero may be used.

FIG. 3A generally illustrates an exemplary embodiment of an open-loop flux observer 30 that may be used in the control system 10 illustrated in FIG. 1. Referring to FIG. 3A, the exemplary open-loop flux observer comprises a clamped integrator circuit 31 that receives as its input a signal that is equal to the sum of four voltage input signals. The four voltage input signals that determine the input to the integrator circuit 31 are, from top-to-bottom in FIG. 3: (i) a +V INTCP voltage that corresponds to a constant voltage drop that is associated with the operating of the power switching devices 17 and 18; (ii) a voltage signal corresponding to the magnitude of the phase current i; (iii) a $+V_{DC}$ signal that is switchably coupled to the input of the inverter 31; and (iv) a $-V_{DC}$ signal that is switchably coupled to the input of the inverter 31. The $+V_{DC}$ and $-V_{DC}$ signals correspond to DC voltage levels that are related, in a known manner, to the positive and negative levels associated with the high voltage $V_{HDC}$ that is applied to the phase coil of system 15. Typically, the $+V_{DC}$ and $-V_{DC}$ signals will be proportionally less than the $+V_{HDC}$ and $-V_{HDC}$ signals associated with the high voltage DC bus.

In the embodiment of FIG. 3A, the $+V_{DC}$ signal is coupled to the input to integrator 31 via a controlled switch 32a that is rendered conductive when both the SU and SL signals are logic low (i.e., when the switching arrangement coupled to the phase coil is actuated such that the $+V_{HDC}$ bus is applied to the phase coil). In a similar manner, the $-V_{DC}$ signal is coupled to the input to integrator 31 via a controlled switch 32b that is rendered conductive when both the SU and SL signals are logic high (i.e., when the switching arrangement coupled to the phase coil is actuated such that the $-V_{HDC}$ bus is applied to the phase coil). The output of the clamped integrator FIG. 31 is $-1*$ the flux (the signal is inverted). An amp with gain=$-1$ can be used at the output of the clamped integrator to see the flux estimate. The inversion of the flux estimate is taken advantage of at the flux controller error amplifier. The error amplifier is a summing amp with the flux ref and flux estimate as inputs resulting in K gain (flux ref–flux estimate) at its output.

Because of the known relationship between the $+V_{DC}$ and $-V_{DC}$ signals and the $V_{HDC}$ bus, the voltage appearing at the input to the integrator 31 will correspond directly to the voltage that is applied to the phase coil. As such, an integration of the input voltage applied to an integrator will yield a signal that directly corresponds to the flux in the electromagnetic system 15. The circuit shown has an output of flux estimate clamped $>0$.

The use of switching devices 32a and 32b and the $+V_{DC}$ and $-V_{DC}$ signals to provide a signal representing the actual voltage applied to the phase coil is believed to be beneficial because the magnitude of the actual DC bus value is typically relative high (on the order of several hundred volts or more). As such, it would take large and costly components to directly integrate the relatively high voltages that are applied to the phase coil. By using the approach of FIG. 3A, less expensive, lower voltage devices may be used to provide an accurate indication of the flux in the system 15. Those of ordinary skill in the art having the benefit of this disclosure will appreciate that the actual voltages applied to the phase coil could be used to generate the input voltage for integrator 31. Alternately, search coils using a proportion of the phase voltage could be used and integrated directly form the coil.

In the exemplary circuit of FIG. 3A, the phase current is applied to a resistor 33 to provide a voltage signal that is intended to correct the input to integrator 31 for coil resistance. The value of resistor 33 used for the correction operation described above may be selected in a number of different ways. For a relatively simple correction factor, the value of resistor 33 may be selected as an unchanging value that represents an estimate of the phase coil resistance over the expected operation conditions of the associated electromagnetic system 15. Because R will vary with temperature and other operating factors, the selected R value will only be an approximate estimate of the actual R value for each phase windings. The current compensation can be improved if the R value is measured/estimated/calculated through the use of a thermal model and electrical measurements or techniques currently used to estimate actual resistances, such as DC voltage injection.

Referring back to FIG. 3A, it will be noted that, even through the drive switching, signals SU and SL are used to develop a low-voltage signal corresponding to the high-voltage signal actually applied to the phase coil, the current used to derive the current-correction factor is the actual phase current i not the switch currents. The actual phase current should be used to provide a more accurate current-correction factor since the switch current will not necessarily correspond to the phase current. In embodiments where the actual voltages applied to the phase coils are estimated though the use of drive switching signals and a low-voltage bus, the current-correction factor will have to be appropriately scaled prior to subtracting the current-correction factor from the voltage corresponding to the voltage applied to the phase coils.

While true integrators may be used to obtain an estimation of the flux in system 15 as described in connection with FIG. 3A, in many applications a more simplistic approach may be used. Particularly, when the flux in the system 15 is bi-polar zero mean (discontinuous or continuous), the flux of the system may be approximately estimated by simply low-pass filtering the voltage applied to the phase coil (V–iR) (or low-pass filtering a voltage that like the voltage applied to integrator 31 of FIG. 3A corresponds to the phase coil voltage). Such estimating of the flux of the system 15 through the use of low-pass filters is beneficial in certain applications because it may minimize the drift and random walk problems associated with certain integrators. FIG. 3B generally illustrates such an approach where a signal corresponding to the phase coil voltage (which may be corrected for the coil resistance) is applied to a low-pass filter 34 to provide a signal corresponding to the flux associated with the phase coil. The provided signal will also reflect a device voltage drop that always opposes the driving voltage and would change sign in applications involving bi-polar excitation currents.

When low-pass filters are used in place of integrators to estimate the flux of a given phase coil, the time constant of the filter should be higher than the period associated with the fundamental frequency of flux excitation for that coil. For example, if the phase coil is being energized at a fundamental frequency of 100 Hz (a period of 10 msec), the time constant for the low-pass filter for that phase coil should be approximately 50 msec. or greater. Given the approximately 5:1 ratio (or greater) of the filter time constant to the voltage fundamental frequency and the zero average voltage of each coil voltage, the low-pass filters will approximately integrate the coil voltage to provide a useful estimate of the coil fluxes.

The novel flux control system 10, and its various components, described above in connection with FIGS. 1–3B, may be beneficially used in a number of different applications. For example, the flux control system 10 may be used to control the flux in a rotating electric machine, such as a conventional induction motor, universal motor, a switched reluctance motor or a permanent magnet motor or hybrid motor (e.g., PM and SR). The novel flux control system described herein may also be used in various calibration devices in which the flux passing through a core must be controlled to a predetermined desirable level. Still further, the flux control system described herein may be used to control electromagnetic actuating devices wherein the movement of a movable member is controlled through controlling the flux passing through one or more paramagnetic cores.

Figure 4:
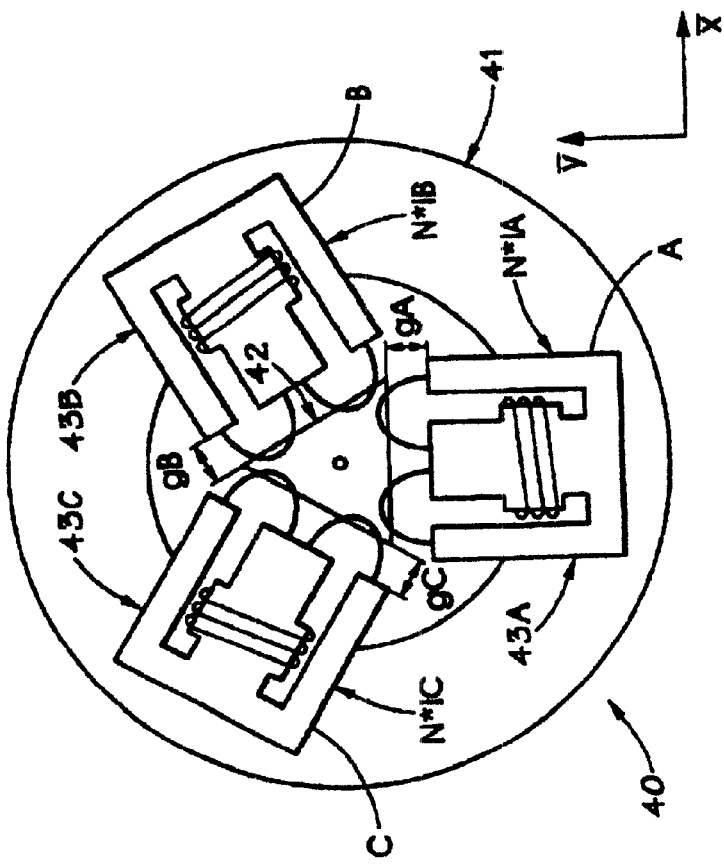
FIG. 4 generally illustrates an electromagnetic actuator that may be used with a novel flux control system of FIG. 1.

FIG. 4 generally illustrates an electromagnetic actuator 40 that may be used with the novel flux control system 10 described above. In general, the electromagnetic actuator 40 comprises a stationary outer assembly 41 and a movable member positioned within a bore defined by the stationary assembly 41. In the illustrated embodiment, the stationary outer assembly 41 comprises three, substantially identical, magnetically uncoupled flux generators comprising E-cores 43A, 43B and 43C. Each E-core comprises a stack of substantially identical laminations of a paramagnetic material (e.g., steel) that defines an E-shaped core having a central arm and two secondary arms, where the secondary arms are positioned on either side of the central arm. A yoke portion couples the central arm to the secondary anus. In the illustrated embodiment, for each E-core, the width of the central arm is greater than the width of the secondary arms. In one embodiment, for each E-core, the widths of the two secondary arms are substantially identical and are approximately one-half, or slightly less than one-half, of the width of the central arm. In general, the same construction techniques used to construct the stator cores of switched reluctance machines may be used to construct the E-cores 43A, 43B and 43C.

Positioned about the central arms of each of the E-cores 43A, 43B and 43C is a phase coil. In the illustrated embodiments, each of the phase coils A, B and C has the same number of turns and is formed in the same manner such that the three phase coils A, B and C are "symmetric."

Each phase coil is positioned about the central arm of its respective E-core such that, when electrical energy is applied to the phase coil, a current will be established in the phase coil that will establish a flux through the E-core. Approximations of the flux paths that will be established when the phase coils A, B and C of the E-cores 43A, 43B and 43C are provided by the curved lines in FIG. 4. As reflected in the figure, the flux paths for the three E-cores are substantially identical and the flux path of each E-core defines a central flux path through the central arm and two secondary flux paths through the secondary arms.

Referring again to FIG. 4, it may be noted that the arrangement of the three E-cores, 43A, 43B and 43C, is such that a generally triangular bore is defined by the E-cores. Positioned within this bore is a substantially triangular shaped movable member 42. In the illustrated embodiment, movable member 42 comprises a stack of substantially identical laminations of paramagnetic material (e.g., steel), although alternate embodiments are envisioned wherein the movable member includes permanent magnets (induction coils) or electromagnetics.

As those of ordinary skill in the art having the benefit of this disclosure will appreciate, in the electromagnetic actuator 40 of FIG. 4 energization of one of the phase coils of one of the E-cores will produce a force on the movable member tending to cause movement of the movable member towards the energized E-core. This is because whenever a phase coil is energized, the movable member will tend to move to a position where the reluctance of the energized phase coil is minimized. Thus, if the phase A coil associated with E-core 43A is energized, the movable member 42 will tend to move downwards towards the E-core 43A to minimize the reluctance of the energized A coil.

In the illustrated embodiment of FIG. 4, the three E-cores 43A, 43B and 43C are arranged such that movement of the movable member may be controlled along two degrees of freedom. For example, using the X, Y reference indicators of FIG. 4, the movable member may be controlled to move in both the positive and negative X direction (a first degree of freedom) and in the positive and negative Y direction (a second degree of freedom) as well as along any path defined by X and Y points. Thus, the use of the three E-cores allows for the control of the movable member along two degrees of freedom.

While the particular actuator of FIG. 4 allows for the control of the movable member along two degrees of freedom, those of ordinary skill in the art will appreciate that different numbers and arrangements of E-cores could be used to control movement along more or less degrees of freedom For example, if an actuator were desired that was capable of moving along only one degree of freedom (e.g., along the positive and negative X-axis only), then a substantially rectangular movable member could be used with only two E-cores. In general, when the movement of the movable member is caused by the tendency of the movable member to move to a position where the reluctance of an energized coil is minimized, to control N degrees of freedom, N+1 phase coils will be required.

In alternate embodiments where permanent magnets or electromagnets are positioned on the movable member (and, thus, where energization of one coil with either positive or negative current can produce both positive and negative forces along one degree of freedom), only N coils are required to control N degrees of freedom Referring back to the actuator 40 of FIG. 4, it may be noted that the flux paths associated with the three E-cores 43A, 43B and 43C are independent of one another. In other words, the three illustrated E-cores are "magnetically uncoupled." One advantage of this characteristic is that the flux in each of the E-cores may be controlled independently of the flux in the other E-cores. Further, in the embodiment of FIG. 4, the phase coils A, B and C associated with the three E-cores are separately energizable. In other words, the phase coils are "electrically uncoupled." As such, the phase currents in each phase coil can be controlled independently of the currents in the other phase coils. As explained in more detail below, this ability to independently control the flux and the current in each E-core independent of the flux and currents in the other E-cores is advantageous in many respects.

Referring back to FIG. 4, it may be shown that for each E-core, the force exerted on the movable member tending to move the member towards the energized E-core is proportional to the square of the flux passing through the central arm of the E-core and generally corresponds to the following Equation 2:

$$\frac{1}{2*\mu o*S}(flux^2)$$

where $\mu o$ is a constant reflective of the magnetic permeability of air, S is a value corresponding to the cross-sectional area of the central arm of the E-core that is parallel to a face of movable member 42, and flux is a signal corresponding the flux in the E-core of interest. The flux value may be provided by a flux observer of the type described above in connection with the description of flux observer 16.

Using matrix representations, the relationship between the fluxes in the three E-cores 43A, 43B and 43A and the forces exerted on the movable tending to move the movable member towards the E-cores 43A, 43B and 43C may be represented by Matrix Equation 1:

$$\begin{matrix} FA \\ FB \\ FC \end{matrix} = (1/[2*\mu o*S]) * \begin{bmatrix} 1 & 0 & 0 \\ 0 & 1 & 0 \\ 0 & 0 & 1 \end{bmatrix} * \begin{matrix} flux\_A^2 \\ flux\_B^2 \\ flux\_C^2 \end{matrix}$$

where FA, FB and FC represent the forces tending to move movable member 42 towards the central arms of the E-cores 43A, 43B and 43C, respectively, and flux A, flux B and flux C represent the actual or estimated fluxes in the corresponding E-cores.

Through simple geometric calculations, the forces that will be exerted on the movable member may be transformed from PA, FB and FC coordinates to forces in X, and Y coordinates using Matrix Equation 2:

$$\begin{matrix} FX \\ FY \end{matrix} = \begin{bmatrix} 0 & Sqrt(3)/2 & -Sqrt(3)/2 \\ -1 & 1/2 & 1/2 \end{bmatrix} * \begin{matrix} FA \\ FB \\ FC \end{matrix}; \; FA, FB, FC \geq 0$$

It may be appreciated from Matrix Equations Nos. 1 and 2 that for a given arbitrary desired force in terms of an appropriate reference frame (e.g., FX and FY), there are a significant number, indeed potentially an infinite number, of flux_A, flux_B and flux_C solutions that are capable of producing that desired force. Further, because of the uncoupled nature of the E-cores and phase coils of the actuator 40 of FIG. 4, there are no constraints that render any of these potentially infinite solutions illegal. As such, because of the nature of the illustrated actuator, the optimal flux_A, flux_B and flux_C solution can be selected. Once the desired flux solution is selected, it can be implemented though the use of flux control systems 10 of the type described above in connection with FIGS. 1–3A. In general, a separate flux control system 10 will be required to control the flux in each of the three E-cores 43A, 43B and 43C.

In general, one optimum "force-to-flux" solution or transformation for converting a desired arbitrary X, Y force to the flux_A, flux_B and flux_C values necessary to produce that force will be the solution that minimizes the net system flux and, thus, minimizes the amount of energy required to establish that flux. Such a solution will generally provide the most energy-efficient approach for establishing the desired force. Further, for many electromagnetic actuators, appropriate force-to-flux transformations will exist that require operation of the actuators such that discontinuous unipolar flux is established in the core or cores of the actuators. Such discontinuous flux operation allows for the use of the beneficial open-loop flux observers described above. One advantage of the novel electromagnetic actuator illustrated in FIG. 4 is that the optimal force-to-flux transformation requires operation of the actuator such that discontinuous unipolar flux is established in the three E-cores 43A, 43B and 43C during operation of the actuator.

The optimal force-to-flux transformation for a given system may be derived by: (i) establishing the relationship between the forces associated with the various actuator elements (e.g., the E-cores) and the fluxes associated with those actuator elements (e.g., determining the relationship reflected by Matrix Equation 1); (ii) establishing the relationship between the desired forces in a given reference frame (e.g., X, Y) and the forces associated with the various actuator elements (e.g., determining the relationship reflected by Matrix Equation 2); and (iii) solving for the actuator element fluxes in terms of the desired forces in the given reference frame and selecting the solution that is the minimum norm solution. While any minimum norm solution may be used, it has been found beneficial to select the force-to-flux solution or transformation that is the minimum Euclidean norm solution. The concept of a minimum Euclidean norm solution will be understood by those of ordinary skill in the art and is generally discussed at page 166 of *Modern Control Theory* (3rd ed.) by William L. Brogen.

Once the desired force-to-flux transformation for a given system is established, it can be implemented in practice through a force control system. One exemplary embodiment of such a force control system is illustrated in FIG. 5.

Figure 5:
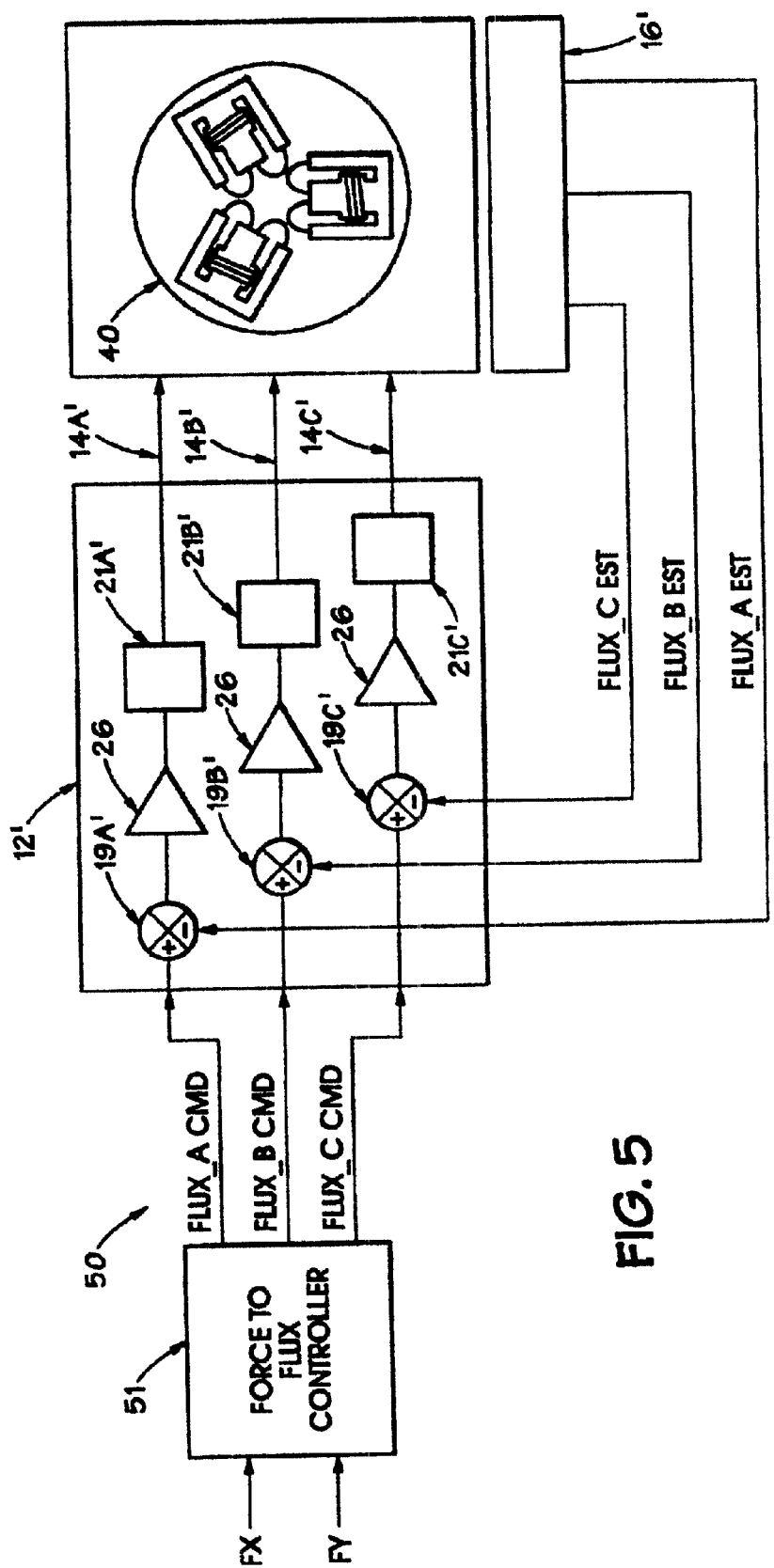
FIG. 5 generally illustrates one example of a force control system implementing desired force to flux transformation constructed according to certain teachings of the present invention.

Referring to FIG. 5, a force control system 50 is illustrated that includes an electromagnetic actuator 40, of the type illustrated in FIG. 4 that is energized by a flux controller 12' that receives as input desired flux commands, flux_A_cmd, flux_B_cmd, and flux_C_cmd and flux feedback signals flux_A_est, flux_B_est and flux_C_est. The flux estimate commands are provided by a flux estimator 16' that, on a per phase coil basis, may take the form of any of the flux observers described above in connection with flux observer 16 of FIG. 1. The flux controller 12', on a per-phase basis, compares the flux command to the flux estimate at a comparator 19', amplifies the error signal at amplifier 26' and generates appropriate phase coil energization signals through use of a energization control circuit 21.' The construction of controller 12' may—on a per-phase basis—follow the description provided above in connection with the flux controller 12 of FIG. 1. The drive circuitry required to energize the phase coils A, B and C is not illustrated in FIG. 5, although it will be apparent to those of ordinary skill in the art having the benefit of this disclosure.

Coupled to the flux controller 12' is a force-to-flux controller 51 that receives at its inputs desired force commands in a given reference frame (the X, Y reference frame in FIG. 5) and provides at its output appropriate flux commands in terms of flux_A_cmd, flux_B_cmd and flux_C_cmd. The flux commands are received and acted upon by the flux controller 12' in a manner similar to that previously described in connection with flux controller 12 of FIG. 1.

While the force-to-flux controller 51 may be constructed from exclusively analog circuits, in the illustrated embodiment of FIG. 5, force-to-flux controller 51 includes a digital circuit, such as a microprocessor or microcontroller, that is appropriately programmed to implement a desired force-to-flux transformation. The use of a digital circuit to construct the force-to-flux controller can be beneficial, in that, the force-to-flux transformation may be readily implemented through mathematical relationships that are easily implemented in digital circuitry and, in that, the use of digital circuitry allows for easy modification of the force-to-flux transformation. Moreover, when digital circuitry is used to implement the force-to-flux controller 51, the input force commands may be either digital or analog. If analog, some form of analog-to-digital conversion will be required to transform the force commands into appropriate digital values. Similarly, when a digital force-to-flux controller 51 is used, the desired flux commands—if digital—may be required to be converted to analog signals if an analog flux controller is used. The construction and programming of a digital force-to-flux controller 51 will be within the ability of one of ordinary skill in the art having the benefit of this disclosure.

FIGS. 6A–6D illustrate, through the use of a pseudo-code block, one exemplary form of a force-to flux controller 51 that may be implemented through the use of a programmed microcontroller or microprocessor. The force-to-flux transformation implemented by the controller exemplified by FIGS. 6A–6D corresponds to the minimum Euclidean norm solution for the actuator 40 of FIG. 4. It will be appreciated by those of ordinary skill in the art having the benefit of this disclosure that while the description of controller 51 is in terms of discrete pseudo-code function blocks, the controller may be implemented through one or more programmed processors, analog circuits, or a combination of the two.

Figure 6A:
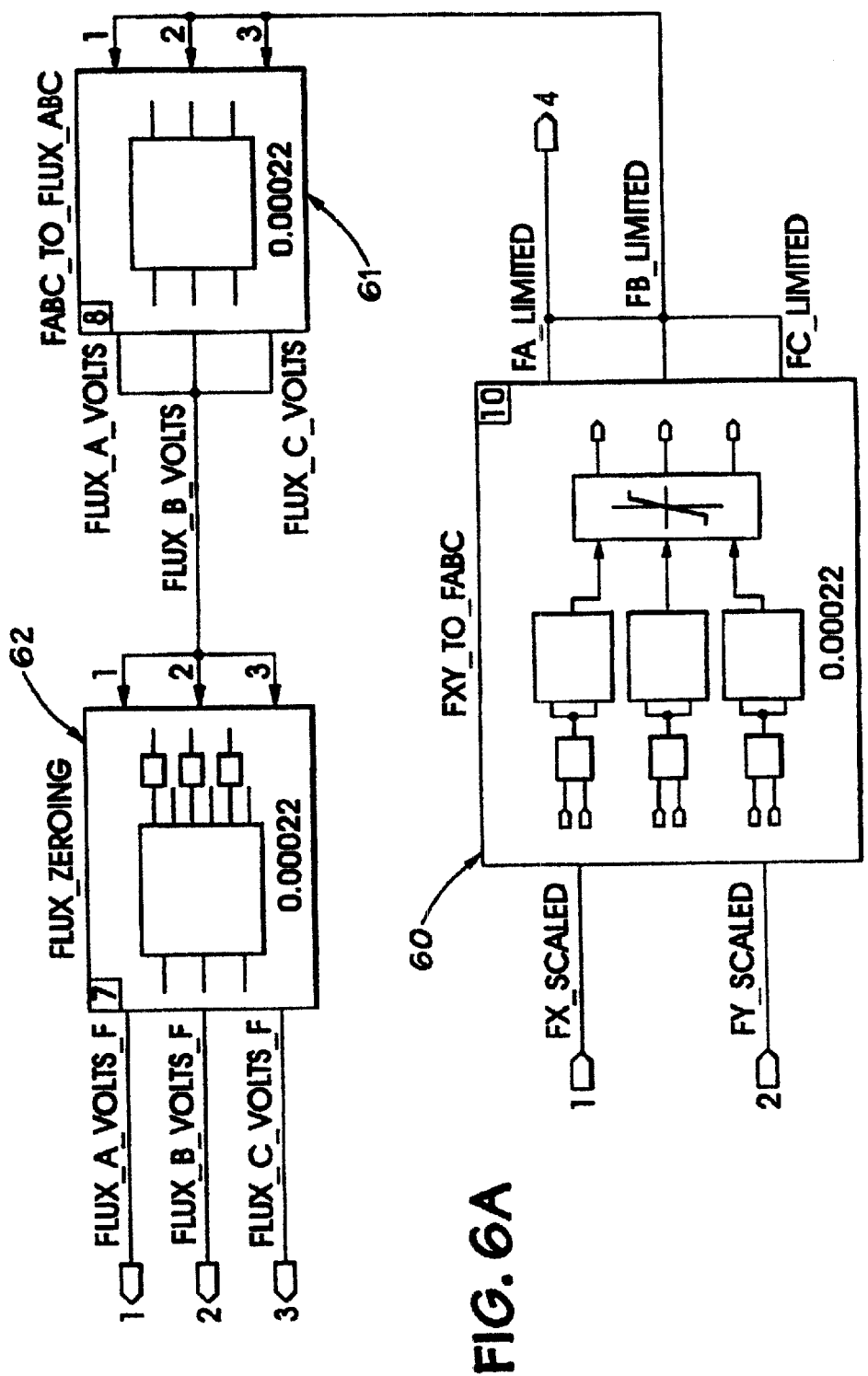
Figure 6C:
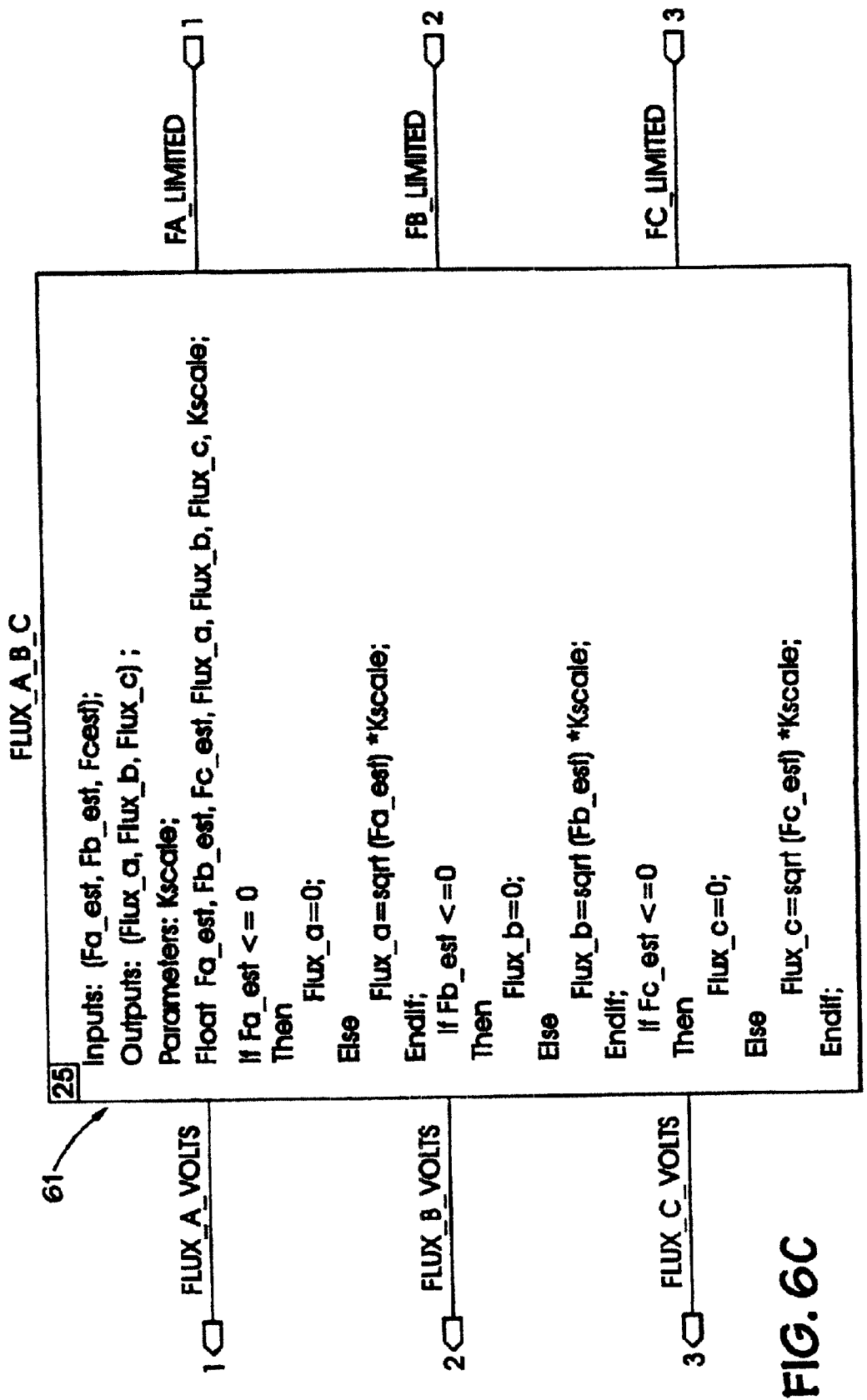

Referring to FIG. 6A, the general operation of force-to-flux controller 51 is divided into three high level function blocks 60, 61, and 62. In general, function block 60, labeled FXY_to_FABC, receives the desired force commands in terms of a given reference frame (here the XY reference frame) and converts the force commands into force commands that are commiserate with the physical arrangement of the actuator 40 (here the arrangement of E-cores 43A, 43B and 43C). The function block 61 receives the force commands in terms of the arrangement of actuator 40 and converts those force commands into flux commands that correspond to the phase coils of the actuator 40. Function block 62 is an optional function block not required for all implementations of controller 51 that receives the flux commands from block 61 and modifies the commands to ensure that each of the flux commands is zero for a finite time interval The use of the "flux_zeroing" block 62 ensures that the fluxes in actuator 40 are discontinuous, thus, allowed for the use of some of the beneficial forms of flux observers described above in connection with flux observer 16. Each function block will be discussed in more detail below.

FIGS. 6B1–6B4 illustrate the structure and operation of function block 60 that transforms the input force commands in terms of FX and FY into force commands in terms of the FA, FB and FC forces that can be directly generated by actuator 40. In the illustrated embodiment, the function block 60 first uses the FX and FY commands to derive six intermediary control signals F_a1, F_a2, F_b1, F_b2, F_c1, and F_c2 at function blocks 63a, 63b and 63c. Function blocks 63a–63c each essentially multiply the FX and FY commands by a 2×2 state matrix that, on a per-phase coil basis, implements a plus or minus inverse of each possible partition of Matrix Equation 2. The proper solution is then selected form the possible solutions. The 2×2 state matrices used by function blocks 63a–63c are illustrated, respectively, in FIGS. 6B2, 6B3 and 6B4. Each of function blocks 63a, 63b and 63c provides two output force values because the implementation of the inverse of Matrix Equation 2 will produce two solutions for each of FA, FB and FC. The appropriate solution for the system is selected by function blocks 64a, 64b and 64c.

Referring back to FIG. 6B1, each of function blocks 64a, 64b and 64c, receives as its inputs the two force solutions from its associated function block 63a, 63b or 63c. Because of the nature of the function blocks 63a, 63b and 63c, at least one of the force solutions will be positive. Function blocks 64a, 64b and 64c first eliminate all negative force solutions by adjusting the corresponding intermediary force command to zero and then select the greater of the two adjusted force commands. In the particular embodiment of FIG. 6B1, the selected force commands from function block 64a, 64b and 64c are limited to a peak value by function block 65 to produce the limited, per phase coil force commands Fa, Fb and Fc. Embodiments are envisioned wherein the limiting function implemented by block 65 is eliminated or is implemented as a function of some other system parameter.

Referring back to FIG. 6A, once the Fa, Fb and Fc commands are generated by function block 60 those commands are processed by function block 61 to produce the flux commands flux_A_volts, flux_B_volts, and flux_C_volts. Function block 61 is illustrated in greater detail in FIG. 6C. The operation of function block 61 represents a straightforward implementation of the bounded (>0) inverse of Matrix Equation 1 on a per phase coil basis. Specifically, any negative Fa, Fb and Fc commands are adjusted to zero since the actuator 40 cannot produce negative force. From the adjusted force commands, FA, FB and FC, the required per-phase coil flux is decided by taking the square root of the adjusted force command for a given phase multiplied by a constant value that corresponds to $$\sqrt{2\mu_{oS}}$$

See Equation 2, above. The outputs of function block 61 are the flux command signals flux_A_volts, flux_B_volts, and flux_C_volts.

Figure 6D:
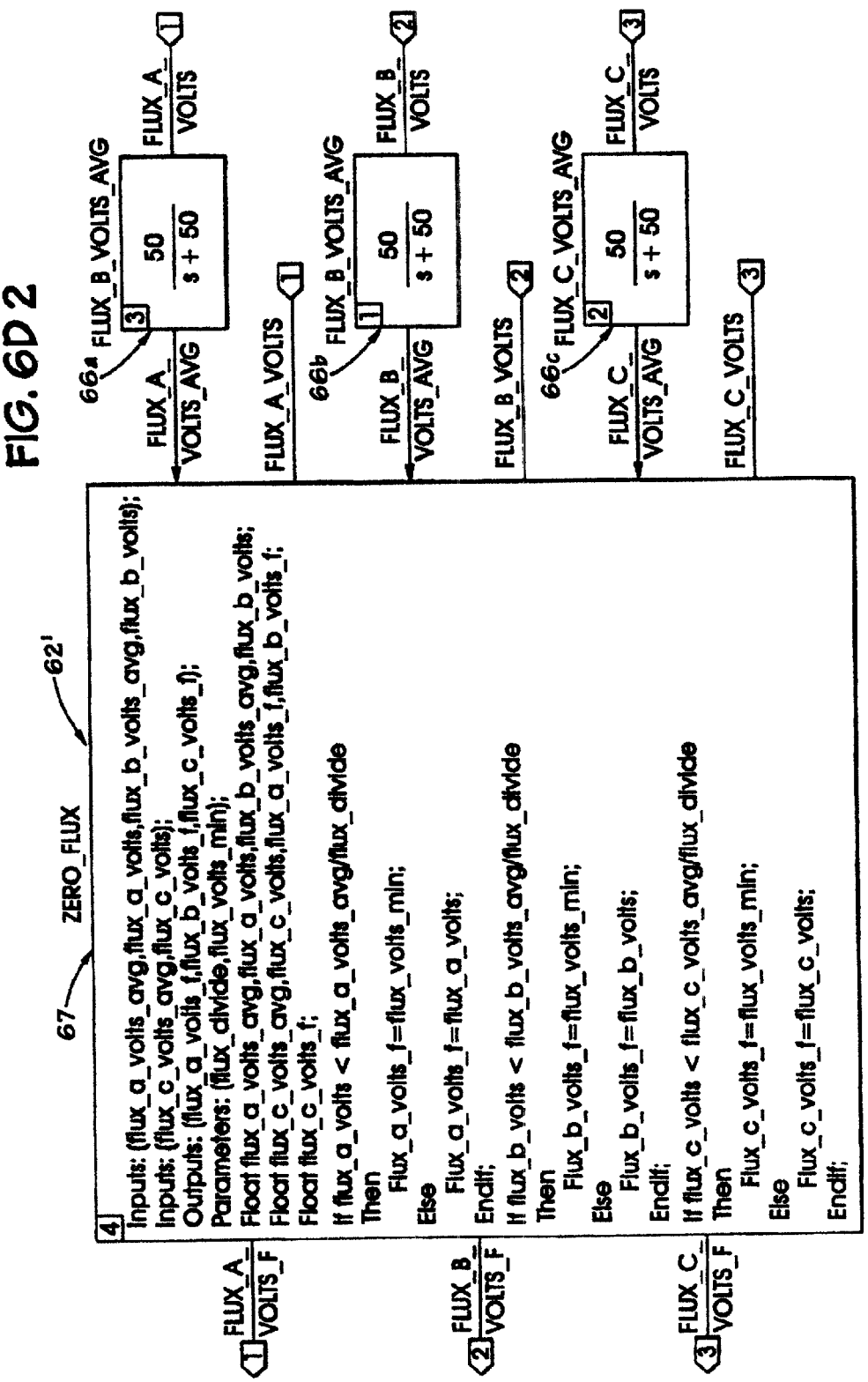

In the particular embodiment of FIG. 6A, the flux commands from function block 61 are applied as inputs to a flux zeroing function block 62 that ensures that the flux commands are zero for a finite time interval. The use of such a flux zeroing block is not required for most applications and is only essential for linear X motion. The precise form of function block 62 will vary slightly depending on whether the digital force-to-flux controller 51 is operating on a sampling basis or on a continuous basis. FIG. 6D1 illustrates an exemplary construction of function block 62 for a digital controller that samples the various control parameter values on a regular basis. FIG. 6D2 illustrates a similar function block 62' for a continuously operating controller 51.

Referring to both FIGS. 6D1 and 6D2, the function block 62 and 62' receive the flux commands flux_A_volts, flux_B_volts, and flux_C_volts and then, in function blocks 66a, 66b and 66c for FIG. 6D1 and function blocks 66a', 66b' and 66c' for FIG. 6D2, generate an average flux command signal that corresponds to a running average of the flux command signal over a given time interval. The different manner in which these average flux command values are determined constitutes the most significant difference between the sampling controller reflected in FIG. 6D1 and the continuous controller reflected in FIG. 6D2. Any form of digital or analog averaging filter with the appropriate lime constant could be used.

Both the actual flux commands and the averaged flux commands are provided to a function block 67. Function block 67 compares the actual flux commands to a fraction of the average flux commands and, if the actual flux command for a given phase is less than a fraction of the average flux command, adjusts the flux command to be a minimum flux value. If the actual flux command is greater than the fraction of the average flux command, then the actual flux command is not adjusted. Thus, the outputs from function block 67 constitute the flux command outputs flux_A_volts, flux_B_volts, and flux_C_volts from the force-to-flux controller 51. Referring to FIG. 5, these outputs are then processed by the flux controller 12' to control the flux in the actuator 40.

Those of ordinary skill in the art having the benefit of this disclosure will recognize that the particular force-to-flux transformation reflected in FIGS. 6A–6D is but one example of a force-to-flux transformation that may be implemented by a force-to-flux controller constructed according to certain teachings of this disclosure. For example, one alternate force-to-flux transformation may be based upon an angle described by the FX and FY force commands and the physical arrangement of the E-cores comprising actuator 40.

As noted above, the estimation of the flux in the system may be estimated by low-pass filtering, which is simpler than using true integrators, for example. Referring again to FIG. 5, in certain embodiments of the invention each of the flux commands output by the force to flux controller 51 is AC zero mean. In other words, every other flux command "pulse" is inverted. In such a system, a low pass filtering of the coil voltage minus coil current times coil resistance (Vn−In*Rn) is then used as the estimated phase flux linkage.

Figure 7A:
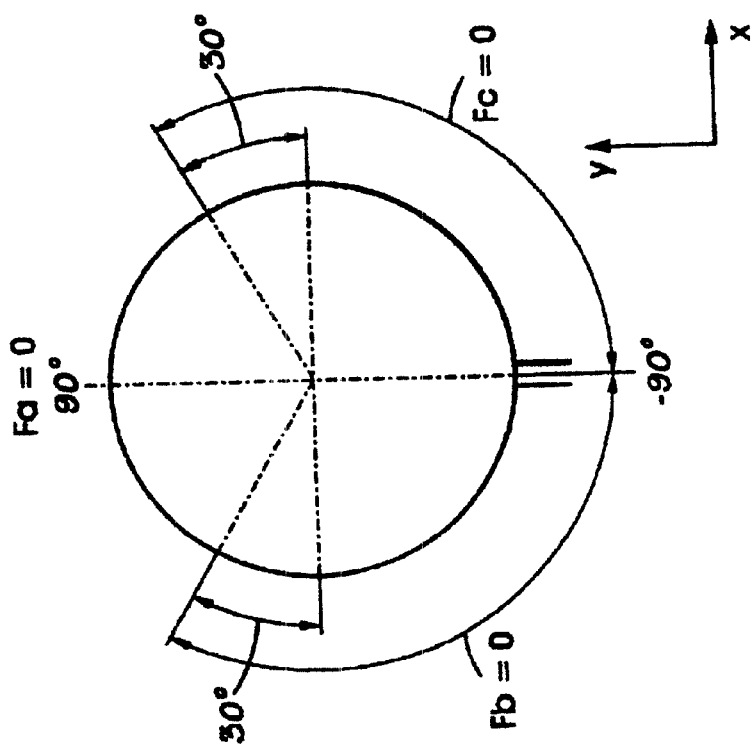
FIG. 7A generally illustrates a representation of the various phase coils of the actuator of FIG. 4 that should be energized to produce force for desired force factor in terms of X and Y.

FIG. 7A generally illustrates a representation of which of the phase coils of is actuator 40 should be energized to produce force for a desired force vector in terms of X and Y. Basically, FIG. 7A "windows" which coils will be on as a function of the direction of the desired force in terms of a vector comprising FX and FY components. In this force-to-flux transformation as in the previous, only two phase coils are energized at any given time. Referring to FIG. 7A, it may be noted that any commanded force corresponding to an angle of between 30 degrees and 150 degrees may be generated by a combination of FB and FC forces, with zero FA force. Similarly, any desired force having a direction between 150 degrees and −90 degrees can be generated from FA and FC forces with no FB force and any desired force having a vector direction between −90 degrees and 30 degrees can be generated with FA and FB forces and no FC forces.

FIG. 7B generally illustrates a function block for generating the appropriate flux commands to implement the force-to-flux transformation reflected by FIG. 7A. First, the illustrated function block calculates the appropriate force angle as a function of the FX and FY commands. Then, using that angle, the block determines which category of FIG. 7A the angle falls in and, based on that determination, determines the appropriate flux commands for the two phase coils that are to be energized for that category. These generated flux commands are then applied to the flux controller 12' and the system operates as previously described.

Figure 8A:
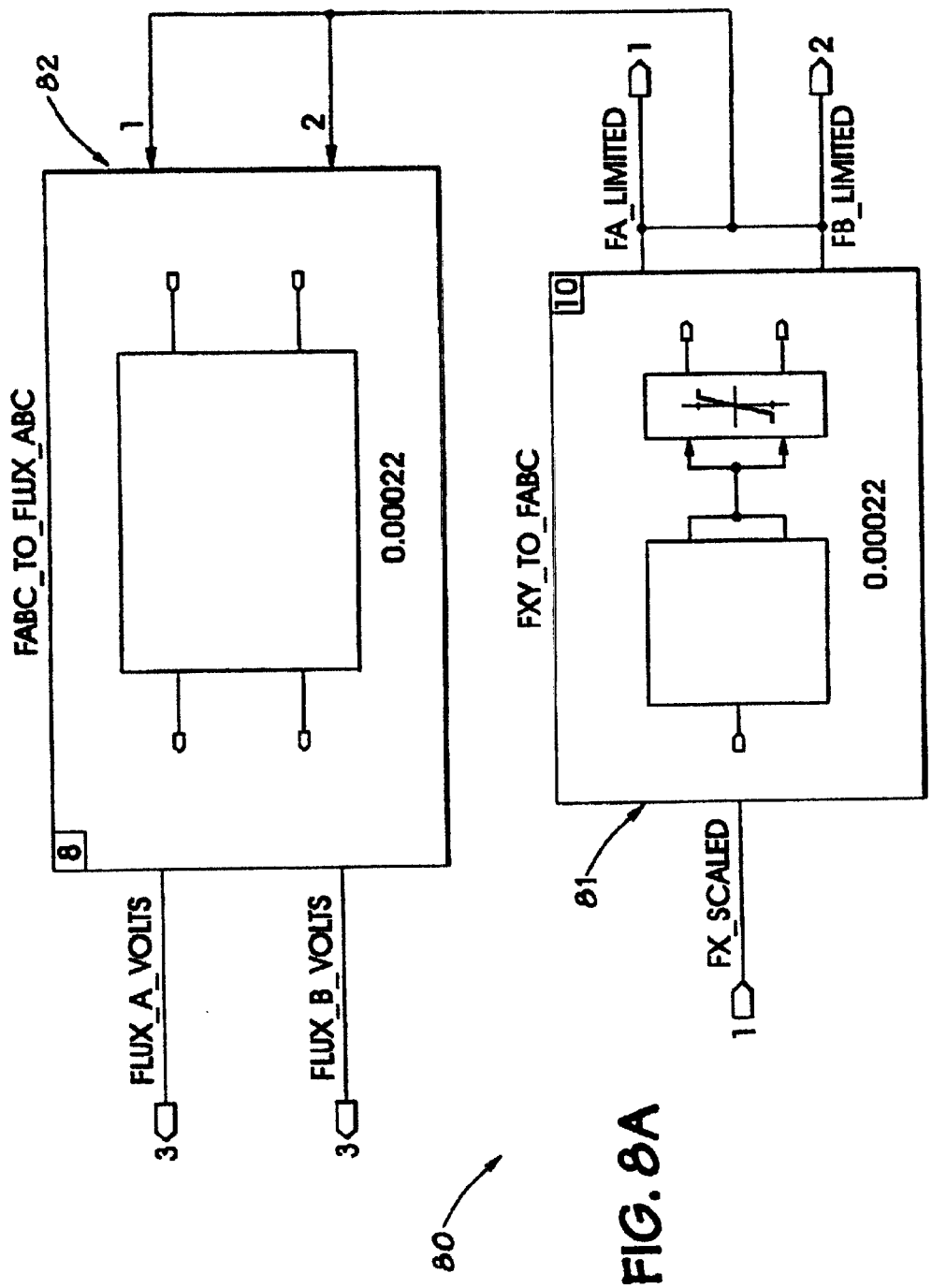
FIGS. 8A–8C generally illustrate function blocks for a force to flux controller that may be used to produce linear movement of a movable member.
Figure 8B:
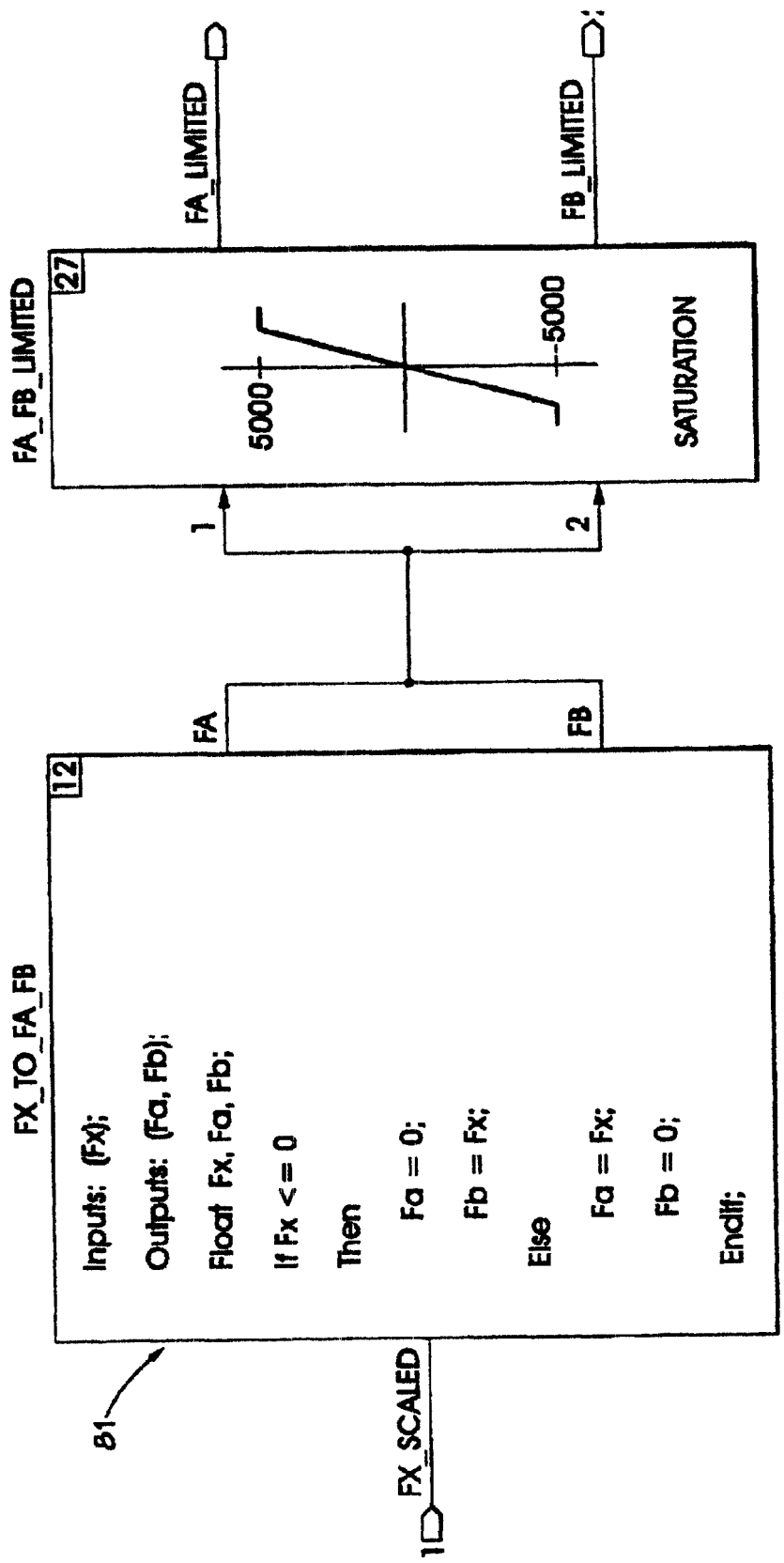
Figure 8C:
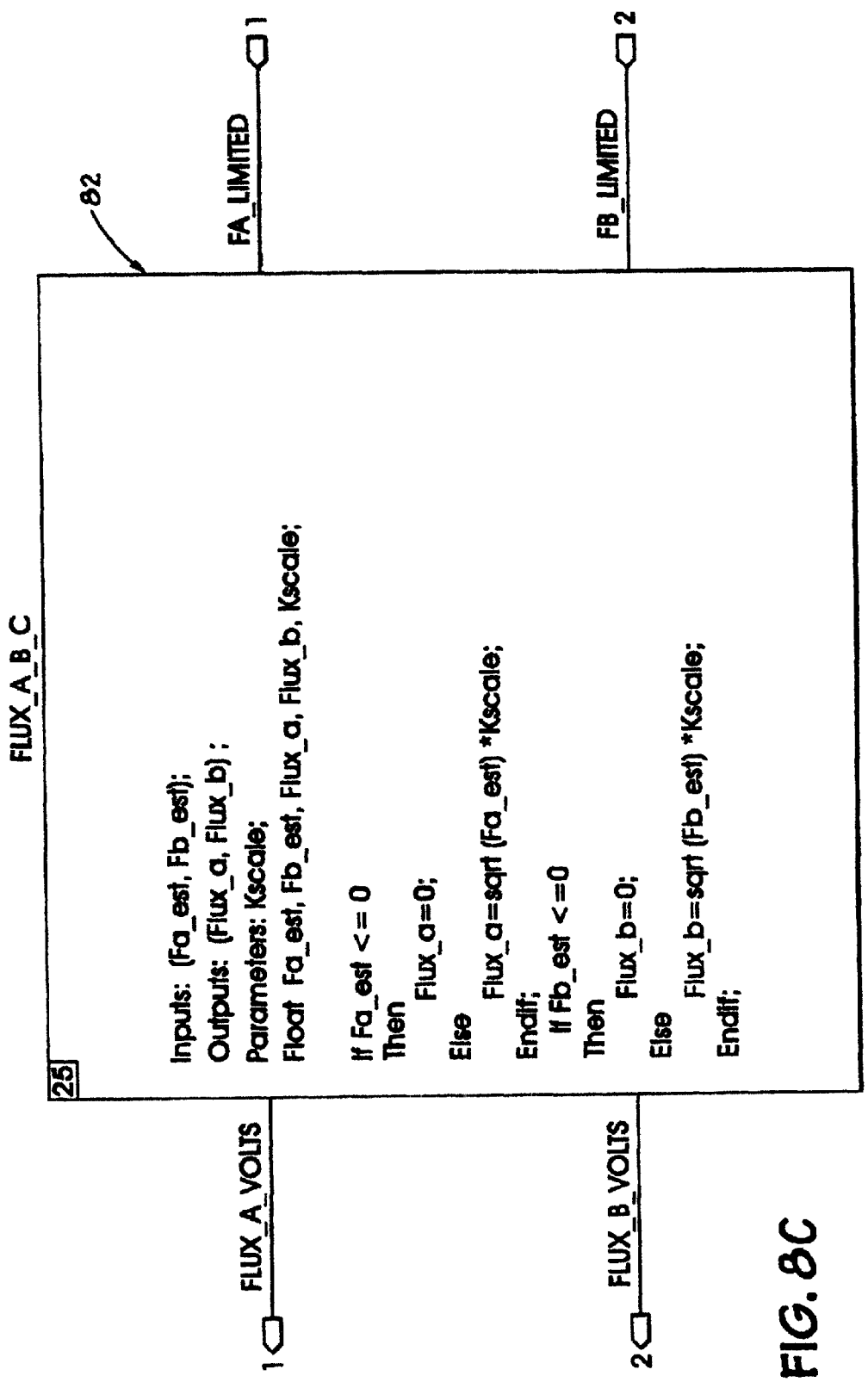

Still further alternate force-to-flux transformations are envisioned. For example, the particular force-to-flux transformations described above occurred in the context of an actuator 40 having three uncoupled E-cores that is designed to control movement of the movable member 42 along two degrees of freedom. Alternate embodiments are possible where the actuator comprises only two E-cores arranged for linear movement of the movable member. In such applications, the only input force command would be a FX (or FY command). Still further four E-cores could be used and FX and FY commands could be provided. FIGS. 8A–8C generally illustrate function blocks for a force-to-flux controller 80 that may be used in a two E-core linear system or with 4 coils, each set of two controlling one axis (degree of freedom).

Referring to FIG. 8A, the illustrated controller 80 receives a FX force command and generates as outputs flux commands for the two phase coils, designated as A and B. In general, a function block 81 first transforms the FX command into FA and FB force commands corresponding to the linear actuator, and a function block 82 transforms these force commands into appropriate flux commands flux_A_volts and flux_B_volts.

Details of the function block 81 are provided in FIG. 8B. In general, the function block 81 receives the FX command and, if the FX command is negative, assigns FA a zero value and FB a value equal to the magnitude of FX. Conversely, if FX is positive, the function block assigns FB a zero value and FA the absolute value of FX. The FA and FB commands are then limited to a peak value. The limited FA and FB commands are provided by function block 81 to function block 82 which determines the appropriate flux commands, flux_A_volts and flux_B_volts.

Function block 82 is illustrated in greater detail in FIG. 8C. Referring to FIG. 8C, the function block 82 basically sets the corresponding flux command if the force command is equal to or less than zero or calculates the appropriate flux command using the inverse of Equation 1. The flux commands flux_A_volts and flux_B_volts are then applied to an appropriate flux controller to energize the system.

The force control systems described above in connection with FIGS. 5–8C have several advantages not generally available from known systems for controlling an electromagnetic actuator to produce a desired force. For example, in known control systems, the control variable used to obtain a desired force is either the voltage or current applied to the phase coils. These systems are inherently limited because, if voltage control is used, the forces that will be produced will be a non-linear function of the controlled voltage. Such non-linear control problems are, in practice, difficult and costly to implement and do not allow for accommodation of changed operating conditions and/or manufacturing tolerances. If current control is used, the system is open-loop unstable and, for reasonably acceptable performance, the non-linear characteristics of the actuator core must be addressed. This results in the same non-linearity difficulties associated with voltage control systems.

The use of a flu control system as described herein significantly reduces or eliminates many of the difficulties associated with voltage or current control systems. This is because, when flux control is used, the force generated across each air gap of each actuator element is proportional to the square of the flux in the air gap. As such, non-linearities of the magnetic material and non-linearities in the electrical dynamics need not be considered to provide acceptable control. Thus, the force and flux control systems described herein can be used to implement simpler and more efficient control schemes that are easier and less costly to design and implement. Further, when coupled with the use of a simple open-loop flux observer as described herein, flux control can result in an extremely efficient and elegant system.

While the force control system of FIG. 5 allows for the efficient control of the force exerted on the movable member 42 of actuator 40, in many applications it is the movement of the movable member (e.g., the position/velocity or trajectory of the movable member)—not the forces exerted thereon—that are desired to be controlled. For such applications, the system of FIG. 5 can be enhanced to add a position/velocity control loop that generates the desired force commands FX and FY in such a manner that the movement of the movable member is controlled in a desired manner. The applications of a position/velocity control system of the type described above are numerous. For example, such a position/velocity control system may be used to construct electromagnetic bearings, as well as shaking and sifting apparatus. One specific application of such a position/velocity controller is in the field of orbital welders. Such welders typically operate by driving a first part to be welded (e.g., a thermoplastic part) with orbital motion relative to a second part to be welded such that relative movement of the first and second parts causes friction to heat the parts along the intersection thereof such that upon cessation of the relative motion, the parts will cool and be welded to one another.

In such welders, a first part is typically placed in a holder. A second part is similarly placed in a holder. The parts are then held in forced engagement with one another along an interface between the parts and a drive is provided for driving the second part along a predetermined repetitive path relative to the first part so as to frictionally heat the parts along the interface such that, upon termination of the repetitive motion, the parts are welded together.

Conventional orbital welders are capable of moving the first part to be welded such that the relative movement between the parts is restricted to either linear or orbital movement. These restrictions on the movement of the welder are limiting, in that, for many applications, different and arbitrary relative movement is desired so that the relative movement of the parts to be welded can closely match the shape of the parts. Such "shape-matching" can significantly increase the strength of the resultant weld. Through the use of the position/velocity control system described herein, a welding apparatus can be constructed that is capable of establishing arbitrary relative movement between parts to be welded, including linear movement, orbital movement, rotational movement, or any arbitrary movement of the part to be welded. Those of ordinary skill in the art will appreciate that the position/velocity control system described herein is but one example of a control system that may be constructed according to the teachings contained herein and that other characteristics and combination of characteristics (e.g., acceleration, velocity, position, or any combination thereof) may be controlled.

Figure 9:
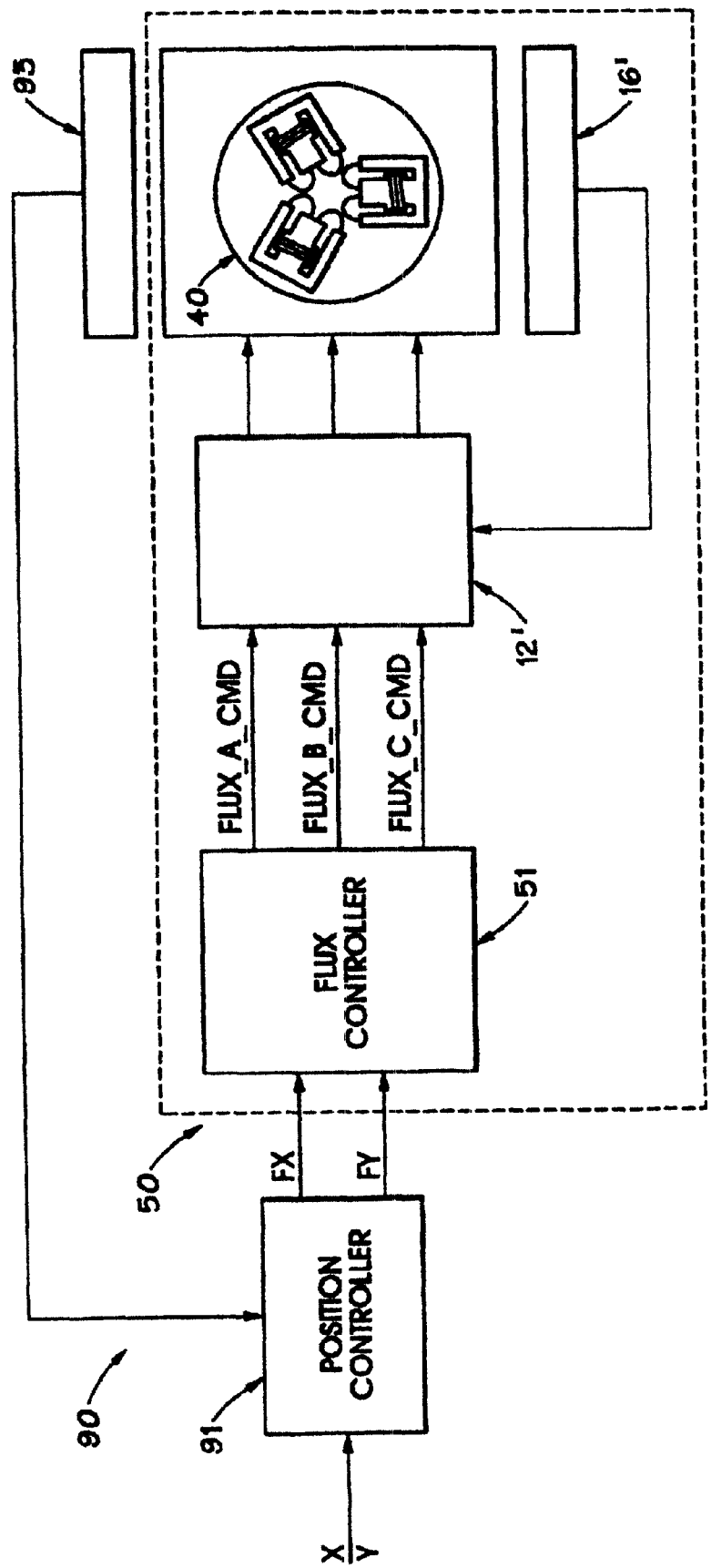
FIG. 9 provides a high-level block diagram of an exemplary position control system constructed according to certain teachings of the present invention. It may be used to construct a vibration welding apparatus.

FIG. 9 provides a high-level block diagram of an exemplary position/velocity control system 90 that may be used to construct a welding apparatus as described above. Although the following discussion is in the context of a welding apparatus, those of ordinary skill in the art having the benefit of this disclosure will appreciate that the disclosed position control system can be used to control the position/velocity of a movable member in other applications.

Referring to FIG. 9, the position/velocity control system 90 is identical in many respects to the force control system of FIG. 5. Specifically, within the dashed box 50, the position/velocity control system 90 includes all of the components of the force control system 50 of FIG. 5, all of which operate as described above in connection with FIG. 5. Because the actuator 40 of the system is part of a large vibration welding machine, the movable member of the actuator may be coupled to an appropriate welding horn or other appropriate welding tool (not illustrated).

In addition to including the components of the force control system 50, the position/velocity control 90 includes two additional main components. First, in the embodiment of FIG. 9, the force command signals FX and FY are generated by a position/velocity controller 91. Position/velocity controller 91 receives at its inputs: (i) position command signals 92 representing the desired position/velocity (or trajectory) of the movable member of actuator 40; and (ii) feedback signals from a position/velocity observer 93 that represent current position/velocity or trajectory information associated with the movable member of actuator 40. In general, position/velocity controller 91 compares the position/velocity commands with the position/velocity feedback information to produce position/velocity error signals and uses these position/velocity error signals to generate the appropriate force commands that will tend to bring the movable member to the position/velocity indicated by the position/velocity commands 92, or to move along the trajectory defined by trajectory commands 92, when trajectory commands are provided.

The position/velocity controller 91 may take many forms depending on the manner in which the desired position/ velocity and/or trajectory of the movable member is defined. In one embodiment, the position/velocity controller 91 may be constructed to control the position and velocity of the movable member of actuator 40 in terms of the position of the movable member in an X, Y reference frame and in terms of the velocity of the movable member in terms of X and Y. In such a system, the two input position commands provided to the position/velocity controller 91 will be in terms of X_cmd, X_dot_cmd (X velocity), Y_cmd and Y_dot_cmd (Y velocity) and the two feedback commands from the position/velocity observer 93 (described in more detail below) will be in terms of the actual or estimated X and Y positions and velocities of the movable member (e.g., X_act, X_dot_act, Y_act, Y_dot_act).

Like the force-to-flux controller 51 described above, the position/velocity controller 91 may be implemented through the use of a programmed digital processor, such as a microprocessor or a microcontroller. In certain applications, the position/velocity controller 91 may be implemented using the same programmed processor that issued to implement the force-to-flux controller. Analog implementations are also envisioned.

In operation, the position/velocity controller 91 receives the X, X_dot, Y, and Y_dot command signals from the position/velocity command generator and compares the command signals to feedback signals that represent the actual or estimated position and velocity of the movable member (X_at, X_dot_act, Y_act, Y_dot_act). As a result of this comparison of the instantaneous position and velocity command and feedback signals, four error signals (eX, eY, eX_dot, and eY_dot) are generated corresponding to the differences between the command signals and feedback signals. The four error signals may then be multiplied by appropriate control gains that may be optimized for each application. The X error signals (eX and eX_dot) are then added together and the Y signals (eY and eY_dot) are added together to produce FX and FY command signals required to position the movable member at the desired position and with the desired velocity. Before being provided to the force control system 50, the FX and FY force command may be band-pass filtered to reduce bias and reduce noise content. The filtered force command signals FX and FY are then provided to the force-to-flux controller 51 of the force control system 50. Depending on the parasitic modes of the system and other factors, the filter and filtering operation may or may not be necessary.

In one embodiment of the position/velocity controller 91, the feedback signals representing the X, Y position and velocity of the movable member of actuator 40 are generated through the use of a position/velocity observer 93 that includes conventional accelerometers that are positioned with respect to actuator 40 such that they can provide X and Y acceleration information to controller 91. In that embodiment, the position and velocity in terms of X and Y is derived by the position/velocity controller 91 using low-pass filters that are, for all practical purposes, at frequencies above 170 Hz; integrators. Using low-pass filters, instead of pure integrators, eliminates the drift and variance build-up problems of open-loop integrators. Exemplary function blocks for implementing such a position controller are provided in FIG. 10A.

Figure 10A:
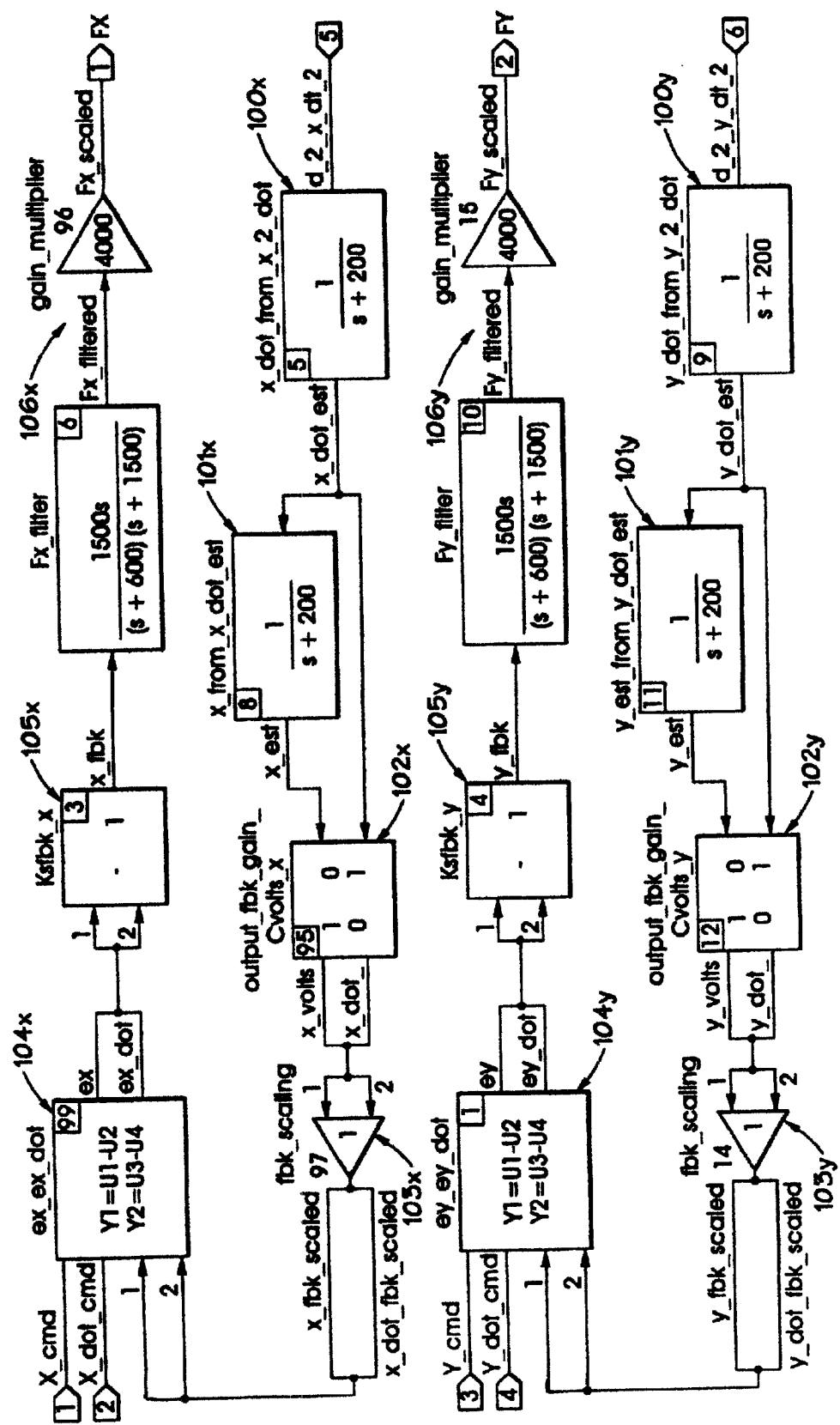
FIG. 10a illustrates generally function blocks that may be used to implement a position controller for use in the apparatus of FIG. 9.

Referring to FIG. 10A, the acceleration signals from the X (d_2_x_dt_2) and Y (d_2_y_dt_2) accelerometers of position/velocity observer 93 are applied as inputs to the function blocks designated as 100X and 100Y. When a digital controller 91 is used, any analog acceleration signals should be converted to digital values and the digital values should be applied as inputs to the controller 91.

Function blocks 100X and 100Y, respectively, include conventional mathematical transforms that transform the acceleration signals into estimations of the velocity of the movable member in terms of X and Y (e.g., X_dot_est and Y_dot_est). The X and Y velocity estimates are then applied, respectively, to function blocks 101X and 101Y that transform the velocity estimates into position/velocity estimates. The mathematical nature of the transform is illustrated in FIG. 10A. The X and Y velocity and position estimates are, respectively, applied as inputs to gain blocks 102X and 102Y and scaling blocks 103X and 103Y that adjust the estimate signals. The estimated position and velocity signals are then subtracted from the X and Y position and velocity command signals at function blocks 104X and 104Y to produce X and Y position and velocity error signals. The X and Y error signals are combined by function blocks 105X and 105Y to produce FX and FY signals that are modified by a low-pass filter and gain multiplier combinations 106X and 106Y to produce the FX and FY commands that are used to control the system as described above.

Figure 10B:
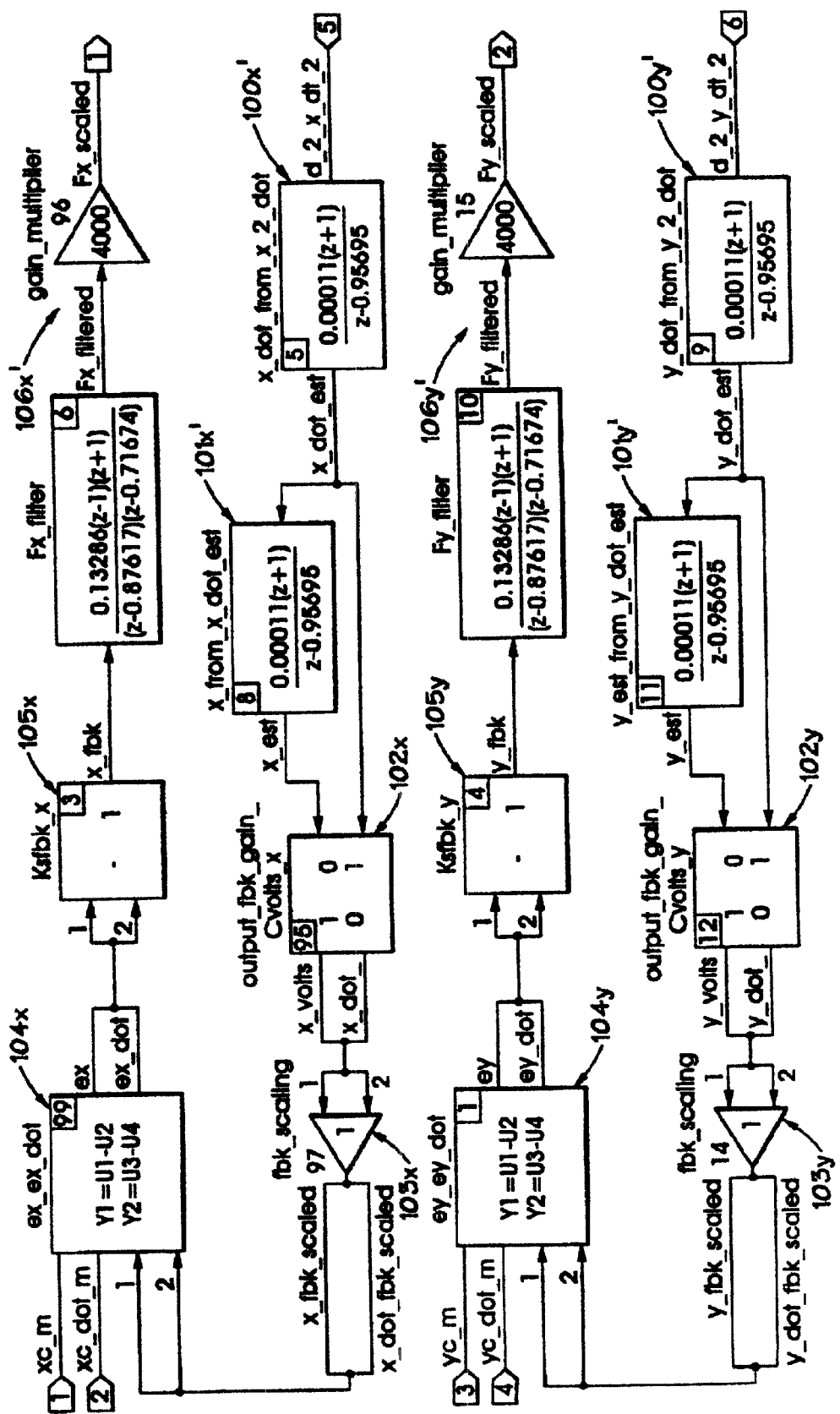
FIG. 10B illustrates function blocks similar to those of FIG. 10A that are adjusted to reflect a controller operating on a sampling basis.

In alternative embodiments, it may be necessary or desirable to only control velocity, rather than position and velocity. Referring to FIGS. 10A and 10B, in such a velocity control system, the gain terms Ksfbk_x and Ksfbk_y that are applied to the position error signals eX and eY in blocks 105X and 105Y are set to zero, thus removing the position control components from the FX and FY commands.

The exemplary position/velocity controller of FIG. 10A may be used in systems where the acceleration information from position/velocity observer 93 is continuously sampled and the FX and FY commands are continuously generated. Alternate embodiments are envisioned wherein the operation of controller 91 is not constant but operates on sampled information. Function blocks for such a sampling controller 91 are illustrated in FIG. 10B. In general, the controller 91 of FIG. 10B is similar to that of FIG. 10A except that the mathematical nature of the filters and transforms has been adjusted to reflect the sampling nature of the controller.

In the examples of FIGS. 10A and 10B, the position/velocity observer 93 comprises X and Y accelerometers and the position and velocity estimates for the movable member of actuator 40 are derived from the outputs of the accelerometers. Alternate embodiments are envisioned where conventional position sensors (e.g., proximity sensors) are used to sense the X and Y position directions. In such alternate embodiments, velocity information may be obtained using a reduced order observer, such as a standard deterministic observer, an integral error observer, or a Kalman Filter observer. In general, any type of full-order or reduced-order position/velocity observer 93 that can provide position and velocity information about the movable member of actuator 40 may be used to construct position/velocity observer 93. In alternate embodiments, pick up coils could be used with a position observer. Pick up coils measure velocity.

In one embodiment, position/velocity observer 93 may be eliminated, and the position and velocity information about the movable member of actuator 40 may be obtained from the electrical characteristics of actuator 40 itself In embodiments, where the phase coils of actuator 40 are energized such that, at all times or at given times, at least one of the phase coils is unenergized, the unenergized coil may be used as a proximity sensor. In such an embodiment, the unenergized phase coil may be excited with high frequency flux pulses and the resulting current may be detected. The magnitude of that current will have a straightforward algebraic relationship to the air gap magnitude of the flux. That air gap magnitude, when determined, will be completely deterministic of either the X or Y position.

Unfortunately, when the phase coils are required to provide a force vector that has a direction of between +30 degrees and +120 degrees (see FIG. 7A), only the X position can be determined from the unenergized coil In such instances, the X position may be determined from the estimated or actual flux and current information. The relationship between the estimated flux and current is, again, straightforward and algebraic. In systems that have four phase coils, the position of the movable member could be determined entirely through analysis of the electrical characteristics of the unenergized coils.

Because the force-to-flux transformation used in the position/velocity control system of FIG. 9 eliminates the non-linearity in the force production mechanism, the error signals generated and used by the position/velocity controller 91 have linear dynamics and the remainder of the control system may be designed using linear methods. Any conventional multi-input, multi-output linear control design methods can be used to tune the system and, therefore, set the response of the system, such as pole-placement, LQG, robust, etc. This ability to instantaneously control the position and the velocity of the movable member is highly beneficial in vibration welding applications.

In one embodiment, pole placement is used to tune the control system where the closed-loop poles of the system are placed by the four control gains resulting in a proportional control system. Although finite steady-state error and phase error between the X and Y commands will exist when this form of pole placement is used, the shape of the orbit of the movable member will not be affected.

Conventional vibration welding systems utilize an average-based control system in which the movable member of the system is controlled to move in either a circle or an ellipse and the average radius of the circle or ellipse is controlled. When asymmetric welding tools are used or disturbances of the movable member are encountered, such average control systems cannot compensate quickly enough to stabilize the system. In contrast, the novel control system disclosed herein instantaneously controls the X position, the Y position, the X velocity and the Y velocity of the movable member. Moreover, coupling of the X and Y motion due to tool asymmetries and load disturbances are rejected using instantaneous control When the position/velocity commands are provided in a stationary reference frame (e.g., X, Y) a slower average radius control loop may be placed around the instantaneous control loop to ensure zero steady-state error. Such an outer control loop is particularly beneficial to ensure that the movable member follows the desired trajectory, even under overload conditions. In general, the average radius control loop produces an average radius error that is provided as an input to a PI control law controller. The PI control law will then eliminate any steady-state error, although phase error between the X and Y commands will still exist. Since the average radius will be a DC variable, the PI control law controller will reject constant load disturbances. The output of the PI control law controller is then added to the command radius signal to increase the total radius command signals to the proportional instantaneous command signal.

In the particular embodiment illustrated in FIG. 9, the input position/velocity commands are provided in terms of the desired position and velocity of the movable member of actuator 40 in terms of X and Y position and velocity. In many vibration welding applications, the desired movement of the movable member will not correspond to arbitrary X and Y commands but will, instead, correspond to X and Y commands that will tend to produce elliptical movement of the movable member of actuator 40. For such applications, the X and Y position/velocity commands may be generated by a novel position/velocity command generator that generates the X and Y position and velocity commands required to produce the desired elliptical trajectory. Such a position/velocity command generator would have its outputs coupled to the input of position/velocity controller 91.

Figure 11A:
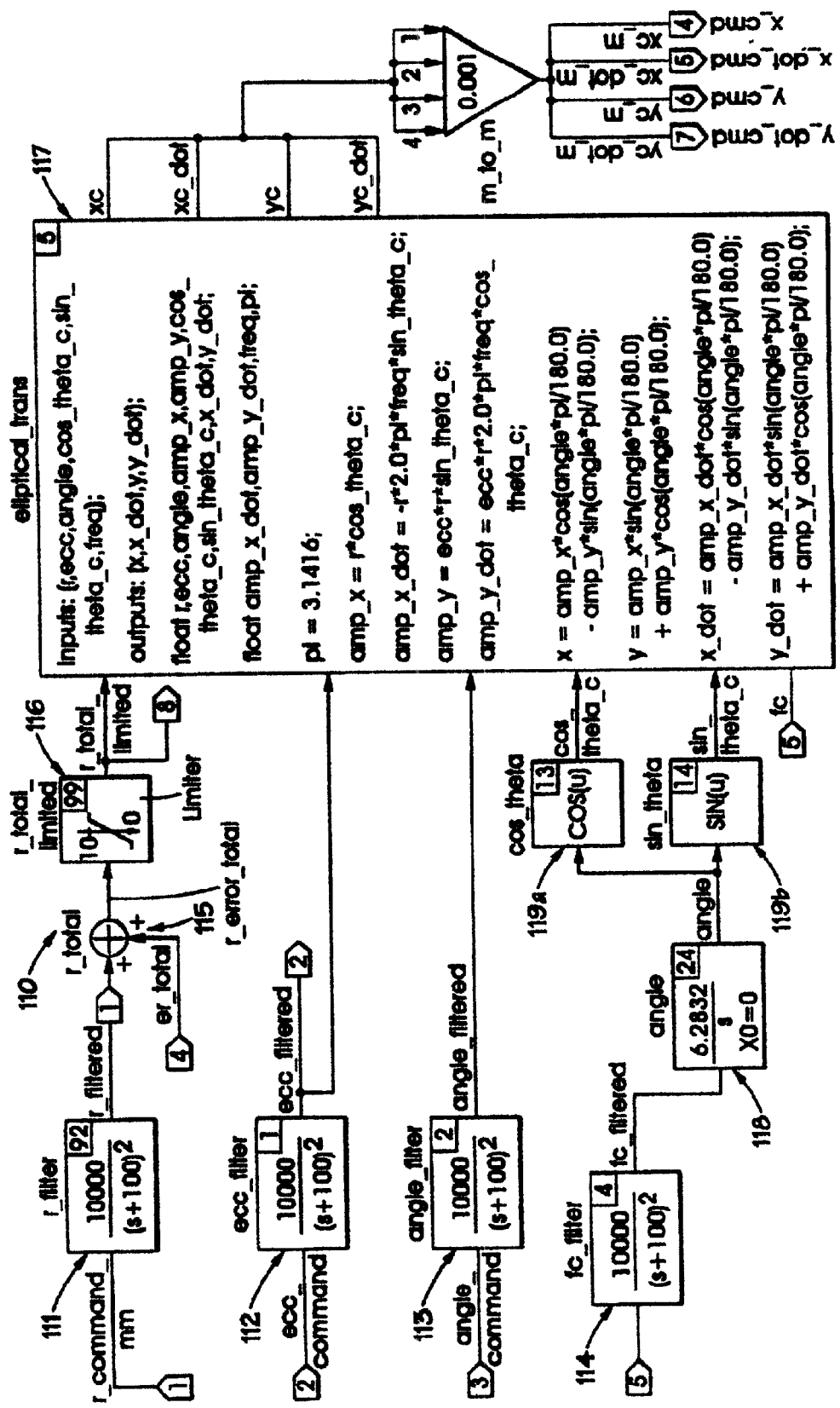
FIG. 11A generally illustrates an exemplary set of function blocks that may be used to implement a position command generator in accordance with certain teachings of the present invention

FIG. 11A generally illustrates one exemplary set of function blocks that may be used to implement an exemplary position/velocity command generator 110. Referring to the figure, position/velocity command generator 110 receives at its inputs command signals that define a desired elliptical orbit for the movable member of actuator 40. In particular, the command signals received by the position/velocity command generator 110 are: (i) a major axis command (r_command) that corresponds to the major axis of the desired elliptical orbit along the X axis; (ii) a major-to-minor axis ratio command or eccentricity command (ecc_command) that defines the ratio of the major axis along the X axis to the minor axis along the Y axis; (iii) an angle command (angle command) that defines the angular displacement angle of the major axis of the desired trajectory from the X axis; and (iv) an operating frequency command (fc) which defines the frequency at which the movable member traverses the desired elliptical path.

Referring to FIG. 11A, the various input commands described are filtered using the appropriate filters 111, 112, 113 and 114 illustrated in the figure. If an outer radius control loop is used as described above, the filtered radius command (r_filtered) may be modified using a radius error correction value at summing junction 115. The modified radius command (r_error_total) is then limited to fall within certain bounds at limiting block 116 and the limited r command is applied to an elliptical transformation block. The input operating frequency command is then converted, through function blocks 118, 119a and 119b into time changing angular values that are applied as inputs to the elliptical transform block 117. The other filtered input signals (ecc_filtered, angle_filtered) are applied directly to the elliptical transform block 117.

Elliptical transform block 117 receives the signals referenced above and generates the X and Y position and velocity commands (X_cmd, X_dot_cmd, Y_cmd, and Y_dot_cmd) using the mathematical relationships set forth in FIG. 11A.

FIG. 11A illustrates function blocks that may be used to implement a position/velocity command generator 110 that operates on a continuous basis in response to continuous input signals. FIG. 11B illustrates a similar position/velocity command generator 110' that operates on a sampling basis to produce the appropriate position/velocity commands in response to sampled input signals. As those of ordinary skill in the art having the benefit of this disclosure will appreciate, position/velocity command generator 110 is substantially identical to position/velocity command generator 110', with the exceptions being that the filters 111', 112', 113' and 114' of generator 110' vary from filters 111, 112, 113, and 114.

Those of ordinary skill in the art having the benefit of this disclosure will appreciate that position/velocity commands different from those described above could be applied to the position/velocity control system of FIG. 9. In general, any appropriate position/velocity command signals may be expanded to Fourier Series to describe any periodic waveforms that, in their limit, may be described as square waves. For example, the input X and Y position and velocity commands could be generated as a function of time according to the following relationships: X_cmd(t)=r*cos(omega*t); X_dot_cmd(t)=−r*omega*sin(omega*t); Y_cmd(t)=r*ecc*sin(omega*t); and Y_dot_cmd(t)=r*ecc*omega*cos(omega*t); where r is the major axis, ecc is the desired eccentricity, omega corresponds to the desired operating frequency and t is time.

Further, the desired elliptical trajectory described above could be made to match a "super ellipse" defined by ((X/A)^n+(Y/B)^n=r, where n is an integer>=2. Such a super ellipse trajectory could be traversed at an angular velocity of omega with Fourier Series of the command reference signals. The position/velocity control system would then attempt to track the position/velocity waveforms to the limit of the drives capabilities and band width.

Figure 12A:
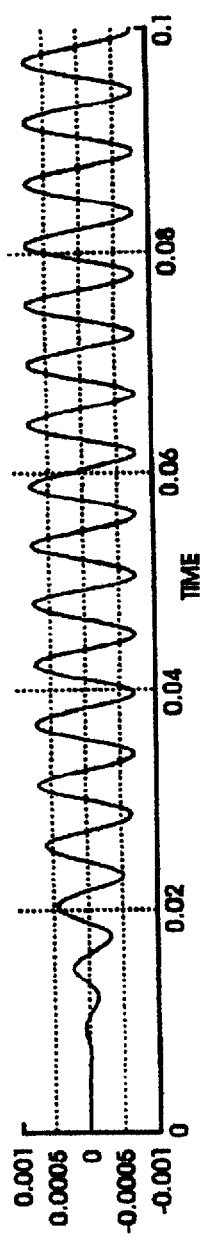
FIGS. 12A–12D generally illustrate the operation of a position controller of the type illustrated in FIG. 9 for various modes of operation.
Figure 12A:
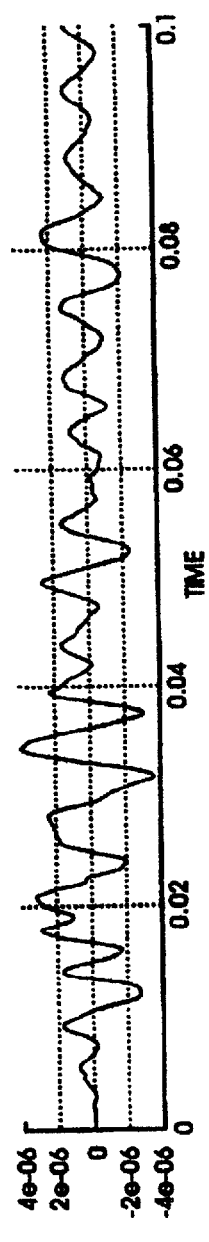
Figure 12A:
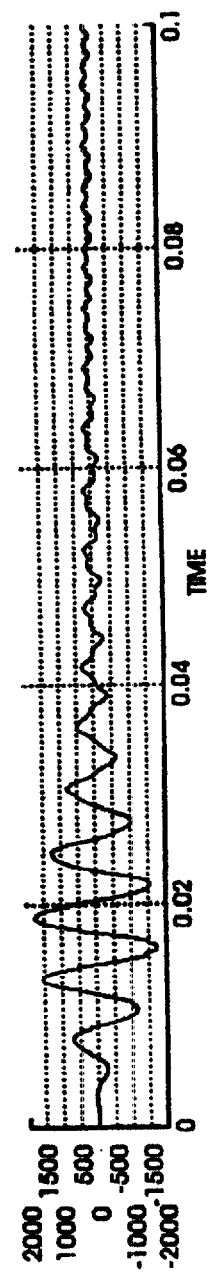
Figure 12A:
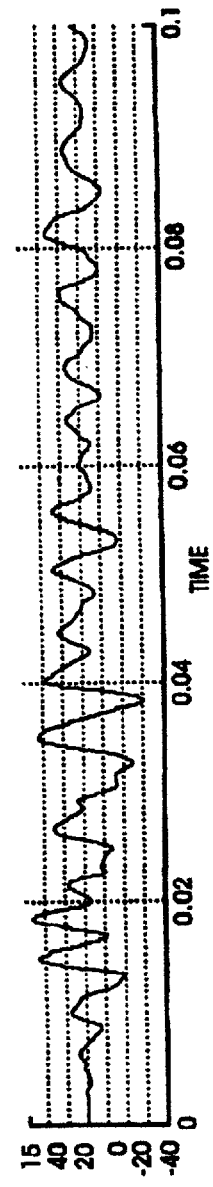
Figure 12A:
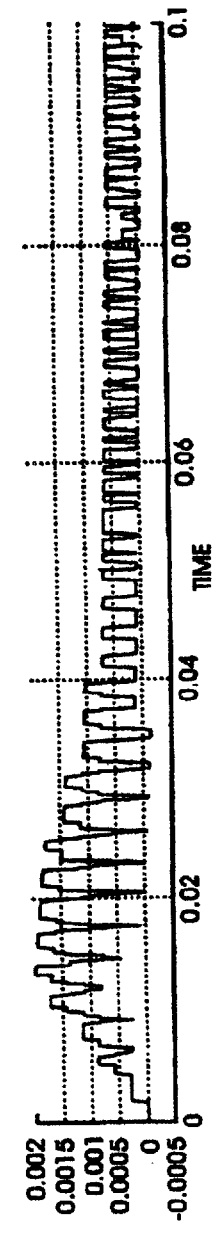
Figure 12A:
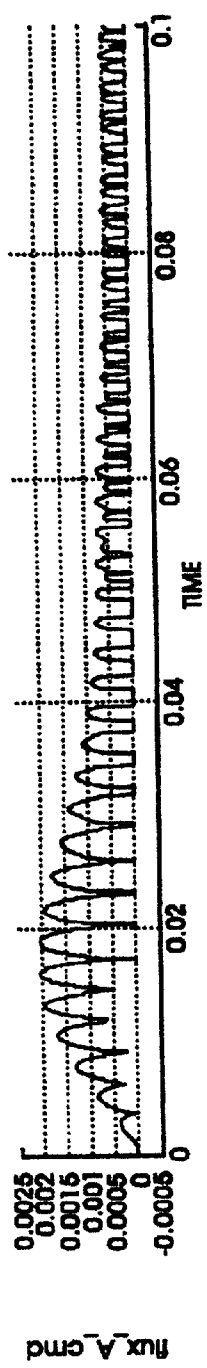
Figure 12A:
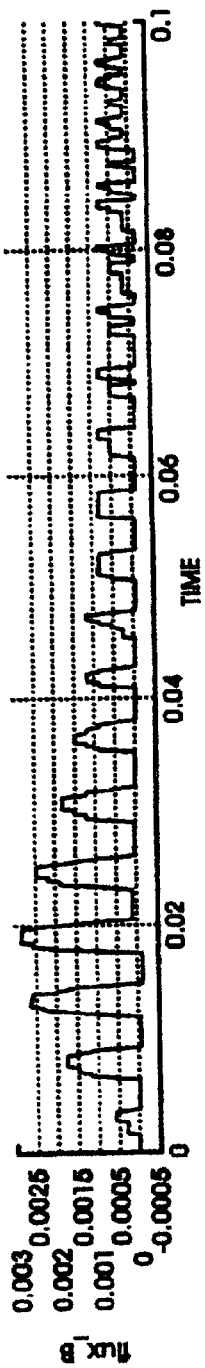
Figure 12A:
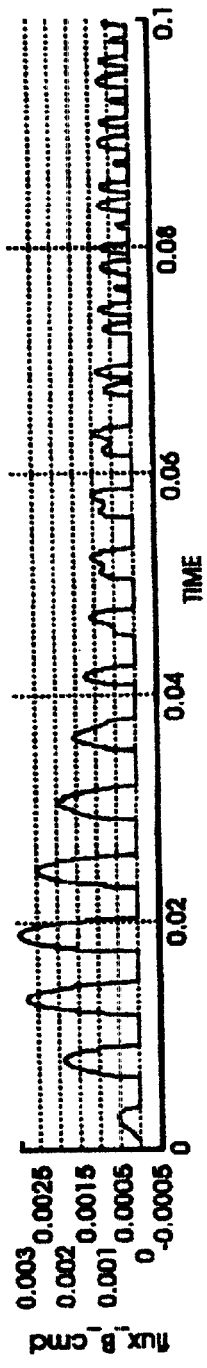
Figure 12A:
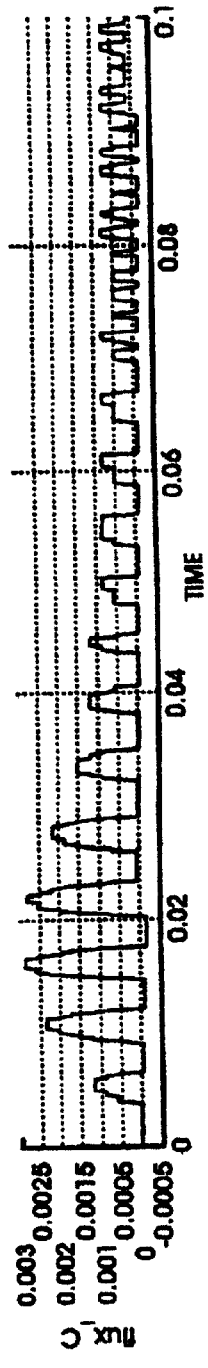
Figure 12A:
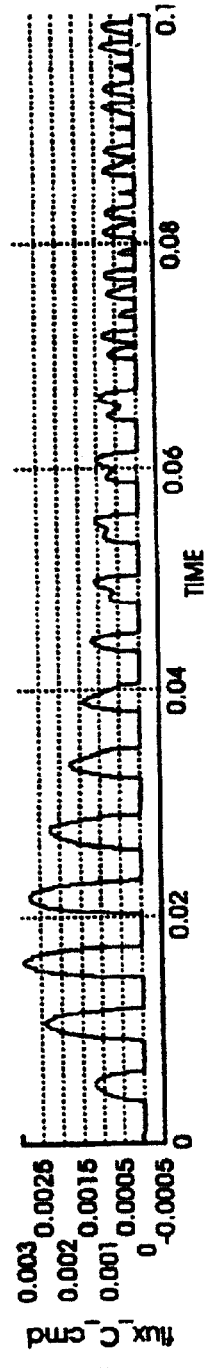
Figure 12B:
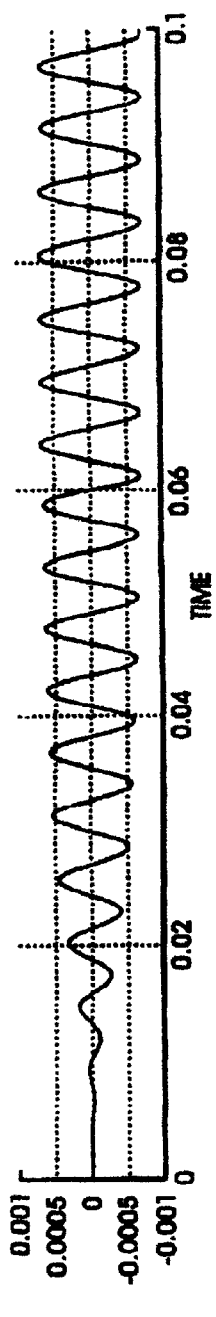
Figure 12B:
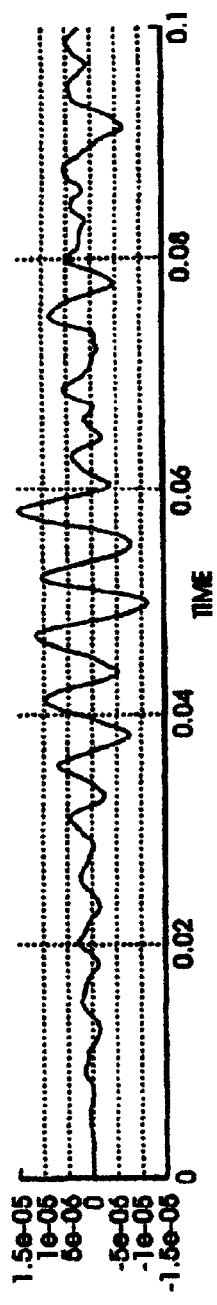
Figure 12B:
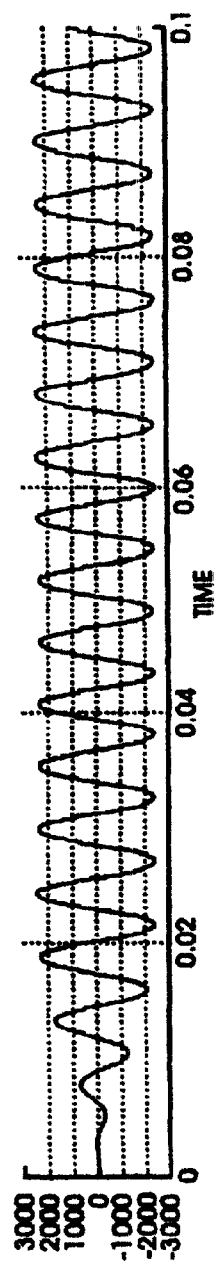
Figure 12B:
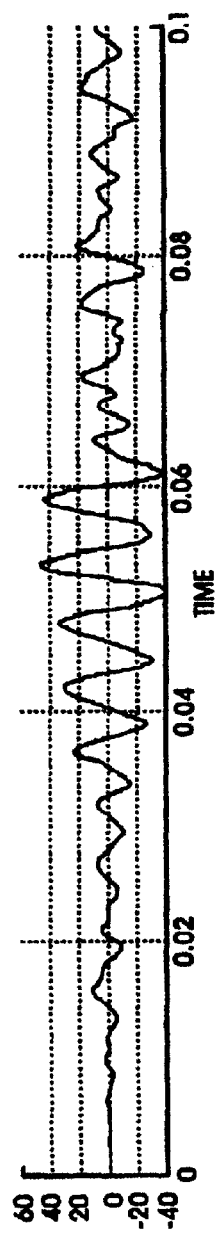
Figure 12B:
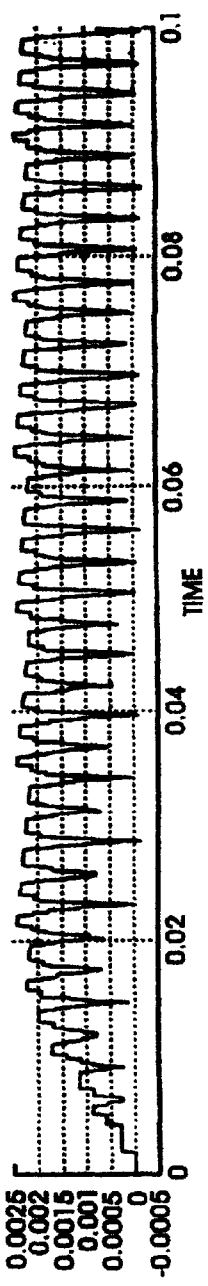
Figure 12B:
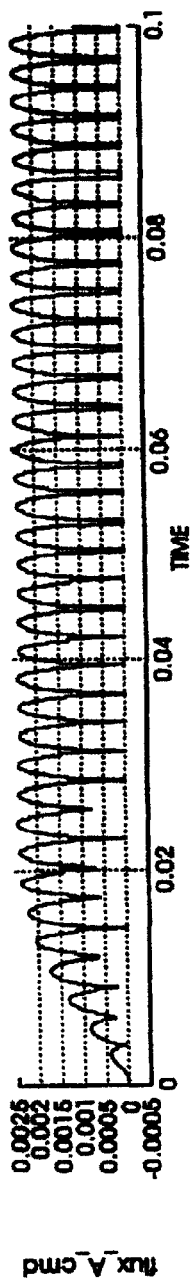
Figure 12B:
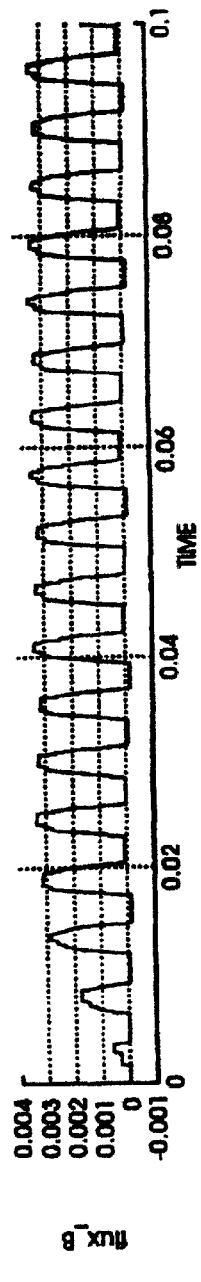
Figure 12B:
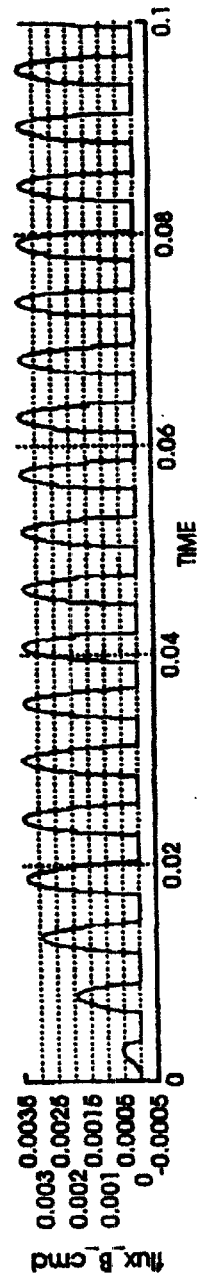
Figure 12B:
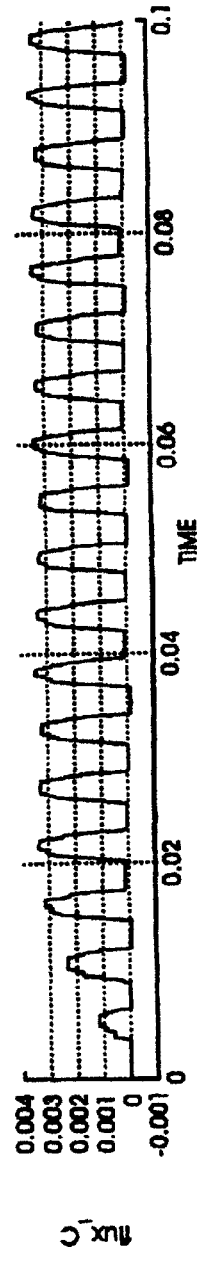
Figure 12B:
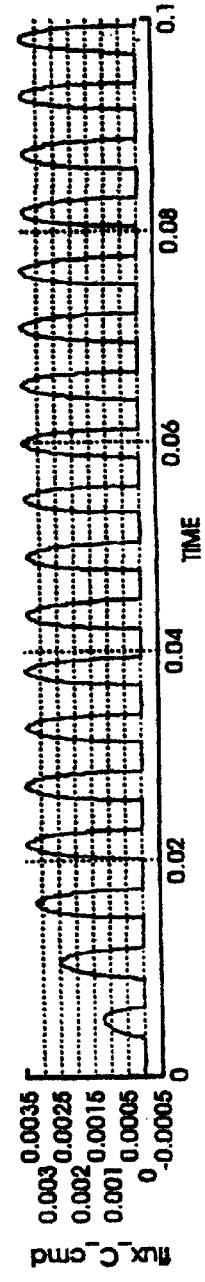
Figure 12C:
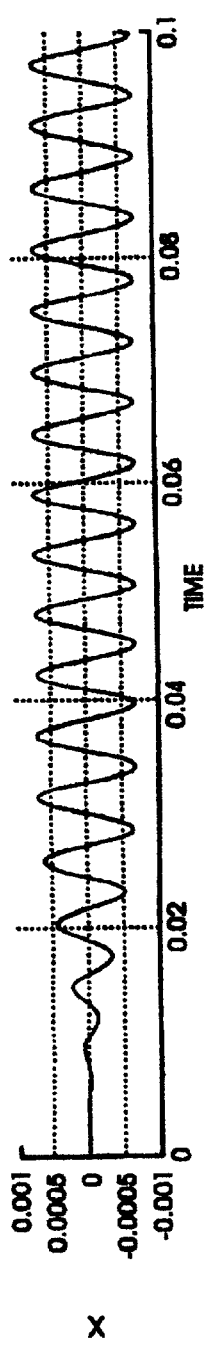
Figure 12C:
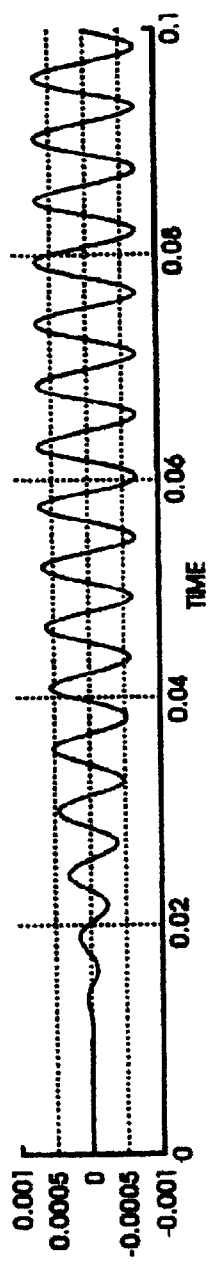
Figure 12C:
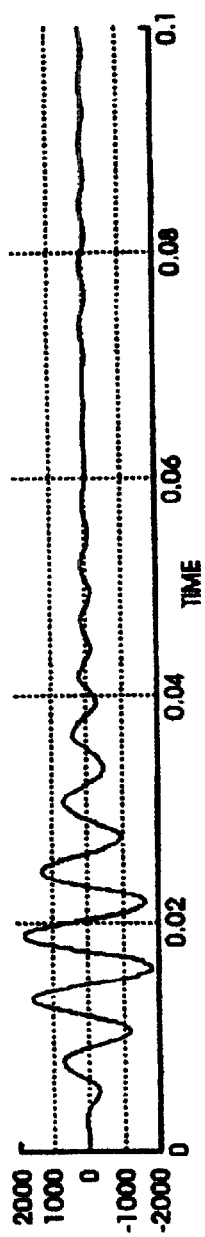
Figure 12C:
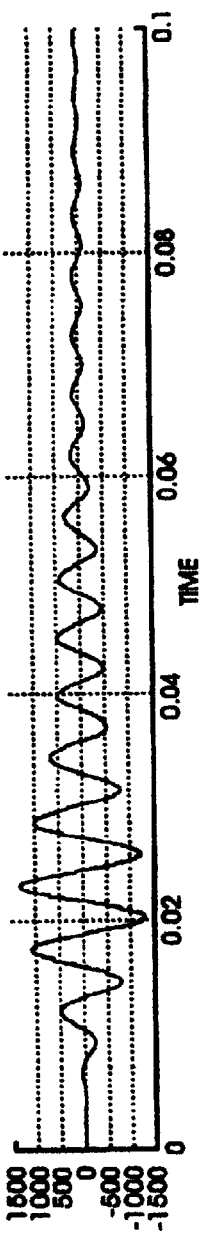
Figure 12C:
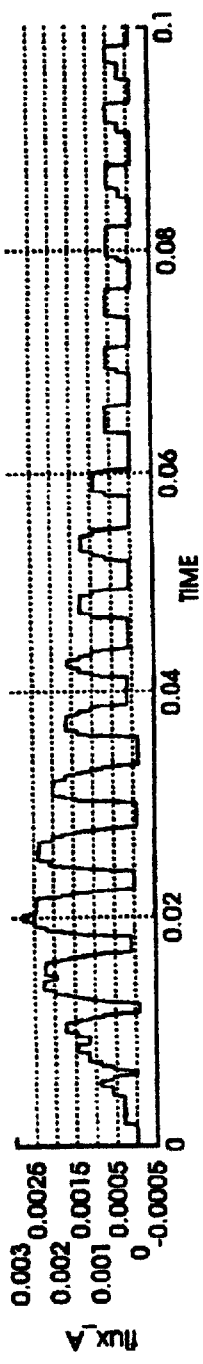
Figure 12C:
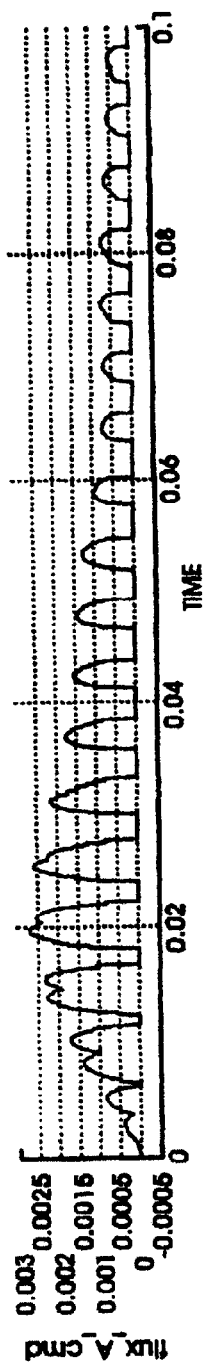
Figure 12C:
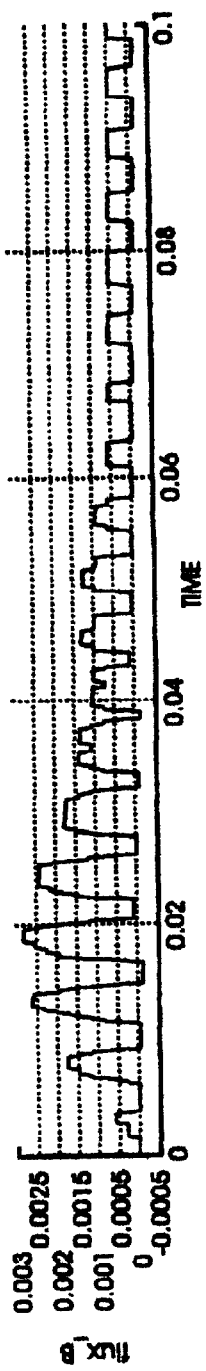
Figure 12C:
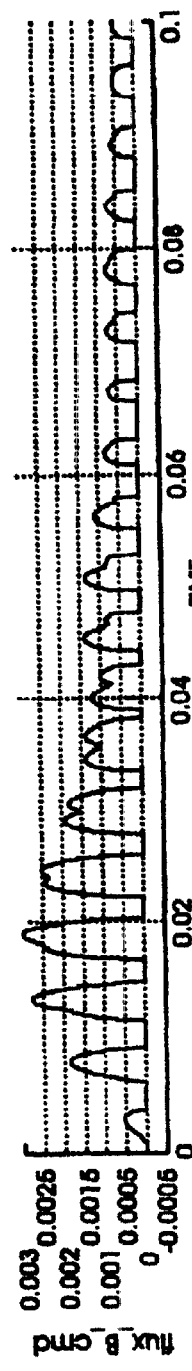
Figure 12C:
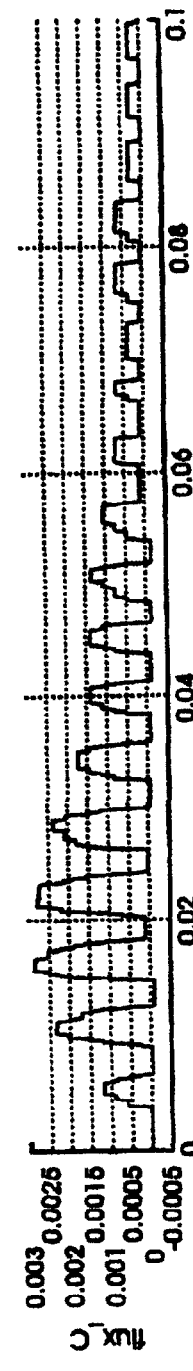
Figure 12C:
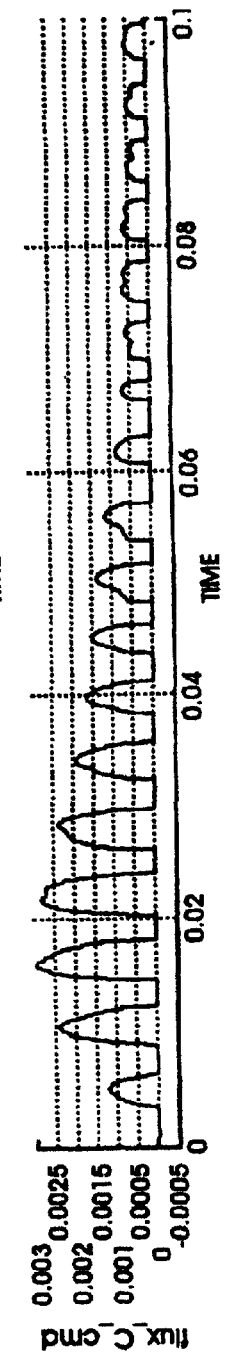
Figure 12D:
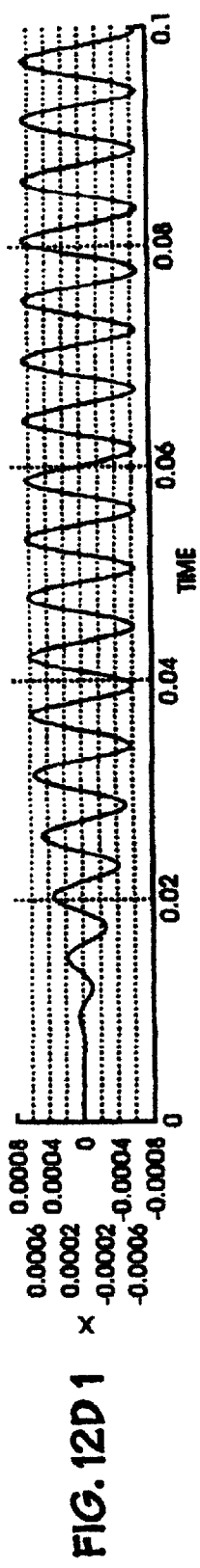
Figure 12D:
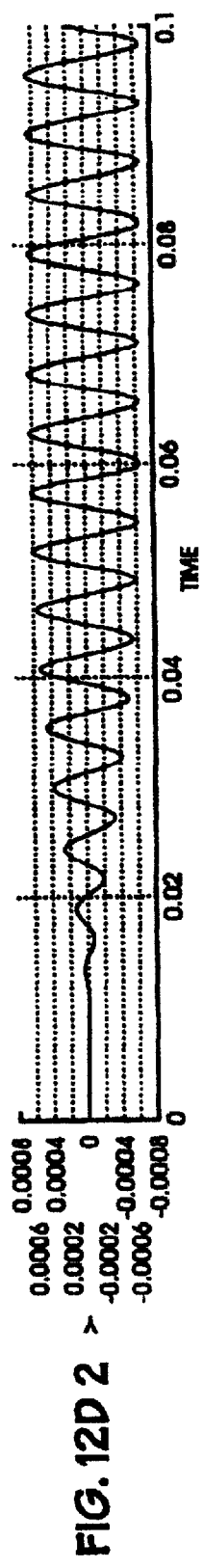
Figure 12D:
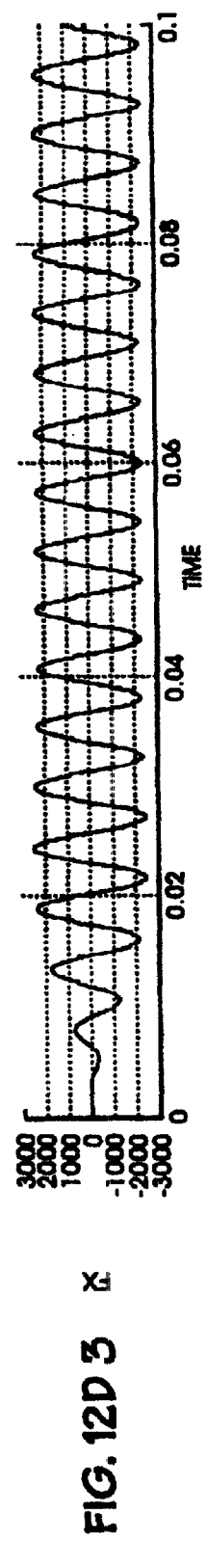
Figure 12D:
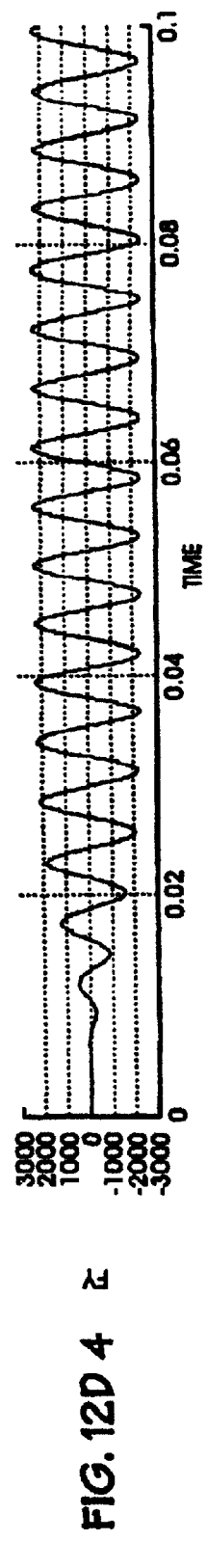
Figure 12D:
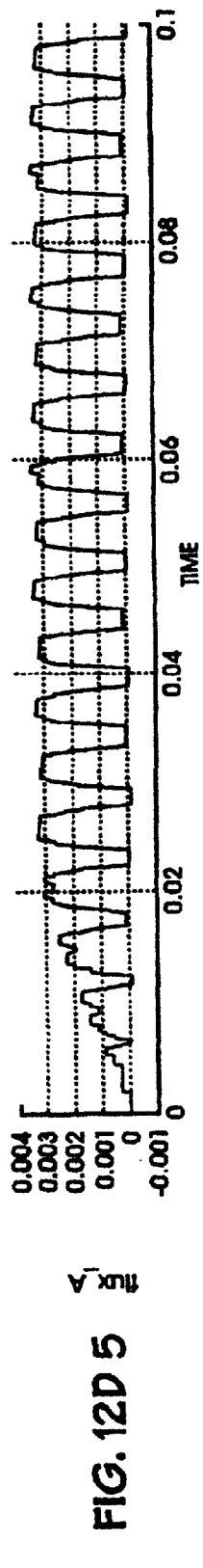
Figure 12D:
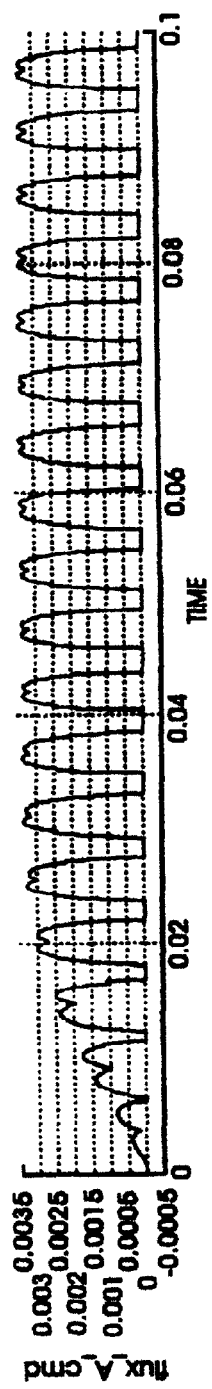
Figure 12D:
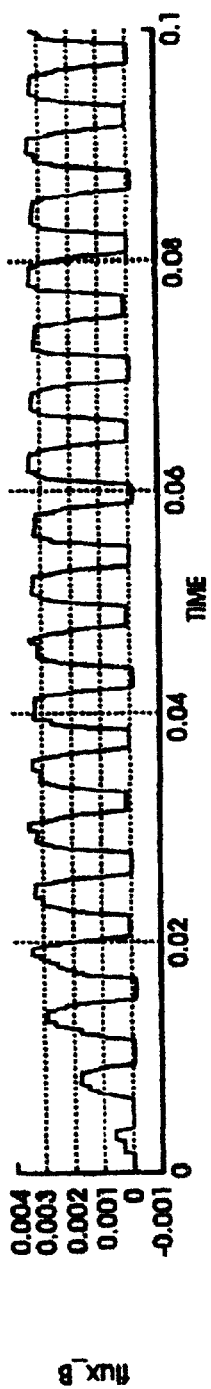
Figure 12D:
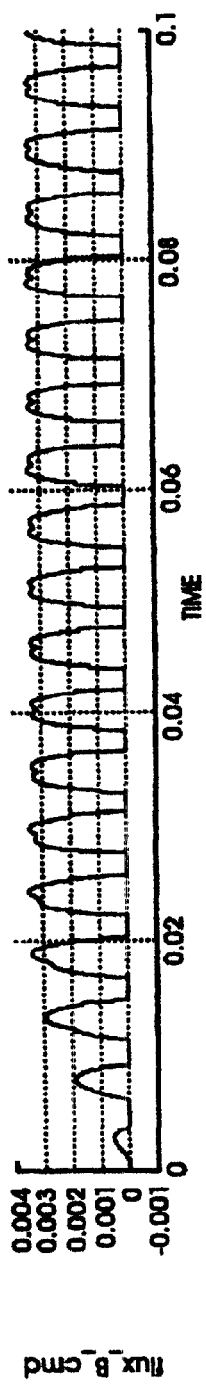
Figure 12D:
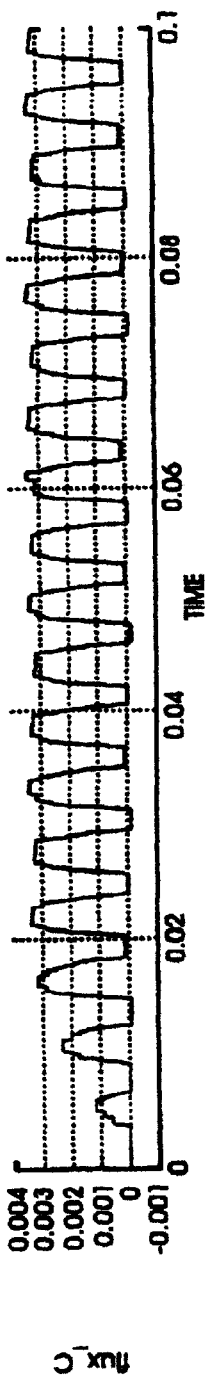
Figure 12D:
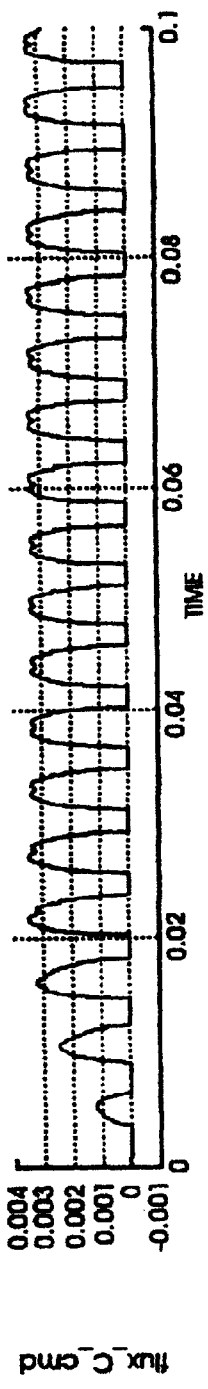

FIGS. 12A–12D illustrate the operation of a position/velocity controller of the type described above in connection with FIG. 9. Each figure illustrates the X and Y movement of the movable member of actuator 40, the FX and FY commands, the flux commands and the flux values for the three phase coils A, B and C. FIG. 12A illustrates the operation of the system for linear movement along the X axis at a no-load condition and FIG. 12B illustrates the operation of the system for the same type of movement under full load conditions. In a similar manner, FIGS. 12C and 12D illustrate operation of the system for circular motion at, respectively, no-load and full-load conditions.

As FIGS. 12A–12D make clear, the flux established in the actuator 40 by a flux controller constructed as described herein will be discontinuous and will closely track the flux commands, both for no-load and full-load conditions.

The position/velocity control systems described above are all based on a stationary reference frame (e.g., X and Y). Alternate embodiments are envisioned wherein the reference frame used for control purposes is based on rotating coordinates. The use of such a rotating reference frame can, for a given performance goal, reduce the required sampling rate, and provide for improved phase and amplitude tracking. Furthermore, the use of such a rotating reference frame can minimize and/or ensure a zero steady-state error through the use of a PI control law controller since, for such a reference frame, the control variables used by such a "rotating" control system are DC quantities.

In accordance with one embodiment of the present invention, a rotating position/velocity controller may be constructed that is based on a QD rotating reference frame where the movement of the movable member is defined, not in terms of X and Y position and velocity, but in terms of rotating vectors Q and D each having a corresponding vector whose elements are PC quantities at steady state. Such a QD position/velocity control system functions in a similar manner to that described above in connection with the XY control system with the general exceptions described below.

When a rotating position/velocity controller is used, both the position/velocity commands to the position/velocity controller and the feedback signals from position/velocity observer 93 reflecting the position/velocity of the movable member of the actuator may be provided in terms of the QD reference. Alternately, the position/velocity commands and feedback signals may be provided in terms of XY position and velocity in which case the position/velocity commands and signals must be transformed from the XY reference frame to the QD reference frame. These transformations may be accomplished using an appropriately programmed digital processor.

Figure 13:
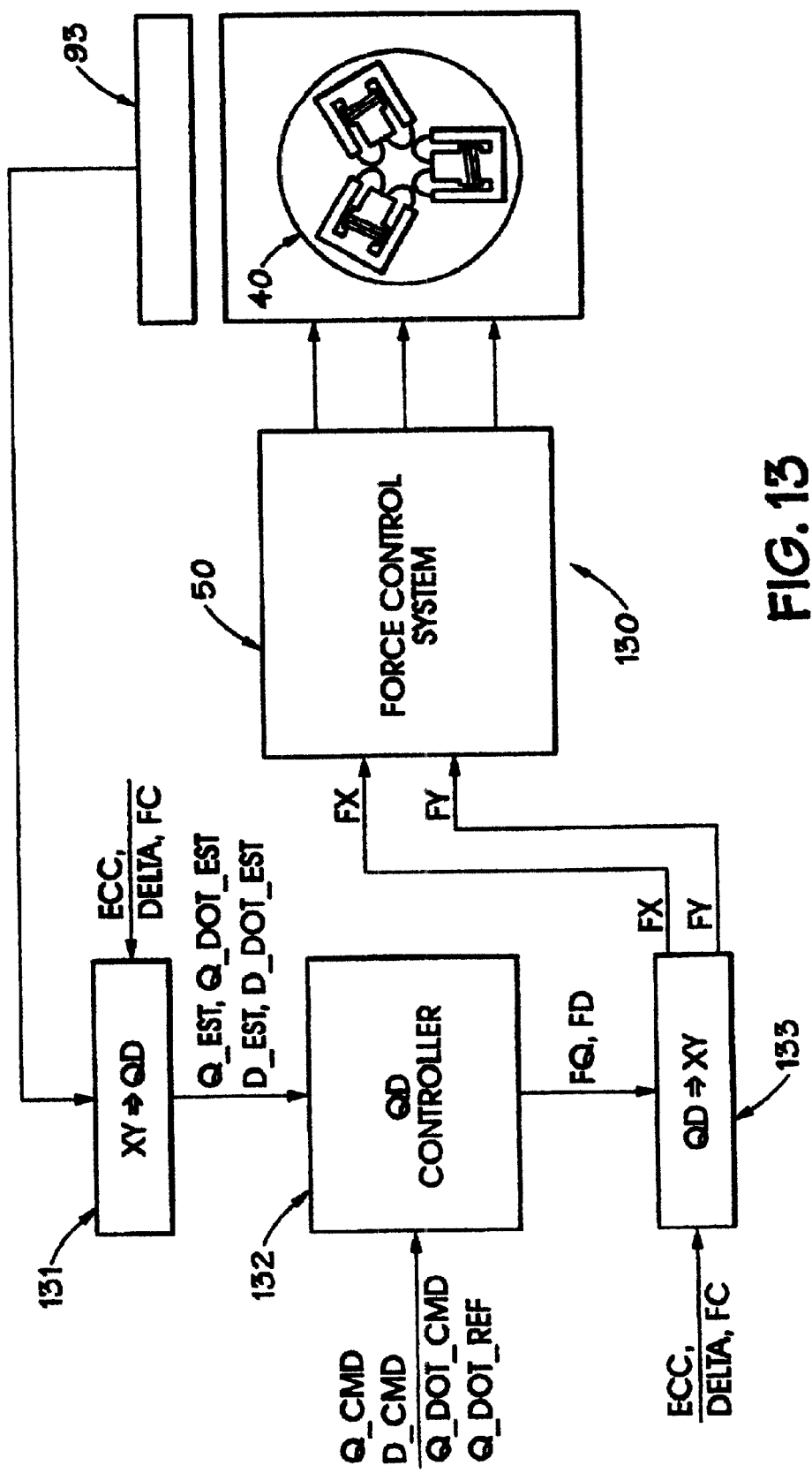
FIG. 13 generally illustrates one form of a QD control system constructed according to certain teachings of the present invention.

FIG. 13 generally illustrates one form of a QD control system 130 constructed according to certain aspects of the present invention. In general, the QD control system includes a QD controller 132 that receives at its inputs position command signals that define the desired movement of the movable member of actuator 40 in a pre-defined QD reference frame. Specifically, in the illustrated embodiment, the input QD position commands are: (i) q_cmd, defining the desired instantaneous magnitude and sign of the Q vector; (ii) d_cmd, defining the desired instantaneous magnitude and sign of the desired D vector; (iii) q_dot_cmd, defining desired rate of change in the magnitude of the Q vector; (iv) d_dot_ref, defining desired rate of change in the magnitude of the D vector; and (v) fc, defining the desired operating frequency of the system. In general Q and D are quasi static variables who may be >0 or <0.

The exemplary controller 130 of FIG. 13 is adapted for use in an orbital welding apparatus and, as such, is specially adapted to control elliptical movement of the movable member of actuator 40. As such, the QD control operations are performed in a rotating, elliptical QD reference frame. To define the appropriate rotating elliptical QD reference frame, QD controller 130 requires two additional variables. The first variable (ecc_command), like the ecc_command discussed above, defines the ratio of the ellipse major axis along the X axis to the minor axis, along the Y axis. The second variable (delta) defines the angular extent to which the major axis of the rotating elliptical frame is offset from the stationary X axis.

Other inputs to the QD controller 132 include feedback signals that provide information about the position/velocity of the movable member of actuator 40. In general, these signals are provided by a position/velocity observer 93 that, like position/velocity observer 93 discussed above, includes X and Y accelerometers. The X and Y position/velocity information from position/velocity observer 93 is converted into q, d, q_dot and d_dot signals corresponding to the QD parameters of the moveable member in the appropriate rotating elliptical QD reference frame. This transformation is accomplished by a XY-to-QD transform operation, reflected by block 131. The QD position/velocity information from block 131 is provided as another set of inputs to the QD controller 132. The QD controller then compares the QD information for the movable member with the command QD information to produce QD error signals that are used to generate desired Q and D force commands, FQ and FD. These force commands are then transformed into corresponding force commands in the FX and FY reference frame by a QD-to-XY transformation operation, reflected by block 133. The FX and FY signals are then applied to a force control system 50 that controls the forces applied to the actuator 40 in the manner previously described in connection with the force control system of FIG. 5.

The QD controller 132 of FIG. 13, and the blocks 131 and 133 may be implemented through the use of a programmed digital processor. FIGS. 14A–14D generally illustrate function blocks that may be used to implement an exemplary QD controller 132 and blocks 131 and 133. The illustrated controller operates on a continuous basis, although those of ordinary skill in the art having the benefit of this disclosure will appreciate that a sampling QD controller can also be constructed from the teachings provided herein.

Figure 14A:
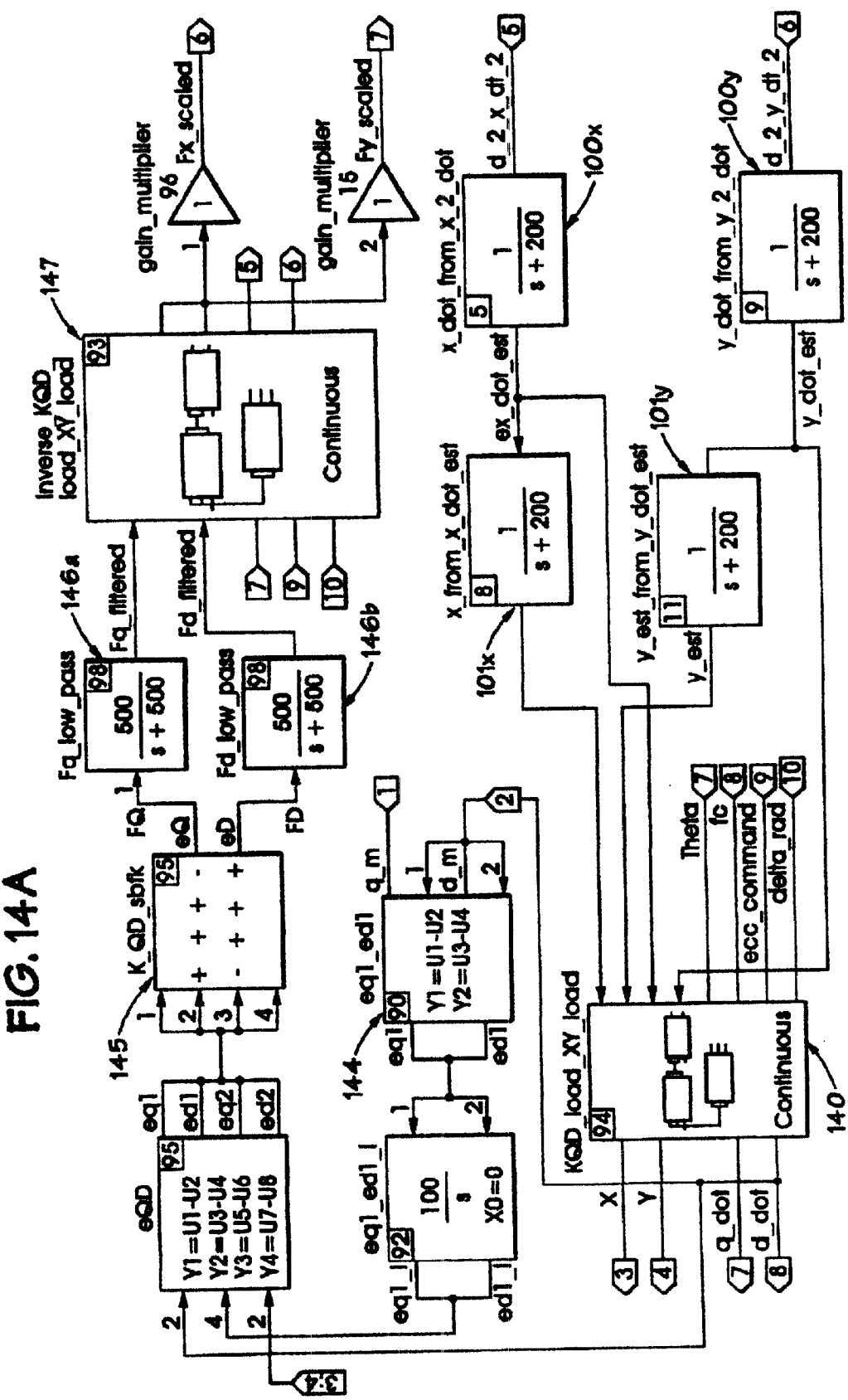
Figure 14C:
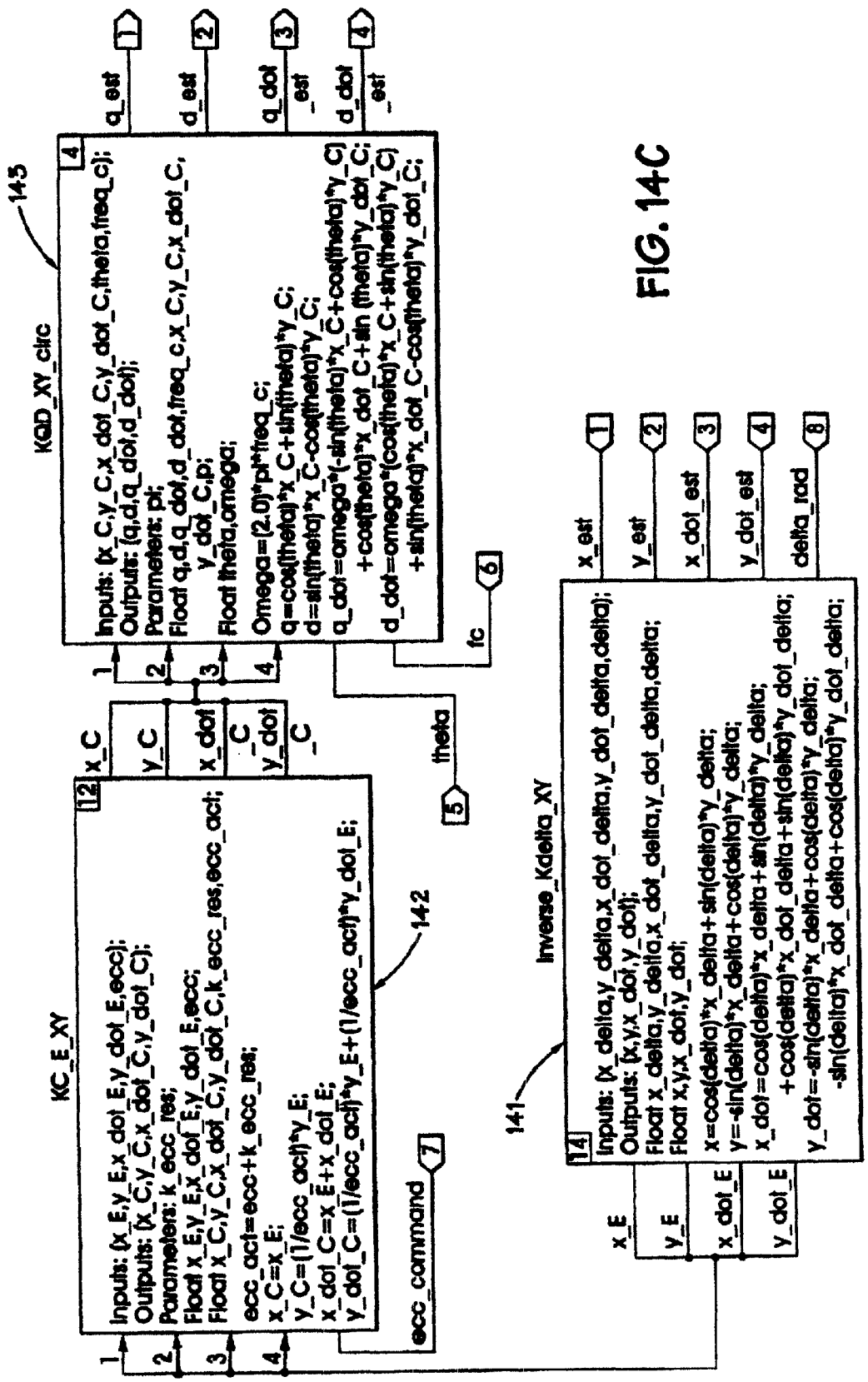

Referring to FIG. 14A, an overview of the QD controller 132 and blocks 131 and 133 is provided. In the illustrated embodiment, the illustrated QD controller receives X and Y acceleration information from a position/velocity observer 93 comprising X and Y accelerometers. The X and Y acceleration information is processed by function blocks 100X, 100Y, 101X and 101Y to produce X_est, X-dot_est, Y_est and Y_dot_est signals in the manner previously described in connection with FIG. 10A. The X Y estimated position and velocity information is then provided as an input to a transformation function block 140 that transforms the XY information from the function blocks 101X and 101Y into the appropriate rotating, elliptical QD reference frame. FIG. 14C provides a more detailed illustration of the operation of function block 140.

Alternate embodiments are envisioned wherein X, X_dot, Y, and Y_dot are measured directly, estimated as described above, or estimated from either X, Y or X_dot, Y_dot. Still further aX, aY could be directly transformed into aQ, aD and an observer for Q, D_dot, D, D_dot could be used in the rotating reference frame.

Referring to FIG. 14C, the function block 140 comprises three sub-function blocks 141, 142 and 143. These function blocks transform the X Y information from position/velocity observer 93 into QD information in the desired rotating elliptical reference frame. Initially, the X_est, X-dot_est, Y_est and Y_dot est signals are provided to function block 141 that transforms the XY signals into corresponding signals in an XY reference frame that is rotated from the standard stationary reference frame by an amount corresponding to the value of the delta variable described above. The outputs of function block 141 thus constitute XY position and velocity data in an XY reference frame that is offset from the stationary XY reference frame by an angular amount defined by the input variable delta.

The delta-adjusted XY information from function block 141 is applied as an input to function block 142 that receives the delta-adjusted XY signals and transforms those signals to XY signals in an XY reference frame that has been adjusted to accommodate the eccentricity of the desired elliptical reference frame. Generally, function block 142 adjusts the delta-adjusted XY signals for the differences between the major X axis and major Y axis of the ellipse. As reflected in FIG. 14C, one input to function block 142 is the ecc_ command.

The delta-and-ecc-adjusted XY signals from function block 142 (X-c, X_dot_c, Y_c and Y_dot_c) are applied as inputs to function block 143. In general, function block 143 transforms its inputs (in terms of a stationary XY reference frame) into QD signals in terms of a rotating circular reference frame. Because the inputs to XY-circular QD function block 143 are delta-and-ecc adjusted XY signals, however, the q_est, d_est, q_dot_est and d_dot_est signals from function block 143 will be equivalent to signals in rotating, elliptical QD reference frame. As reflected in FIG. 14C the fc command is used in function block 143 as is a "theta" variable. The theta variable is defined as 2*pi*fc*t, where t is time.

The particular order in which the transformations are performed in FIG. 14C is believed to be particularly important in certain implementations of the illustrated controller because it ensures that the appropriate adjustments are made to accurately transform the input XY commands into QD commands corresponding to the appropriate rotating, elliptical reference frame.

Referring back to FIG. 14A, the q_est, d_est, q-dot_est and d_dot_est signals from function block 143 are applied to a group of function blocks, globally indicated as 144. The function blocks 144 compare the estimated QD signals, which reflect the position/velocity of the movable member of actuator 40, with the command QD signals, to produce QD error signals. The function blocks 144 may also implement any appropriate control law, such as a multi-input/multi-output PI control law. The QD error signals from function blocks 144 are appropriately summed by matrix summing block 145 to yield force command signals FQ and FD. Exemplary variables for the summing matrix 145 are provided in FIG. 14B.

In the embodiment of FIG. 14A, the force command signals FQ and FD are low-pass filtered by low-pass filters 146a and 146b. The filtered FQ and FD signals are then transformed to corresponding FX and FY commands by function block 147. A general illustration of sub-function blocks that may be used to implement function block 147 is provided in FIG. 14D.

Figure 14D:
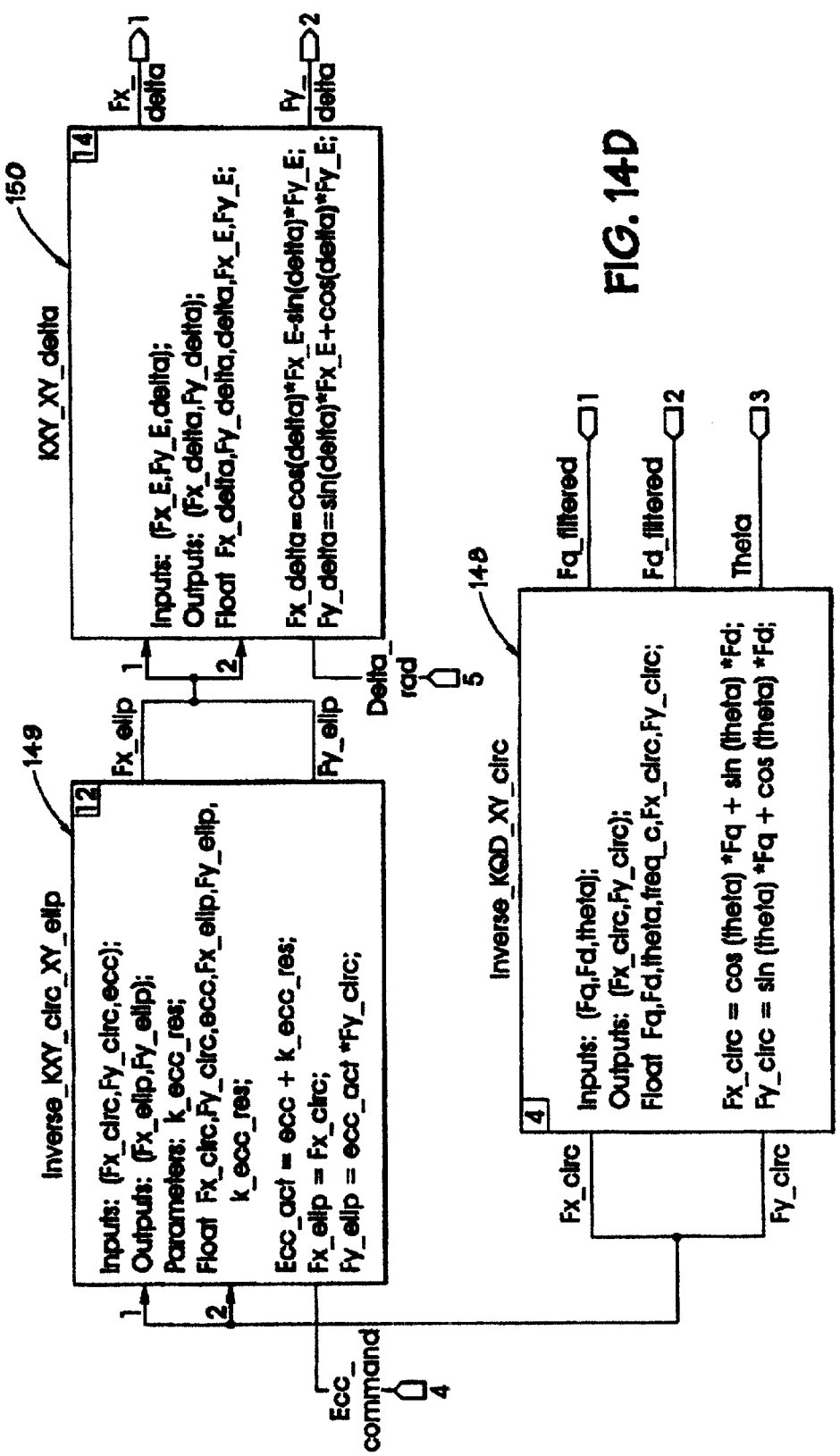

Referring to FIG. 14D, the filtered FQ and FD signals are first transformed into corresponding XY force command signals FX_circ and FY_circ. In the illustrated embodiment, the transformation performed by function block 148 is a simple circular QD-XY-transform that does not take into account the elliptical nature of the QD reference frame used by the controller or the delta offset of that reference frame from the stationary XY reference frame.

The Fx_circ and Fy_circ commands from function block 148 are then applied as inputs to function block 149. Function block 149 also receives as an input the ecc_ command. In general, function block 149 transforms the FX_circ and FY_circ commands into FX and FY commands (FX_elip, FY_elip) that are adjusted to take into account the elliptical nature of the rotating elliptical reference frame used by the illustrated QD controller. The FX and FY commands from function block 149, however, are not adjusted to reflect the delta offset of the rotating elliptical reference frame used by the QD controller from the stationary XY reference frame. That adjustment is accomplished by function block 150 that receives the signals from function block 149 and a signal corresponding the delta variable and, in response to these inputs, generates FX and FY command signals. As with the transformations reflected in FIG. 14C, the transformations of FIG. 14D should be performed in the particular order described above to ensure appropriate transformation of the signals.

Referring back to FIG. 14A, these FX and FY signals from function block 150 are then amplified by gain amplifiers and applied to the force controller to control the forces applied to the movable member of the actuator 40 as described above.

While the various transformation operations described above for: (i) converting XY feedback signals to a rotating, elliptical QD reference frame; (ii) implementing a control law function in the rotating, elliptical QD reference frame to produce QD force commands; and (iii) transforming the force commands in the rotating QD reference frame to XY force commands may seem complicated, they provide several advantages. Specifically, because of the transformations described above, the control variables actually used in function blocks 144 to implement the control law of the system are DC quantities. As such, a multi-input, multi-output PI or other zero steady state error control law can be used. The use of such a control law can result in better system performance that is available from conventional control approaches. This is especially true in orbiting welder applications where the use of the described transforms is novel. In particular, the use of the transforms and control law described above, eliminates the need for an outer radius control loop since the control functions that would be performed by such a loop are handled by the control law implemented by function blocks 144, 145 and 146.

While the invention has been described in connection with the illustrative embodiments discussed above, those skilled in the art will recognize that many variations may be made without departing from the present invention. For example, the novel actuator 40 is described herein primarily in systems utilizing a flux control system. It will be appreciated that the actuator 40 may be excited by a number of different apparatus including, e.g., a conventional inverter that would produce sinusoidal flux in the E-cores of the actuator 40. While such an application of the novel actuator 40 would potentially not be as elegant or have the same performance as an application where the actuator was excited with the novel flux controller described herein, it would still provide many of the advantages as a result of the uncoupled nature of the E-cores and the phase coils associated with those cores. In light of variations of the type described above, it will be understood that the above description is made by way of example and not for the purposes of limitation. Accordingly, the protection sought herein is as set forth in the claims below.

What is claimed is:

1. A force control system for an electromagnetic actuator, the actuator having a stationary member with a core, a movable member and at least one phase coil positioned to establish a magnetic flux in the core when the phase coil is energized to exert a force on the movable member, the force control system comprising:
    an observer that outputs signals representing the instantaneous position and velocity of the movable member;
    a position controller receiving the output of the observer and signals representing a desired position and a desired velocity;
    the position controller comparing the output of the observer with the desired position and velocity signals to generate position and velocity error signals;
    the position controller generating force command signals required to position the movable member at the desired position with the desired velocity based on the position and velocity error signals;
    a flux controller receiving the force command signals and converting the force command into a flux command signal; and
    the flux controller generating a phase energization signal based on the flux command signal.

2. The force control system of claim 1, wherein the position of the movable member is controlled in an X, Y reference frame.

3. The force control system of claim 1, wherein the velocity of the movable member is controlled in terms of X and Y.

4. The force control system of claim 1, wherein the observer includes an accelerometer.

5. The force control system of claim 4, wherein the observer includes first and second accelerometers having outputs connected to the position controller, the position controller transforming the signals received from the accelerometers into estimations of the position and velocity of the movable member.

6. The force control system of claim 5, wherein the position controller further applies position and velocity gain terms to the position and velocity error signals to generate the force command signals.

7. The force control system of claim 6, wherein the position gain term is set equal to zero such that only the velocity of the movable member is controlled.

8. The force control system of claim 1, wherein the position controller continuously receives the observer output signals.

9. The force control system of claim 1, wherein the position controller periodically samples the observer output signals.

10. A force control system for an electromagnetic actuator, the actuator including a stationary member having a core, a movable member and a phase coil positioned to establish a flux in the core when the phase coil is energized to exert a force on the movable member, wherein the force exerted on the movable member varies in proportion to the magnitude of the flux, the force control system comprising:
    a flux observer having an input and an output, the input coupled to the phase coil, the flux observer low-pass filtering the voltage applied to the phase coil to estimate the flux of the phase coil and provide a signal representing the estimated flux at the output; and
    a flux controller receiving a flux command signal and the output of the flux observer, the flux controller providing a phase energization signal to energize the phase coil to increase the flux in the phase coil when the flux command signal is greater than the estimated flux signal by at least a predetermined amount and to energize the phase coil to decrease the flux in the phase coil when the flux feedback signal is greater than the flux command signal by at least a predetermined amount.

11. The force control system of claim 10, further comprising:
    a force-to-flux controller having an output coupled to the flux controller, the force-to-flux controller receiving as an input a desired force command in a given reference frame and providing at the output the flux command signal;
    wherein the force-to-flux controller converts the desired force command to the flux command signal based on the relationship between the forces associated with the movable member and the flux in the core.

12. The force control system of claim 10, wherein the flux observer low-pass filters Vn–In*Rn, where Vn is the phase coil voltage, In is the phase coil current and Rn is the phase coil resistance.

13. An electromagnetic actuator comprising:
    a stationary outer assembly defining a bore, the stationary member including a core;
    a phase coil positioned to establish a flux in the core when the phase coil is energized;
    a movable member positioned within the bore defined by the stationary assembly, such that the flux established in the core exerts a force on the movable member;
    a flux observer having an input and an output, the input coupled to the phase coil, the flux observer low-pass filtering the voltage applied to the phase coil to estimate the flux of the phase coil and provide a sign representing the estimated flux at the output; and
    a flux controller receiving a flux command signal and the output of the flux observer, the flux controller providing a phase energization signal to energize the phase coil to increase the flux in the phase coil when the flux command signal is greater than the estimated flux signal by at least a predetermined amount and to energize the phase coil to decrease the flux in the phase coil when the flux feedback signal is greater than the flux command signal by at least a predetermined amount.

14. The electromagnetic actuator of claim 13, wherein the stationary outer assembly comprises a plurality of substantially identical, magnetically-uncoupled E-cores, each E-core defining a central arm and two secondary arms.

15. The electromagnetic actuator of claim 14, wherein the phase coil comprises a plurality of phase coils, and wherein each phase coil encircles the central arm of an E-core such that, when electrical energy is applied to a given phase coil, a flux will be established in the corresponding E-core.

16. The electromagnetic actuator of claim 15, wherein the plurality of phase coils comprises two phase coils.

17. The electromagnetic actuator of claim 15, wherein the plurality of phase coils comprises four phase coils.

18. The force control system of claim 13, further comprising:
   a force-to-flux controller having an output coupled to the flux controller, the force-to-flux controller receiving as an input a desired force command in a given reference frame and providing at the output the flux command signal;
   wherein the force-to-flux controller converts the desired force command to the flux command signal based on the relationship between the forces associated with the movable member and the flux in the core.

19. The force control system of claim 13, wherein the flux observer low-pass filters $V_n - I_n * R_n$, where $V_n$ is the phase coil voltage, $I_n$ is the phase coil current and $R_n$ is the phase coil resistance.

20. The actuator of claim 15 wherein the phase coils are electrically uncoupled, such that the current flowing through any given phase coil is not constrained by the current flowing through any other phase coil.

* * * * *

UNITED STATES PATENT AND TRADEMARK OFFICE
CERTIFICATE OF CORRECTION

PATENT NO.   : 6,404,154 B2
DATED        : June 11, 2002
INVENTOR(S)  : Joseph G. Marcinkiewicz and Donald C. Lovett It is certified that error appears in the above-identified patent and that said Letters Patent is hereby corrected as shown below:

<u>Column 32,</u>
Line 50, delete "sign" and insert -- signal --

Signed and Sealed this

Fifteenth Day of April, 2003

JAMES E. ROGAN
*Director of the United States Patent and Trademark Office*